United States Patent
Choi et al.

(10) Patent No.: US 6,724,740 B1
(45) Date of Patent: Apr. 20, 2004

(54) CHANNEL COMMUNICATION DEVICE AND METHOD FOR CDMA COMMUNICATION SYSTEM

(75) Inventors: Jin-Woo Choi, Kyonggi-do (KR); Soon-Young Yoon, Seoul (KR); Jae-Min Ahn, Seoul (KR); Young-Ky Kim, Seoul (KR); Joong-Ho Jeong, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/132,404

(22) Filed: Aug. 11, 1998

(30) Foreign Application Priority Data

Mar. 31, 1998 (KR) .............................. 98/11381

(51) Int. Cl.⁷ .............................................. H04J 13/00
(52) U.S. Cl. ........................ 370/335; 370/342; 370/441
(58) Field of Search ................................ 370/335, 342, 370/441

(56) References Cited

U.S. PATENT DOCUMENTS

| | | | | | |
|---|---|---|---|---|---|
| 5,504,773 | A | * | 4/1996 | Padovani et al. ........... | 370/441 |
| 5,790,534 | A | * | 8/1998 | Kokko et al. ............... | 370/335 |
| 5,831,978 | A | * | 11/1998 | Willars et al. .............. | 370/335 |
| 6,167,270 | A | * | 12/2000 | Rezaiifar et al. ........... | 370/331 |
| 6,275,712 | B1 | * | 8/2001 | Gray et al. ................. | 455/522 |
| 6,442,152 | B1 | * | 8/2002 | Park et al. .................. | 370/341 |
| 6,456,604 | B1 | * | 9/2002 | Lee et al. ................... | 370/328 |

FOREIGN PATENT DOCUMENTS

| | | |
|---|---|---|
| JP | 05-327580 | 12/1993 |
| JP | 6-501349 | 2/1994 |
| JP | 07-336767 | 12/1995 |
| WO | WO 97/45970 | 12/1997 |

OTHER PUBLICATIONS

Knisely, Douglas N. et al. "Evolution of Wireless Data Services: IS–95 to cdma2000," IEEE Communications Magazine, Oct. 1998, pp. 140–149.*

Japanese Office Action dated Jan. 21, 2003, Issued in a counterpart application, namely, Appln. No. 11-549214.

Vijay K. Garg et al., "Applications of CDMA in Wireless/ Personal Cummunications", Prentice Hall Ptr., 1997, pp. 97–107.

* cited by examiner

*Primary Examiner*—Melvin Marcelo
(74) *Attorney, Agent, or Firm*—Dilworth & Barrese LLP

(57) ABSTRACT

A CDMA communication system transmitting/receiving control information during a voice and/or data communication service by using a dedicated control channel. A message frame length for the control information is variable according to an amount of the control information. The CDMA communication system includes a base station device and a terminal device. The base station device has a forward pilot channel generator for generating a pilot signal, a forward dedicated control channel generator for generating a control message for a forward dedicated control channel, a forward fundamental channel generator for generating a voice signal, and a forward supplemental channel generator for generating packet data. The terminal device has a terminal device including, a reverse dedicated control channel generator for generating a control message for a reverse dedicated control channel, a reverse pilot channel generator for generating a pilot signal by adding a power control signal to the pilot signal, a reverse fundamental channel generator for generating a voice signal, and a reverse supplemental channel generator for generating packet data.

71 Claims, 40 Drawing Sheets

CHANNEL COMMUNICATION DEVICE AND METHOD FOR CDMA COMMUNICATION SYSTEM

BACKGROUND OF THE INVENTION

1. Field of the Invention

The present invention relates to a transmitting/receiving device and method for a CDMA communication system, and in particular, to a device and method for performing voice and data communication by employing a dedicated control channel.

2. Description of the Related Art

A CDMA (Code Division Multiple Access) mobile communication system has been developed from an existing mobile communication Standard which mainly provides voice communication to the IMT-2000 (International Mobile Telecommunication-2000) Standard which can provide not only the voice communication but also high speed packet data communication. A mobile communication system, employing the IMT-2000 Standard, can provide voice, moving picture, and Internet search services of high quality. The CDMA mobile communication system has communication links between a base station and terminals, and the communication links are divided into a forward link from the base station to the terminal and a reverse link from the terminal to the base station.

The conventional CDMA communication system, though suitable for the voice communication, is unsuitable for the data communication which requires the high speed data transmission and the voice communication of high quality. In order to provide various multimedia services such as the data communication and the voice communication of high quality in addition to the normal voice communication service, the CDMA mobile communication system should employ the communication channels for servicing the voice and the data so as to allocate the channels flexibly at the userNs request.

When the traffic channel is divided into the fundamental channel and the supplemental channel for the data communication service, the fundamental channel should be held consistently to transmit control information, even in the state that the base station is not in communication with the mobile station (i.e., terminal). Accordingly, the conventional CDMA mobile communication system may waste the communication channels, thereby causing the dissipation of the radio capacity.

Further, the conventional CDMA mobile communication system transmits the control message in a fixed frame size. Thus, although the system has the less amount of the transmission data for the control message, it should transmit the data in the fixed frame size, resulting in a lowering of the throughput.

In addition, the conventional CDMA mobile communication system transmits reverse power control bits through the forward fundamental channel. Hence, even though the system has no user data to transmit through the fundamental channel, it should maintain the fundamental channel for the reverse power control, which deteriorates the communication quality.

In the conventional CDMA mobile communication system, a reverse link transmitter consists of a pilot channel, a fundamental channel, a supplemental channel and a control channel. A control channel generator in the conventional CDMA mobile communication system uses only 10 bits per 20 ms frame as input bits and inserts the power control bit thereto at a specified time point. In this case, the amount of the message is too small for the effective control. Besides, since the power control bit is transmitted through the control channel, the system should maintain the control channel for the power control even in case the system has no control message to transmit.

SUMMARY OF THE INVENTION

It is therefore an object of the present invention to provide a voice and data transmission/reception device and method for a CDMA communication system.

It is another object of the present invention to provide a device and method for transmitting/receiving control information during voice and data transmission/reception by using a dedicated control channel in a CDMA communication system.

It is still another object of the present invention to provide a device and method for transmitting/receiving control information during voice and data transmission/reception by using a dedicated control channel, wherein a message frame has a structure variable according to the amount of transmission/reception information.

It is further still another object of the present invention to provide a CDMA communication system for transmitting a signaling message and a control information message by using channels that are not occupied.

It is yet another object of the present invention to provide a CDMA communication system in which a reverse transmission device inserts a power control signal into a pilot channel and transmits a control message using a dedicated control channel.

To achieve the above objects, the present invention provides a CDMA communication system including a base station device and a terminal device. The base station device has a forward pilot channel generator for generating a pilot signal, a forward dedicated control channel generator for generating a control message for a forward dedicated control channel, a forward fundamental channel generator for generating a voice signal, and a forward supplemental channel generator for generating packet data. The terminal device has a terminal device including, a reverse dedicated control channel generator for generating a control message for a reverse dedicated control channel, a reverse pilot channel generator for generating a pilot signal by adding a power control signal to the pilot signal, a reverse fundamental channel generator for generating a voice signal, and a reverse supplemental channel generator for generating packet data.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
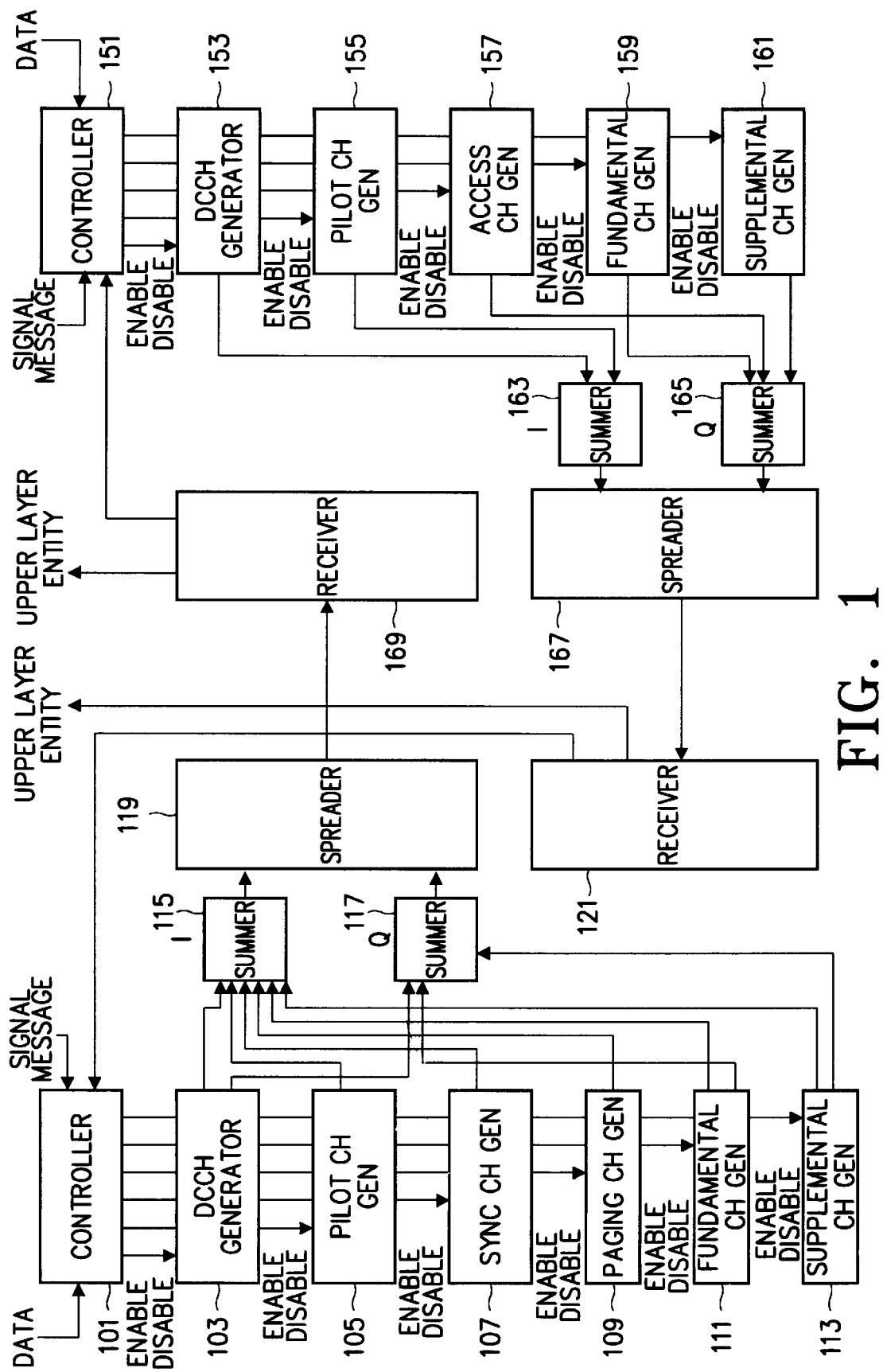
FIG. 1 is a block diagram of a transmitting/receiving device for a CDMA communication system according to an embodiment of the present invention.

Reference will be made to the preferred embodiments of the present invention with reference to the accompanying drawings, in which the like reference numerals denote the like elements.

In the following description, numerous specific details such as the frame length, the coding rate, and the number of the data bits and the symbols output from the respective channel generators are set forth to provide a more thorough understanding of the present invention. It will be apparent, however, to one skilled in the art that the present invention may be practiced without these specific details. In other instances, well known functions or constructions have not been described so as not to obscure the present invention.

Throughout the specification, a term Ocontrol messageO refers to a message transmitted through a dedicated control channel, and the messages which can be transmitted through the dedicated control channel may include various control messages (L3 signaling) used in the RLP (Radio Link Protocol) frame or the IS-95B Standard, and the MAC (Medium Access Control) message which is a packet data service control message for allocating and releasing the supplemental channel.

Furthermore, a term Odedicated channelO used in the specification refers to an exclusive channel allocated for the communication between the base station and the terminal, and is the antonym of the common channel. In the present invention, the dedicated channel includes the dedicated control channel, the supplemental channel, the fundamental channel, and the reverse pilot channel. That is, the forward dedicated channel is a combination of all the physical channels for transmitting information from the base station to the terminal, and includes the forward fundamental channel, the forward supplemental channel and the forward dedicated control channel. In addition, the reverse dedicated channel is a combination of all the physical channels for transmitting information from the terminal to the base station, and includes the reverse supplemental channel, the reverse fundamental channel, the reverse dedicated control channel and the reverse pilot channel.

FIG. 1 illustrates a transmitting/receiving device for a CDMA communication system according to an embodiment of the present invention, in which the respective channels and the corresponding channel transmission/reception devices are shown in the light of the transmitters.

First, as to the structure of the base station, a controller 101 enables and disables the respective channel generators of the base station, manages physical layer messages transmitted/received in the base station, and interchanges the messages with an upper layer entity. A pilot channel generator 105, a sync channel generator 107, a paging channel generator 109 constitute a device for generating common channel information used in common by the users in single or plural cells. A dedicated control channel generator 103, a fundamental channel generator 111, and a supplemental channel generator 113 constitute a device for generating the dedicated channel information which is allocated differently for every user.

The dedicated control channel generator 103 processes various control messages to be transmitted through the forward dedicated control channel (DCCH) and transmits the processed control messages to the terminal. In operation, the messages transmitted through the forward dedicated control channel are composed of varius control messages (L3 signaling) used in the RLP frame or the IS-95B Standard, and the MAC message which is the packet data service control message for allocating and releasing the supplemental channel. When the supplemental channel is not in use, the power control signal can be transmitted through the dedicated control channel. In such a case, the power control signal may be included in the control message. Further, the data rate to be used by the base station and the supplemental channel is negotiated in the forward dedicated control channel. The forward dedicated control channel generator 103 also outputs a command to change an orthogonal code when the orthogonal code is used in the supplemental channel.

The dedicated control channel generator 103 spreads the dedicated control channel by allocating to the forward dedicated control channel a unused one of the orthogonal codes which are not allocated to the pilot channel generator 105, the sync channel generator 107 and the paging channel generator 109. When transmitting the control message through the forward link by adding the control message to the fundamental channel, the transmission delay occurs too serious for the high speed packet data communication, and the quality of the fundamental channel is also lowered. However, by allocating the dedicated control channel to the forward link for using the MAC message, the system according to the present invention can provide the high speed packet data service, thereby increasing the data reception quality of the fundamental channel and the supplemental channel. The RLP frame can provide a service for transmitting octet stream. The RLP can be divided into the transparent RLP and the non-transparent RLP. The transparent RLP, though it does not re-transmit the erroneously transmitted frame, notifies the time and position of the erroneously transmitted frame to the upper layer entity. The non-transparent RLP provides an error correction method.

The pilot channel generator 105 processes information to be transmitted through the forward pilot channel and transmits the processed information to the terminal. The forward pilot channel transmits the logic signals of all O0Os or all O1Os. Here, it is assumed that the pilot channel outputs the logic signals of all O0Os. The pilot channel signal enables the terminal to perform the fast initial acquisition for the new multi-path and the channel estimation. The pilot channel generator 105 spreads the pilot channel signal by allocating a specified orthogonal code to the pilot channel.

The sync channel generator 107 processes information to be transmitted through the forward sync channel and transmits the processed information to the terminal. The information transmitted through the sync channel allows the terminals in the same cell to perform time synchronization and frame synchronization. The sync channel generator 107 spreads the sync channel information by allocating a specific orthogonal code to the forward sync channel.

The paging channel generator 109 processes information to be transmitted through the forward paging channel and transmits the processed information to the terminal. The information transmitted through the paging channel includes all the information required before establishment of the communication channel. The paging channel generator 109 spreads the forward paging channel signal by allocating one of the predetermined orthogonal codes to the forward paging channel.

The fundamental channel generator 111 processes information to be transmitted through the forward fundamental channel and transmits the processed information to the terminal. The information transmitted through the forward fundamental channel is normally the voice signal. Further, the information transmitted through the forward fundamental channel may include the various control messages (L3 signaling) used in the IS-95B Standard and the power control signal in addition to the voice signal. Moreover, the signal transmitted through the forward fundamental channel may include the RLP frame and the MAC message, in case of necessity.

The fundamental channel has the data rate of 9.6 Kbps or 14.4 Kbps. As occasion demands, the fundamental channel may have a variable rate which are 4.8 Kbps or 7.2 Kbps for 2 rate, 2.4 Kbps or 3.6 Kbps for ¼ rate, and 1.2 Kbps or 1.8 Kbps for ⅛ rate. In this case, it is necessary that the receiver can detect the variation of the data rate. The forward fundamental channel generator 111 spreads the fundamental channel signal by allocating to the fundamental channel a unused one of the orthogonal codes which are not allocated to the pilot channel generator 105, the sync channel generator 107 and the paging channel generator 109.

The supplemental channel generator 113 processes information to be transmitted through the forward supplemental channel and transmits the processed information to the terminal. The information transmitted through the forward supplemental channel includes the RLP frame and the packet data. The supplemental channel generator 113 has the data rate of over 9.6 Kbps. The supplemental channel generator 113 has a scheduled rate at which the base station negotiates with the terminal to communicate with each other at the data rate that the base station determined. The forward supplemental channel generator 113 spreads the supplemental channel signal by allocating to the supplemental channel a unused one of the orthogonal codes which are not allocated to the supplemental channel generator 113, the pilot channel generator 105, the sync channel generator 107 and the paging channel generator 109. Here, the fundamental channel and the supplemental channel are the traffic channels.

A summer 115 sums the I channel (in-phase channel) transmission signals output from the dedicated control channel generator 103, the fundamental channel generator 111 and the supplemental channel generator 113 and the transmission signals output from the pilot channel generator 105, the sync channel generator 107 and the paging channel generator 109. A summer 117 sums the Q channel (quadrature-phase channel) transmission signals output from the dedicated control channel generator 103, the fundamental channel generator 111 and the supplemental channel generator 113. A spreader 119 spreads the transmission signals output from the summers 115 and 117 by multiplying the transmission signals by the spread sequence. The spread signals are up-converted to the radio frequency and transmitted to the terminal. A receiver 121 converts the respective channel signals received from the terminal through the reverse link to the baseband signal and despreads the converted channel signals by multiplying them by the spread sequence. FIG. 1 has omitted the detailed structure of the reverse channel receivers.

Next, as to the structure of the terminal, a controller 151 enables and disables the operations of the respective channel generators of the terminal, processes the physical layer message transmitted/received in the terminal and interchanges the message with the upper layer entity.

A dedicated control channel generator 153 processes various messages to be transmitted through the reverse dedicated control channel and transmits the processed messages to the base station. In operation, the messages transmitted through the reverse dedicated control channel are composed of various control messages (L3 signaling) used in the IS-95B Standard or the RLP frame, and the MAC message having a control message for allocating and releasing the supplemental channel. Since the power control signal is transmitted by being inserted into the pilot channel, the reverse dedicated control channel does not transmit the power control signal.

Further, the reverse dedicated control channel generator 153 transmits a control message for negotiating the data rate to be used in the supplemental channel with the base station. The reverse dedicated control channel generator 153 spreads the signals by using the predetermined orthogonal code allocated to the respective channels for classifying reverse link channels. Here, since the orthogonal code is used for classifying the channels, the dedicated control channel, the pilot channel, the access channel, the fundamental channel and the supplemental channel use the different orthogonal codes, respectively. All the users share the same orthogonal codes for the same channels. For example, the users distinguish the dedicated control channel by using the same orthogonal code allocated for the reverse dedicated control channel.

The reverse dedicated control channel generator 153 transmits the control message at the fixed data rate of 9.6 Kbps. Conventionally, the control message is transmitted by only 10 bits per 20 ms frame. However, in the embodiment of the present invention, the control information can be transmitted by over 168 bits per 20 ms frame or by over 24 bits per 5 ms frame, thus allowing the effective control. By fixing the data rate of the reverse dedicated control channel generator 153 to 9.6 Kbps, the performance deterioration due to the determination of the data rate is prevented and the system does not need the data rate determination circuit, so that the receiver may be simplified. Further, having the same data rate as the fundamental data rate 9.6 Kbps of the voice signal, the dedicated control channel generator 153 can maintain the same service area (i.e., coverage) as that of the normal voice service.

The pilot channel generator 155 processes information to be transmitted through the reverse pilot channel and transmits the processed information to the base station. Like the forward pilot channel signal, the reverse pilot channel signal serves to enable the fast initial acquisition and the channel estimation for the new multi-path. In addition, it transmits the reverse power control information by adding the power control signal to the pilot signal at a specified time. In the reverse link, the power control signal is inserted into the pilot channel, so that there is no need to allocate the other channels additionally to transmit the power control signal. As a result, the peak-to-average ratio is lowered, which results in expansion of the coverage of the terminal.

An access channel generator 157 processes information to be transmitted through the reverse access channel and transmits the processed information to the base station. The access channel signal message is composed of all the information and the control messages of the terminal that the base station requires before allocation of the traffic channel.

A fundamental channel generator 159 processes information to be transmitted through the reverse fundamental channel and transmits the processed information to the base station. In operation, the information transmitted through the reverse fundamental channel is normally the voice signal. Further, the information transmitted through the reverse fundamental channel may include the various control messages (L3 signaling) used in the IS-95B Standard, in addition to the voice signal. Besides, the signal transmitted through the reverse fundamental channel may include the RLP frame and the MAC message, if necessary. In the reverse link, the power control information is transmitted through the pilot channel, not through the fundamental channel.

The fundamental channel has the data rate of 9.6 Kbps or 14.4 Kbps. As occasion demands, the fundamental channel may have variable rates which are 4.8 Kbps or 7.2 Kbps for ½ rate, 2.4 Kbps or 3.6 Kbps for ¼ rate, and 1.2 Kbps or 1.8 Kbps for ⅛ rate. In this case, it is necessary that the receiver can detect the variation of the data rate. The reverse fundamental channel generator 159 discriminates the channels by spreading the fundamental channel signal by using the orthogonal codes allocated to the respective channels, and discriminates the users by the PN codes allocated the respective users. Here, since the orthogonal code is used to distinguish the channels, the pilot channel, the access channel, the dedicated control channel, the fundamental channel and the supplemental channel use the different orthogonal codes, and all the users share the same orthogonal codes for the same channels. For example, to distinguish the fundamental channel, all the users use the same orthogonal code.

A supplemental channel generator 161 processes information to be transmitted through the reverse supplemental channel and transmits the processed information to the base station. The information transmitted through the reverse supplemental channel includes the RLP frame and the packet data. The supplemental channel generator 161 has the data rate of over 9.6 Kbps. Further, the supplemental channel generator 161 has the scheduled rate at which the base station negotiates with the terminal to communicate with each other at the data rate that the base station determined. The reverse supplemental channel generator 161 spreads the signals by using the predetermined orthogonal code allocated to the respective channels for classifying reverse link channels. Here, the fundamental channel and the supplemental channel are the traffic channel.

Summer 163 sums the transmission signals output from the dedicated control channel generator 153 and the pilot channel generator 155. Summer 165 sums the transmission signals output from the access channel generator 157, the fundamental channel generator 159 and the supplemental channel generator 161. Spreader 167 spreads the transmission signals output from the summers 163 and 165 by multiplying the transmission signals by the spread sequence. The spreaded signals are up-converted to the radio frequency. A receiver 169 converts the respective channel signals received from the base station through the forward link to the baseband signal and despreads the converted channel signals by multiplying them by the spread sequence. FIG. 1 has omitted the detailed structure of the channel receivers of the forward link.

As illustrated in FIG. 1, in the CDMA communication system according to the present invention, the base station includes the controller 101 for controlling all the channels, the dedicated control channel generator 103 for processing the signals transmitted to the respective channels, the pilot channel generator 105, the sync channel generator 107, the paging channel generator 109, the fundamental channel generator 111 and the supplemental channel generator 113. The terminal includes the controller 151, the dedicated control channel generator 153, the pilot channel generator 155, the access channel generator 157, the fundamental channel generator 159 and the supplemental channel generator 161. Regarding the outputs of the respective channel generators, outputs from the dedicated control channel generator 103, the fundamental channel generator 111 and the supplemental channel generator 113 are divided into the I-channel component and the Q-channel component. However, the pilot channel generator 105, the sync channel generator 107 and the paging channel generator 109 each generate a single channel component, e.g., the I-channel component.

Unlike the channels of the base station, the channels of the terminal output the single channel component. That is, the summer 163 sums the outputs of the dedicated control channel generator 153 and the pilot channel generator 155 and applies an output thereof to the I-channel of the spreader 167. The summer 165 sums the outputs of the other channel generators 157, 159 and 161, and applies an output thereof to the Q-channel of the spreader 167. The access channel generator 157 generates its output before allocation of the traffic channel. Therefore, when the access channel is in use, the output of the pilot channel generator 155 is input to the I-channel and the output of the access channel generator 157 is input to the Q-channel.

Reference will be made to embodiments of the present invention with reference to FIGS. 2 to 12 for respective channel generators and further reference will be made to operation of respective channels with reference to FIGS. 1 and 14 to 21 for a procedure of performing various services.

Figure 2A:
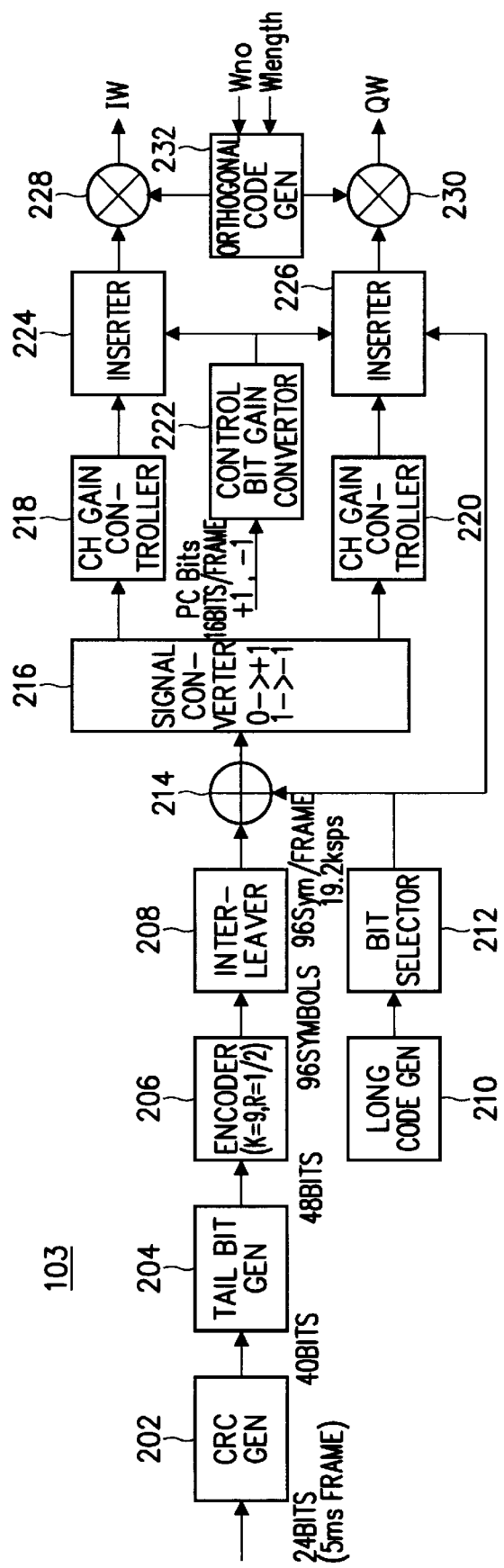
FIGS. 2A and 2B are detailed block diagrams of a forward dedicated channel generator (103) of FIG. 1.
Figure 2B:
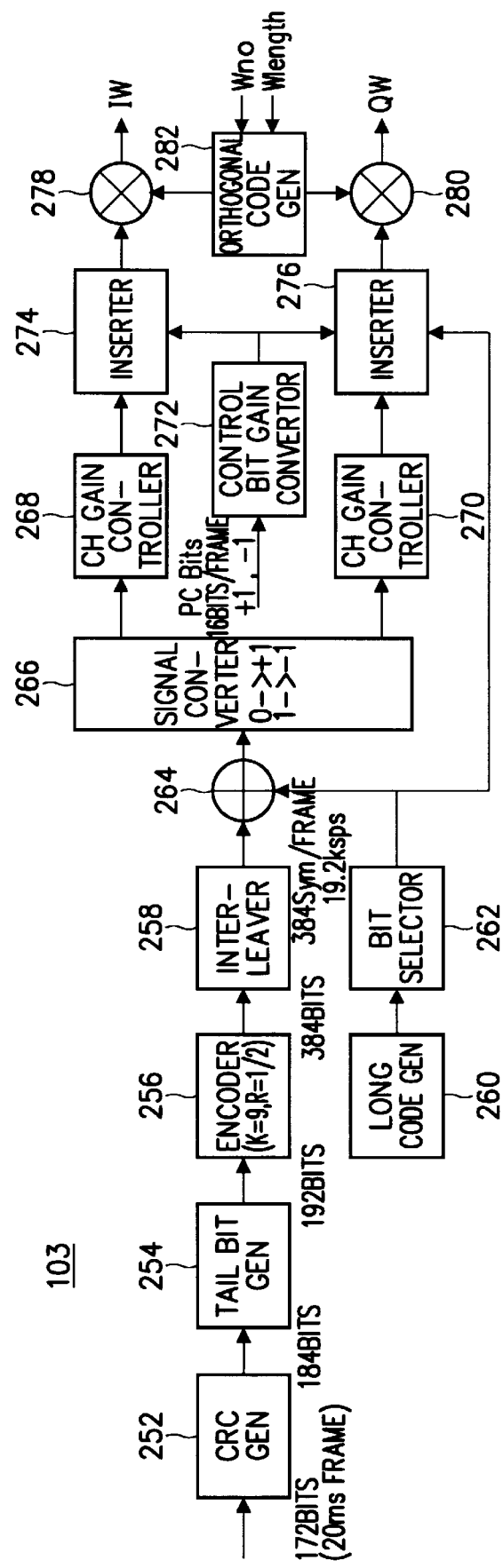

FIGS. 2A and 2B show the detailed block diagram of the forward dedicated control channel generator 103. The forward dedicated control channel generator 103 uses the frame with the variable length. FIG. 2A shows the forward dedicated control channel generator 103 which receives the control message of a first frame, and FIG. 2B shows the forward dedicated control channel generator 103 which receives the control message of a second frame. Here, the first and second frames are 5 ms and 20 ms long, respectively. Further, the 5 ms frame (the first frame) is composed of 24 bits, and the 20 ms frame (the second frame) is composed of 172 bits. In addition, the coding rate is 2.

Referring to FIG. 2A, a CRC (Cyclic Redundancy Check) generator 202 generates 16-bit CRC, adds it to the received 24-bit control data of the 5 ms frame, and thus outputs 40-bit data. A tail bit generator 204 generates 8 tail bits for indicating an end of the control message of the 5 ms frame, adds the generated tail bits to the output of the CRC generator 202, and thus outputs 48-bit data.

An encoder (or channel encoder and puncturing part) 206 encodes the output of tail bit generator 204. The encoder 206 may be a convolutional encoder or a turbo encoder having a coding rate R=½ and a constraint length K=9. Then, the encoder, 206 outputs 96 symbols. An interleaver 208 interleaves the symbols from the encoder 206. Here, the interleaver 208 may be a block interleaver, and outputs 96 symbols per 5 ms frame at the data rate of 19.2 Kbps.

A long code generator 210 generates long codes that are user specific codes allocated to the respective subscribers. A bit selector 212 decimates the long codes so as to match a data rate of the long code with that of the symbols output from the interleaver 208, and generates a selection signal for determining an insert position of the control bit. Here, the control bit may be a power control bit (PCB). An exclusive OR operator 214 exclusively ORs the encoded symbols output from the interleave 208 and the long codes output from the bit selector 212.

A signal converter (or MUX & signal point mapping part) 216 demultiplexes the data output from the exclusive OR operator 214 into an I channel signal (first channel signal) and a Q channel signal (second channel signal). Further, the signal converter 216 converts the level of the symbol data by changing O0O to 0+1O and O1O to O−1O. A channel gain controller 218 controls a gain of the first channel signal output from the signal converter 216 according to a gain control signal. A channel gain controller 220 controls a gain of the second channel signal output from the signal converter 216 according to the gain control signal.

A control bit gain controller 222 receives a control bit to be inserted into the dedicated control channel and controls a gain of the control bit according to the gain control signal.

Here, the control bits are generated by 16 bits per frame. If the control bit is the power control bit, the control bit is generated as O+1O or O−1O to increase or decrease the power of the terminal. An inserter 224 receives the outputs of the channel gain controller 218 and the control bit gain controller 222, outputs the first channel signal output from the channel gain controller 218, and inserts the control bit output from the control bit gain controller 222 at intervals of N symbols according to the selection of the bit selector 212. An inserter 226 receives the outputs of the channel gain controller 220 and the control bit gain controller 222, outputs the second channel signal output from the channel gain controller 220, and inserts the control bit output from the control bit gain controller 222 at intervals of N symbols according to the selection of the bit selector 212. If N=12, the inserters 224 and 226 insert the control bits in the first and second channel signals every 12 symbols. The bit selector 212 generates the selection signal for selecting symbol insert positions of the inserters 224 and 226. The control bit can be inserted at regular intervals or at pseudo random. In the embodiment, the control bit is inserted at pseudo random by using a specified lower bit value of the long codes.

An orthogonal code generator 232 generates orthogonal codes according to an orthogonal code number Wno and an orthogonal code length Wlength. Here, the orthogonal code may be the Walsh code or the quasi-orthogonal code. A multiplier 228 generates the orthogonally modulated first channel signal IW by multiplying the first channel signal output from the first inserter 224 by the orthogonal code. A multiplier 230 generates the orthogonally modulated second channel signal QW by multiplying the second channel signal output from the second inserter 226 by the orthogonal code.

Referring to FIG. 2B, a CRC generator 252 generates 12-bit CRC and adds it to the 172-bit control data of the received 20 ms frame message, thus outputting 184-bit data. A tail bit generator 254 generates 8 tail bits for indicating an end of the control message of the 20 ms frame and adds them to the output of the CRC generator 252, thus outputting 192-bit data.

An encoder (or channel encoder and puncturing part) 256 encodes the control message of the 20 ms frame output from tail bit generator 254. The encoder 256 may be the convolutional encoder or the turbo encoder having a coding rate R=½ and the constraint length K=9. Then, the encoder 256 outputs 384 symbols. An interleave 258 interleaves the symbol data output from the encoder 256. Here, the interleave 258 may be a block interleave and outputs 384 symbols per 20 ms frame at the data rate of 19.2 Kbps.

A long code generator 260 generates long codes which are the user specific codes allocated for the respective users. A bit selector 262 decimates the long code so as to match the data rate of the long code with that of the symbols output from the interleave 258, and generates a selection signal for determining an insert position of the control bit. Here, the control bit may be the power control bit (PCB). An exclusive OR operator 264 exclusively ORs the encoded symbols output from the interleave 258 and the long codes output from the bit selector 262.

A signal converter (or MUX & signal point mapping part) 266 demultiplexes the data output from the exclusive OR operator 264 into an I channel signal (first channel signal) and a Q channel signal (second channel signal). Further, the signal converter 266 converts the level of the symbol data by converting O0O to 0+1O and O1O to O−1O. A channel gain controller 268 controls a gain of the first channel signal input from the signal converter 266 according to the gain control signal. A channel gain controller 270 controls a gain of the second channel signal input from the signal converter 266 according to the gain control signal.

A control bit gain controller 272 receives a control bit to be inserted into the dedicated control channel and controls a gain of the control bit according to the gain control signal. Here, the control bits are generated by 16 bits per frame. If the control bit is the power control bit, it is generated as O+1O or O–1O to increase or decrease the power of the terminal. An inserter 274 receives the outputs of the channel gain controller 268 and the control bit gain controller 272, outputs the channel signal output from the channel gain controller 268, and inserts the control bit output from the control bit gain controller 272 at intervals of N symbols according to the selection signal output from the bit selector 262. An inserter 276 receives the outputs of the channel gain controller 270 and the control bit gain controller 272, outputs the second channel signal output from the channel gain controller 270, and inserts the control bit output from the control bit gain controller 272 at intervals of N symbols according to the selection signal output from the bit selector 262. Here, when N is 12, the inserters 274 and 276 insert the control bit into the corresponding channel signal every 12 bits. The bit selector 262 generates the selection signal for selecting the symbol insert positions of the inserters 224 and 226, and the control bit can be inserted at regular intervals or at pseudo random. In the embodiment, the control bits are inserted at pseudo random by using a specified lower bit value of the long codes.

An orthogonal code generator 282 generates orthogonal codes according to an orthogonal code number Wno and an orthogonal code length Wlength. Here, the orthogonal code may be the Walsh code or the quasi-orthogonal code. A multiplier 278 generates the orthogonally modulated first channel signal IW by multiplying the first channel signal output from the first inserter 274 by the orthogonal code output from the orthogonal code generator 282. A multiplier 280 generates the orthogonally modulated second channel signal QW by multiplying the second channel signal output from the second inserter 276 by the orthogonal code output from the orthogonal code generator 282.

Now, reference will be made to the operation of the forward dedicated control channel generator 103 with reference to FIGS. 2A and 2B. In IS-95 CDMA communication system, the frame size is fixed to 20 ms. However, the control message for allocating and releasing the channels during communication should have the fast response time. Therefore, when using the second control message with the fixed frame length of 20 ms in allocating and releasing the channels, the communication system may undergo a serious delay due to the long response time. To solve this problem, in the embodiment, the control message with 5 ms frame is used for the urgent control message for allocating and releasing the channels, and the control message with 20 ms frame is used for the normal control messages for controlling the handover, the location registration and the call control. In another embodiment of the present invention, the communication system may use the control message having either the first frame of 5 ms or the second frame message of 20 ms according to the length of the messages to be processed.

The control message having the first frame length of 5 ms contains information representing the channel allocation signal and the channel number, bit rate, duration and start time of the channel to be allocated. The CRC generators 202 and 252 add the CRC bits to the input signal to enable the receiver to judge the frame quality. If the input signal has the frame length of 5 ms, the CRC generator 202 adds 16 CRC bits to the input signal. If the input signal has the frame length of 20 ms, the CRC generator 252 adds 12 CRC bits to the input signal.

The tail bit generators 204 and 254, receiving the control messages to which the CRC bits are added, generate tail bits and add the generated tail bits to the next position of the CRC bits. Here, the tail bit generators 204 and 254 both generate 8 tail bits regardless of the frame length. The tail bits, indicating the end of the received control message frame, are added to initialize the encoders 206 and 256 connected to the rear stages of the tail bit generators 204 and 254.

Assume that the encoders 206 and 256 are convolutional encoder having the constraint length K=9 and the coding rate R=½. The interleavers 208 and 258 interleave the symbol data output from the encoders 206 and 256 by changing the symbol arrangement in the frame unit, in order to improve a tolerance for the burst error. The long code generators 210 and 260 generate the long codes which are differently allocated to the respective users. The long codes serve to scramble the user information. The bit selectors 212 and 262 select output bits of long codes output from the long code generators 210 and 260 so as to match the bit rate of the long codes with that of the output bits of the interleavers 208 and 258. The exclusive OR operators 214 and 264 exclusively OR the interleaved signals output from the interleavers 208 and 258 and the selected long codes output from the bit selectors 212 and 262.

The signal converters 216 and 266 divides the output signals of the exclusive OR operators 214 and 264 into the I channel signal and Q channel signal, and converts the level of the transmission signals. That is, the transmission signal of O1O is changed to O–1O, and the transmission signal of O0O is changed to O+1O. The channel gain controllers 218, 220, 268 and 270, which are data channel gain adders, add the gains according to the power control to the input signals. The control bit gain controllers 222 and 272 control the power control gains of the control bits output from the upper layer entity. Each of the inserters 224, 226, 274 and 276 adds one power control symbol to the 12 data bits of the corresponding channel. Here, the power control bits are added to the dedicated control channel according to the services provided. In the forward link, the power control bits may be added to the dedicated control channel or the fundamental channel. Detailed descriptions for this will be given later.

The multipliers 228, 230, 278 and 280 multiply the received channel signals by the orthogonal codes output from the orthogonal code generators 232 and 282. The orthogonal codes used in the forward dedicated control channel are selected among the orthogonal codes that are not allocated to the dedicated channel (i.e. the dedicated control channel the fundamental channel and the supplemental channel) and the common channel (i.e. the pilot channel, the sync channel and the paging channel. Here, the Walsh codes or the quasi-orthogonal codes may be used for the orthogonal codes.

Figure 3A:
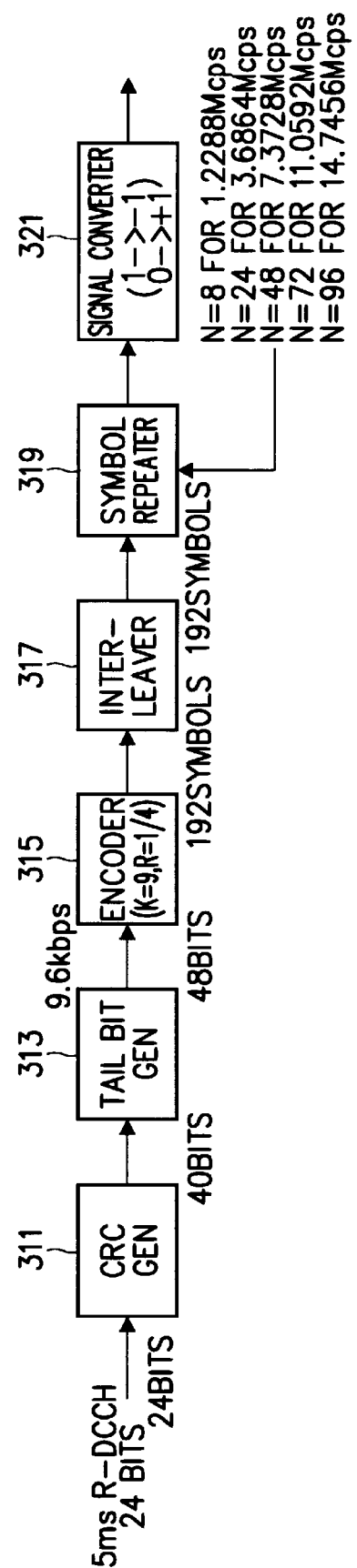
FIGS. 3A and 3B are detailed block diagrams of a reverse dedicated channel generator (153) of FIG. 1.
Figure 3B:
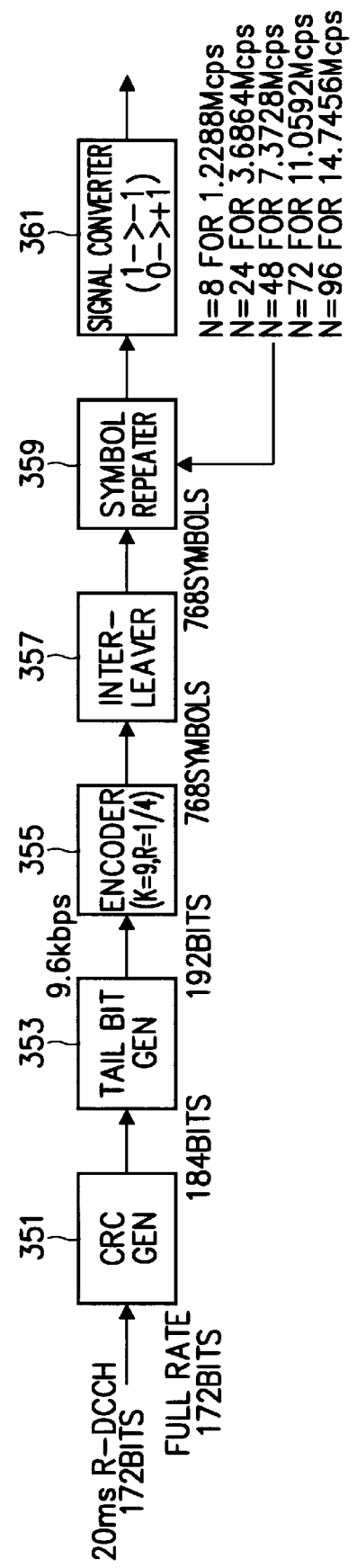

FIGS. 3A and 3B show the reverse dedicated control channel generator 153 for transmitting the 5 ms frame and the reverse dedicated control channel generator 153 for generating the 20 ms frame, respectively.

Referring to FIG. 3A, a CRC generator 311 generates 16 CRC bits and adds them to the received 24-bit control data of the 5 ms frame. The CRC generator 311 outputs 40 data bits by adding 16 CRC bits to the 24-bit control data. A tail bit generator 313 generates 8 tail bits for indicating the end of the control message of 5 ms frame, and adds the tail bits to the 40-bit data output from the CRC generator 311, thus outputting 48-bit data.

An encoder 315 encodes the control message output from the tail bit generator 313. The convolutional encoder or the turbo encoder may be used for the encoder 315. Assume that the encoder 315 is the convolutional encoder having the coding rate R=¼ and the constraint length K=9. In such a case, the encoder 315 outputs 192 symbols. An interleave 317 interleaves the output of the encoder 315. A block interleave may be used for the interleave 317. A symbol repeater 319 repeats the symbol data output from the interleave 317. Here, the symbol repeater 317 outputs the symbol data at 1.2288 Mcps (chip per second) for the symbol repetition number N=8, at 3.6864 Mcps for N=24, at 7.3728 Mcps for N=48, at 11.0592 Mcps for N=72, and at 14.7456 Mcps for N=96. A signal converter 321 converts the level of the symbols output from the symbol repeater 319 by changing O0O to O+1O and O0O to O−1O.

Referring to FIG. 3B, a CRC generator 351 generates 12 CRC bits and adds them to the received 172-bit control data of the second control message of the 20 ms frame. The CRC generator 351 outputs 184 data bits by adding 12 CRC bits to the 172 bit control data. A tail bit generator 353 generates 8 tail bits for indicating the end of the second control message of the 20 ms frame, and adds the tail bits to the 184-bit data output from the CRC generator 351, thus outputting 192-bit data.

An encoder 355 encodes the second frame control message output from the tail bit generator 353. The convolutional encoder or the turbo encoder may be used for the encoder 355. Assume that the encoder 355 is the convolutional encoder having the coding rate R=¼ and the constraint length K=9. In such a case, the encoder 355 outputs 768 symbols. An interleave 357 interleaves the output of the encoder 355. A block interleave may be used for the interleave 357. A symbol repeater 359 repeats the symbol data output from the interleave 357. Here, the symbol repeater 357 outputs the symbol data at 1.2288 Mcps for the symbol repetition number N=8, at 3.6864 Mcps for N=24, at 7.3728 Mcps for N=48, at 11.0592 Mcps for N=72, and at 14.7456 Mcps for N=96. A signal converter 361 converts the level of the symbols output from the symbol repeater 359 by changing O0O to O+1O and O1O to O−1O.

The forward and reverse dedicated control channels of the invention can transmit the control message in a discontinuous transmission mode by the control of the controller 101, in case it is not necessary to transmit the control message.

The reverse dedicated control channel generator 153 as shown having the same structure as that of FIGS. 3A and 3B has the same operation except that the CRC generators 311 and 351 generate CRC bits for the corresponding frame messages, respectively. Further, assuming that the embodiment of the present invention transmits the reverse power control bit by using the pilot channel, the reverse dedicated control channel generator 153 may not need a separate structure for adding the power control bits separately. Accordingly, the tail bit generators 313 and 353, the encoders 315 and 355, and the interleavers 317 and 357 operate in the same manner as described above. Further, the symbol repeaters 319 and 359 repeat the symbols N times according to the respective data rates, and the signal converters 321 and 361 convert the level of the repeated symbols output from the symbol repeaters 319 and 359.

The forward dedicated control channel generator 103, constructed as shown in FIGS. 2A and 2B, and the reverse dedicated control channel generator 153, constructed as shown in FIGS. 3A and 3B, transmit the control messages or stop the transmission according to existence/nonexistence of the control messages to be transmitted. That is, the dedicated control channel generators 103 and 153 transmit the control message in the discontinuous transmission mode (DTX), which is disclosed in detail in Korean Patent application No. 4498/1998 and corresponding U.S. patent application Ser. No. 09/250,662 (U.S. Publication No. 6,438,119, published Aug. 20, 2002) filed by the applicant of this invention. Essentially, the signal converter 216 converts a transmission signal by converting a transmission signal of the logic "1" to "−1" and a transmission signal of the logic "0" to "+1". The gain controller 218 or 220, forms or blocks a path for the control message, being transmitted, of the dedicated control channel according to a gain control signal. That is, the gain controller 218 or 220 performs a DTX (Discontinuous Transmission) mode of operation, in which the path of the dedicated control channel is formed according to the gain control signal when there is the control message to transmit, and the path of the dedicated control channel is blocked when there is no control message to transmit.

Figure 4A:
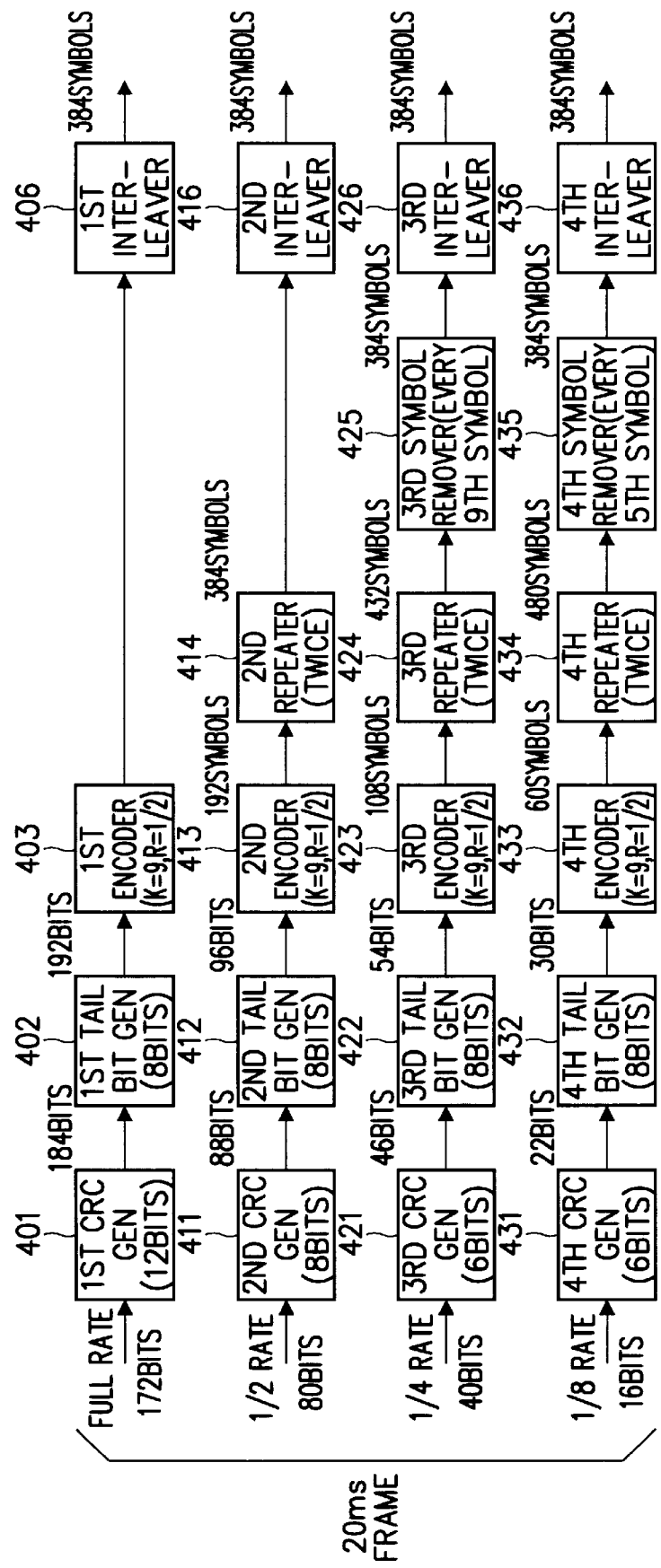
FIGS. 4A to 4C are detailed block diagrams of a forward fundamental channel generator (111) of FIG. 1.
Figure 4B:
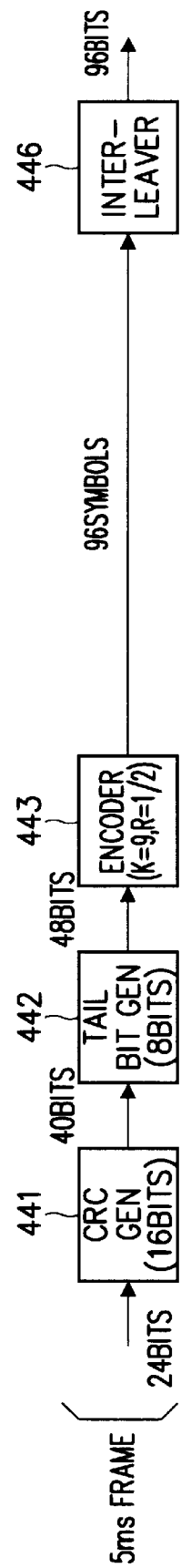
Figure 4C:
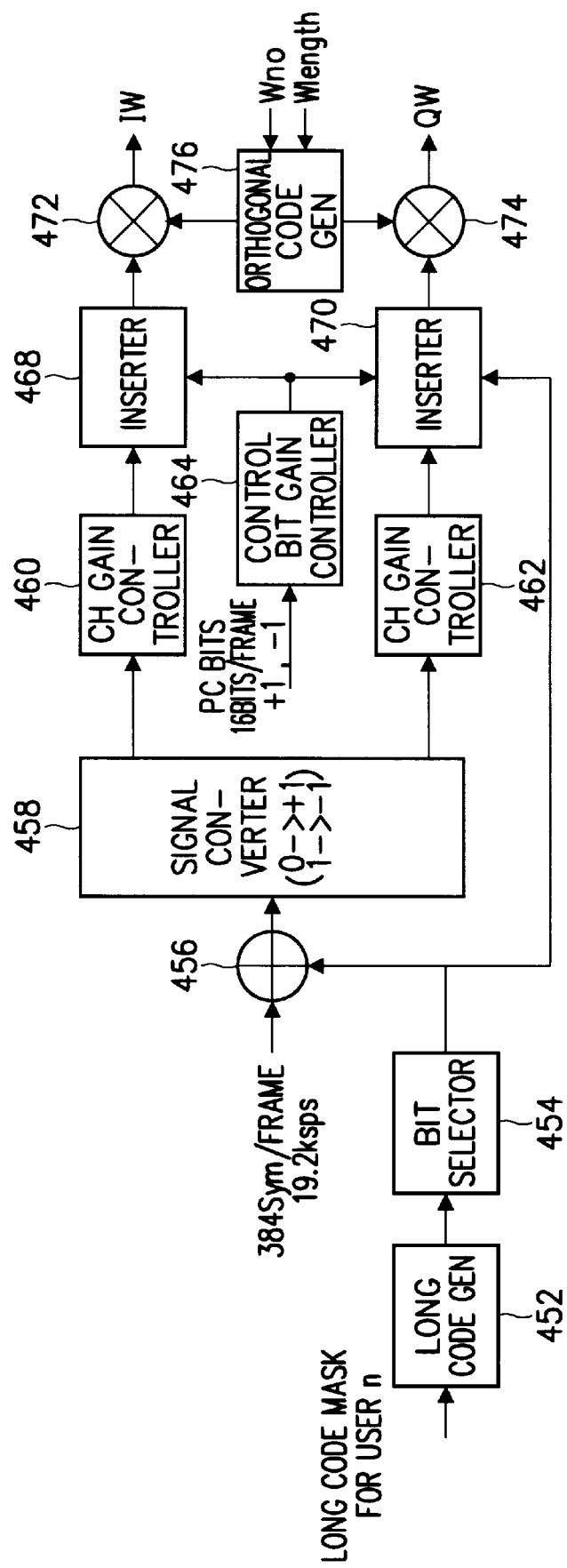

FIGS. 4A to 4C illustrate the structures of the forward fundamental channel generator 111 according to the data rates and the frame lengths.

The forward fundamental channel generator 111 shown in FIG. 4A receives data with the second frame length of 20 ms at four different data rates. Here, assume that the frame data of first to fourth data rates are 172-bit data of full-rate, 80-bit data of 2 rate, 40-bit data of ¼ rate, and 24-bit data of ⅛ rate, respectively.

Referring to FIG. 4A, CRC generators 401, 411, 421 and 431 add 12, 8, 6 and 6 CRC data bits to the input data, respectively. To be concrete, the CRC generator 401 adds 12 CRC bits to the 172-bit data of the first rate to output 184 bits, the CRC generator 411 adds 8 CRC bits to 80-bit data of the second rate to output 88 bits, the CRC generator 421 adds 6 CRC bits to the 40-bit data of the third rate to output 46 bits, and the CRC generator 431 adds 6 CRC bits to the 16-bit data of the fourth rate to output 22 bits.

First to fourth tail bit generators 402, 412, 422 and 432 add 8 tail bits to the outputs of the CRC generators 401, 411, 421 and 431, respectively. Thus, the first tail bit generator 402 outputs 192 bits, the second tail bit generator 412 outputs 96 bits, the third tail bit generator 422 outputs 54 bits, and the fourth tail bit generator 432 outputs 30 bits.

First to fourth encoders 403, 413, 423 and 433 encode the outputs of the first to fourth tail bit generators 402, 412, 422 and 432, respectively. For the first to fourth encoders 403, 413, 423 and 433, the K=9, R=½ convolutional encoder may be used. In such a case, the first encoder 403 encodes the 192-bit data output from the first tail bit generator 402 and outputs 384 symbols at the full rate. The second encoder 413 encodes the 96-bit data output from the second tail bit generator 412 and outputs 192 symbols at 2 rate. The third encoder 423 encodes the 54-bit data output from the third tail bit generator 422 and outputs 108 symbols at ¼ rate. The fourth encoder 433 encodes the 30-bit data output from the fourth tail bit generator 432 and outputs 60 symbols at ⅛ rate.

Second to fourth repeaters 414, 424 and 434 repeat the symbols output from the second to fourth encoders 413, 423 and 433 twice, four times and eight times, respectively, so as to match the corresponding symbol numbers with the symbol number of the full rate. Third and fourth symbol removers 425 and 435 delete the symbols which are repeated, exceeding the symbol number of the full rate, in the third and fourth repeaters 424 and 434. In other words, the second to fourth repeaters 414, 424 and 434 repeat the input symbols to match the symbol number with the symbol number at the full rate (i.e., 384 symbols). When the symbol numbers repeated in the repeaters 424 and 434 exceed the symbol number at the full rate, the symbol removers 425 and 435 delete the symbols to adjust their output symbol numbers to the symbol number at the full rate. Since the number of symbols output from the second encoder 413 is 192 which is half the number of the symbols output from the first encoder 403, the second repeater 414 repeats the received symbols twice to output 384 symbols. Similarly, since the number of the symbols output from the third encoder 423 is 108 which is approximately ¼ the number of the symbols output from the first encoder 403, the third repeater 424 repeats the received symbols four times to output 432 symbols, which is larger in number than the 384 full-rate symbols. To adjust the 432 symbols to the 384 symbols, the third symbol remover 425 deletes every ninth symbol from the 432 symbols output. Further, since the number of the symbols output from the fourth encoder 434 is 60 which is approximately ⅛ the number of the symbols output from the first encoder 403, the fourth repeater 434 repeats the received symbols eight times to output 480 symbols, which is larger in number than the 384 full-rate symbols. To adjust the 480 symbols to the 384 symbols, the fourth symbol remover 435 deletes every fifth symbol from the 480 symbols.

First to fourth interleavers 406, 416, 426 and 436 interleave the 384 full-rate symbols output from the first encoder 403, the second repeater 414, the third symbol remover 425 and the fourth symbol remover 435, respectively, and uniformly distribute the same symbols to the different carriers. The interleavers 406, 416, 426 and 436 satisfy the condition for uniformly distributing the encoded data. The embodiment of the present invention uses the block interleave or the random interleave. The interleavers 406, 416, 426 and 436 output 384 symbols per frame at the data rate of 19.2 Kpbs.

FIG. 4B shows the structure for receiving data with the first frame length of 5 ms in the forward fundamental channel generator 111. Referring to FIG. 4B, a CRC generator 441 adds 16 CRC bits to the received 24-bit data with the first frame length to output 40 bits. A tail bit generator 442 generates 8 tail bits for indicating the end of the first frame data of the 5 ms frame length, and adds the 8 tail bits to the 5 ms frame data output of the CRC generator 441. The tail bit generator 442 outputs 48 bits by adding the 8 tail bits to the 40-bit data output from the CRC generator 441.

An encoder 443 encodes the 5 ms frame data output from the tail bit generator 442. A convolutional encoder or a turbo encoder may be used for the encoder 443. Here, the encoder 443 has the coding rate R=½ and the constraint length K=9. In such a case, the encoder 443 outputs 96 symbols. An interleave 446 interleaves the output of the encoder 443. Here, a block interleave may be used for the interleave 446. Therefore, the device of FIG. 4B receives the 5 ms frame data input and outputs 96 symbols at the data rate of 19.2 Kbps.

FIG. 4C shows the structure of an output stage of the forward fundamental channel generator 111 1, which outputs the fundamental channel data generated in FIGS. 4A and 4B. Referring to FIG. 4C, a long code generator 452 generates the long codes which are the identification codes for the subscribers. A bit selector 454 decimates the long codes to match the data rate of the long code with the data rate of the symbols output from the corresponding one of the interleavers 406, 416, 426, 436 and 446, and generates a selection signal for determining an insert position of the control bit which may be the power control bit. An exclusive OR operator 456 exclusively ORs the long codes output from the bit selector 454 and the interleaved symbols output from the interleavers 406, 416, 426, 436 and 446.

A signal converter 458 demultiplexes the output data of the exclusive OR operator 456 into a first channel signal (I channel signal) and a second channel signal (Q channel signal so as to separately transmit the data through the I channel and the Q channel. Further, the signal converter 458 converts the level of the symbols, by changing the level O0O to O+1O and the level O1O to O−1O. A channel gain controller 460 controls a gain of the I channel signal output from the signal converter 458 according to a gain control signal, and a channel gain controller 462 controls a gain of the Q channel signal output from the signal converter 458 according to the gain control signal.

A control bit gain controller 464 receives the control bit to be inserted into the dedicated control channel and control a gain of the control bit according to the gain control signal. Here, the control bits are generated so as to insert 16 bits per frame. When the control bit is the power control bit, the control bit is generated as O+1O or O−1O to increase or decrease the power of the terminal. An inserter 468 receives the outputs of the I channel gain controller 460 and the control bit gain controller 464, and inserts the control bit output from the control bit gain controller 464, generated at intervals of N symbols by the selection of the bit selector 454, into the I channel signal output from the I channel gain controller 460. An inserter 470 receives the outputs of the Q channel gain controller 462 and the control bit gain controller 464, and inserts the control bit output from the control bit gain controller 464, generated at intervals of N symbols by the selection of the bit selector 454, into the Q channel signal output from the Q channel gain controller 462. Here, with N=12, the inserters 468 and 470 insert the control bits into the I and Q channel signals at intervals of 12 symbols, respectively the bits selector 454 generates the selection signal for selecting the insert positions of the symbols in the inserters 468 and 470. The insert positions of the control bits may be periodical or may be changed at pseudo random. The embodiment of the present invention inserts the control bit at pseudo random by using the specified lower bits of the long code.

An orthogonal code generator 476 generates the orthogonal code according to the orthogonal code number Wno and the orthogonal code length Wlength. Here, the orthogonal code may be the Walsh code or the quasi-orthogonal code. A multiplier 472 multiplies the I channel signal output from the inserter 468 by the orthogonal code output from the orthogonal code generator 476 to generate the orthogonally modulated I channel signal IW. A multiplier 474 multiplies the Q channel signal output from the inserter 470 by the orthogonal code output from the orthogonal code generator 476 to generate the orthogonally modulated Q channel signal QW.

As illustrated in FIGS. 4A to 4C, the forward fundamental channel generator 111 receives 20 ms frame data or 5 ms frame data, and the 20 ms frame data has four different data rates. Here, in the case that the fundamental channel generator 111 uses the 5 ms frame data as shown in FIG. 4B, the fundamental channel generator 111 can be used as a control channel transmitter to provide the data communication service using the supplemental channel described hereinbelow. Here, since the signal for allocating and releasing the supplemental channel should be processed fast though it has the small amount of the control message to be transmitted, the signal may be transmitted in the 5 ms frame. The CRC generators, the tail bit generators, the encoders and the interleavers have the constructions and operations as described heretofore.

Further, in the forward link, the power control bit can be added to the dedicated control channel or the fundamental channel. Thus, the forward fundamental channel generator 111 can be constructed as shown in FIG. 4C, and when necessary, it is possible to transmit the power control bit by adding it to the fundamental channel.

Figure 5:
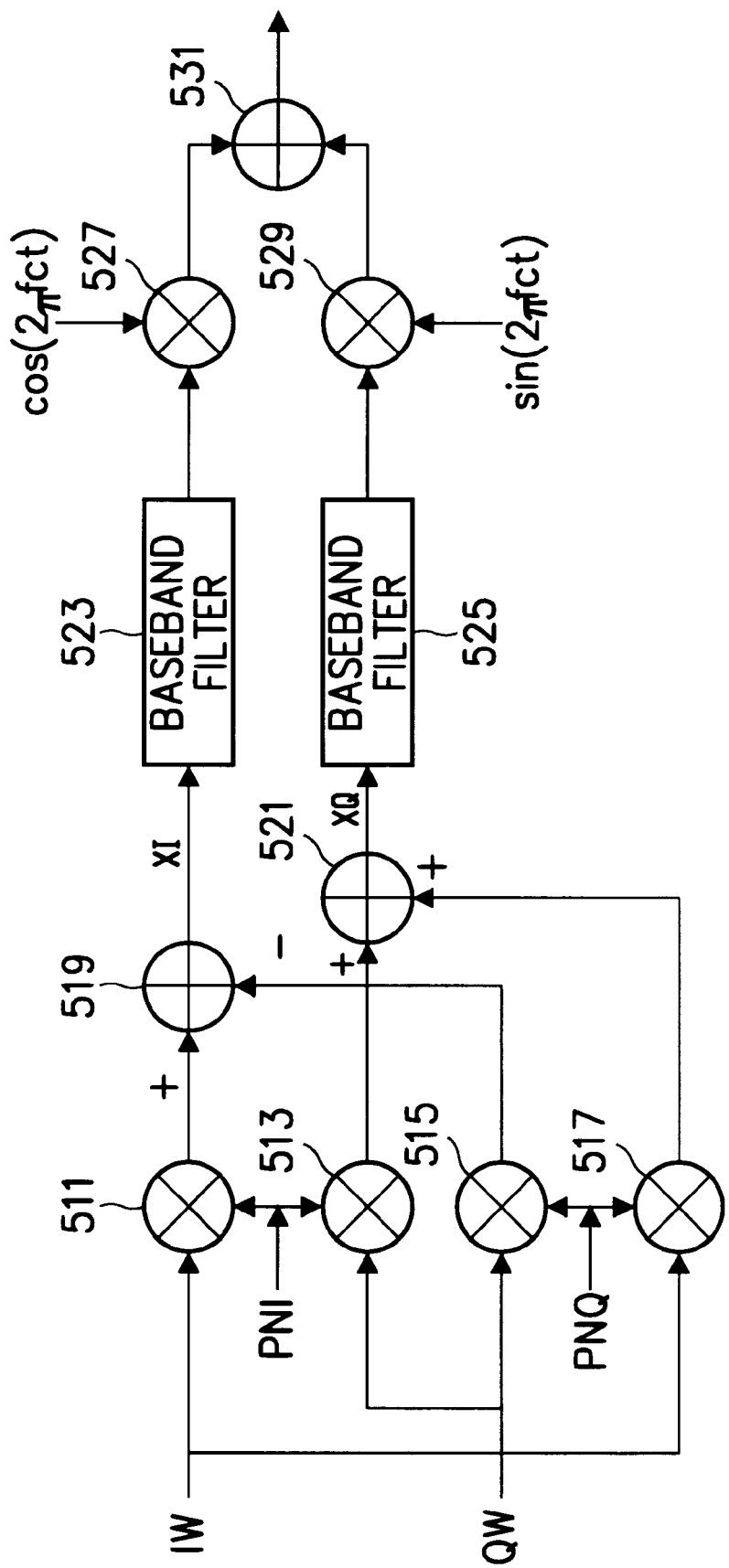
FIG. 5 is a diagram illustrating the structure of a spreader (119 and 167) for spreading transmission signals output from respective channel generators.

FIG. 5 shows the structure of the spreader 119 for spreading the signals generated from the respective channel generators. The spreader 119 shown in FIG. 5 is a complex QPSK (Quadriphase Phase Shift Keying) spreader.

Referring to FIG. 5, a multiplier 511 multiplies the orthogonally modulated I channel signal IW by the I channel spread sequence PNI, and a multiplier 513 multiplies the orthogonally modulated Q channel signal QW by the I channel spread sequence PNI. A multiplier 515 multiplies the orthogonally modulated Q channel signal QW by the Q channel spread sequence PNQ, and a multiplier 517 multiplies the orthogonally modulated I channel signal IW by the Q channel spread sequence PNQ. A subtractor 519 generates an I channel spread signal XI by subtracting the output of the multiplier 515 from the output of the multiplier 511, and an adder 521 generates a Q channel spread signal XQ by adding the output of the multiplier 517 to the output of the multiplier 513. As described, the spreader generates the I channel spread signal XI by subtracting the output of the multiplier 515 from the output of the multiplier 511, and generates the Q channel spread signal XQ by adding the output of the multiplier 517 to the output of the multiplier 513. A baseband filter 523 baseband filters the I channel spread signal output from the subtractor 519, and a baseband filter 525 baseband filters the Q channel spread signal output from the adder 521. A mixer 527 mixes the output of the baseband filter 523 with the I channel carrier cos(2 pfct) to generate an I channel RF (Radio Frequency) signal, and a mixer 529 mixes the output of the baseband filter 525 with the Q channel carrier sin(2 pfct) to generate a Q channel RF signal. An adder 531 adds the I and Q channel RF signals output from the mixers 527 and 529 to generate a transmission RF signal.

As described above, the spreader 119 spreads the received I and Q channel signals IW and QW by using the I and Q channel spread sequences PNI and PNQ.

Figure 6A:
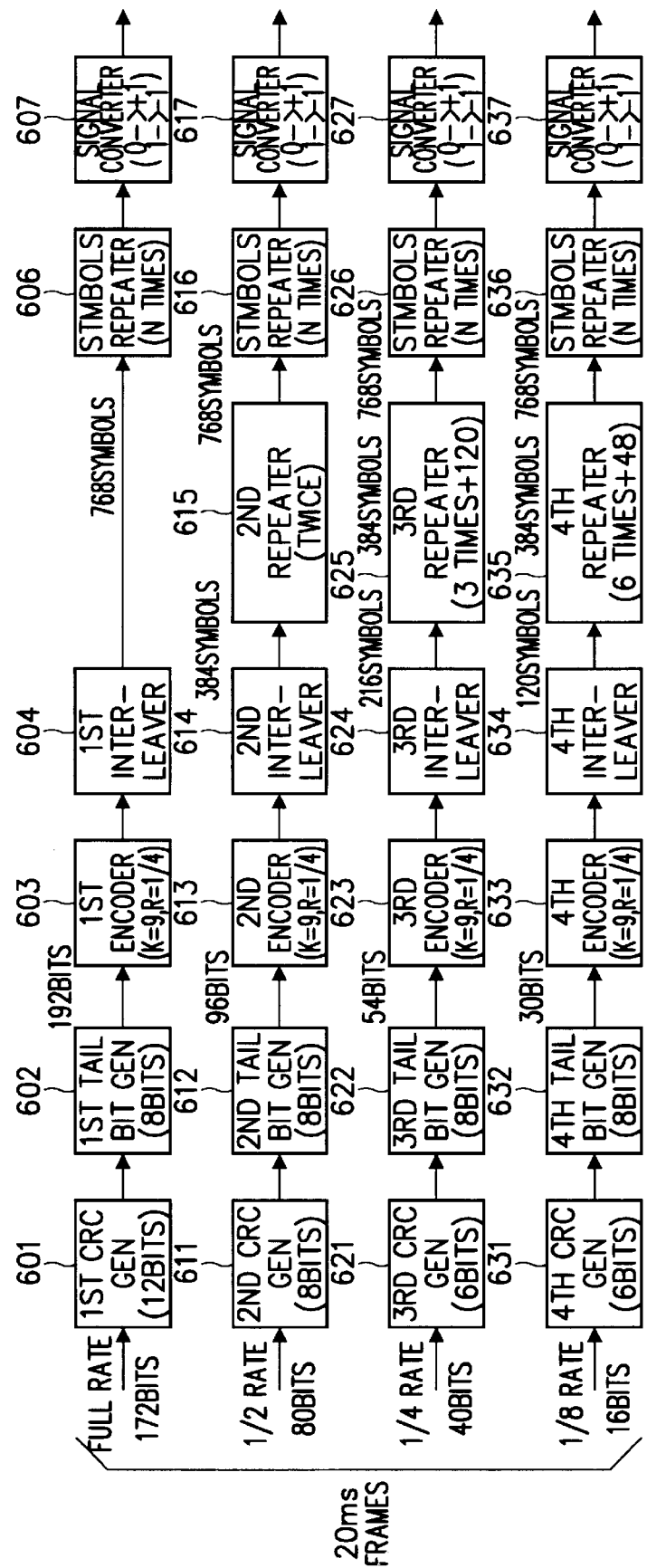
FIGS. 6A and 6B are detailed block diagrams of a reverse fundamental channel generator (159) of FIG. 1.
Figure 6B:
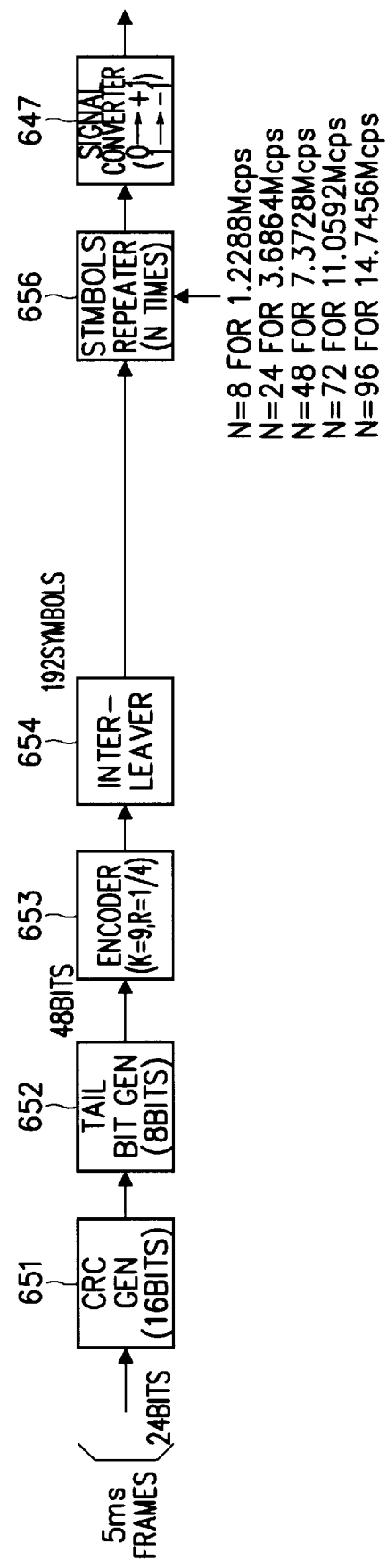

FIGS. 6A and 6B show the structure of the reverse fundamental channel generator 159 according to the data rates and the frame lengths.

The reverse fundamental channel generator 159 of FIG. 6A receives the 20 ms frame data at four different data rates, i.e., full rate, ½ rate, ¼ rate and ⅛ rate.

Referring to FIG. 6A, CRC generators 601, 611, 621 and 631 add 12, 8, 6 and 6 CRC data bits to the input data, respectively. To be concrete, the CRC generator 601 adds 12 CRC bits to the full rate 172-bit input data to output 184 bits, the CRC generator 611 adds 8 CRC bits to ½ rate 80-bit input data to output 88 bits, the CRC generator 621 adds 6 CRC bits to the ¼ rate 40-bit input data to output 46 bits, and the CRC generator 631 adds 6 CRC bits to the ⅛ rate 16-bit input data to output 22 bits.

First to fourth tail bit generators 602, 612, 622 and 632 add 8 tail bits to the outputs of the CRC generators 601, 611, 621 and 631, respectively. Thus, the first tail bit generator 602 outputs 192 bits, the second tail bit generator 612 outputs 96 bits, the third tail bit generator 622 outputs 54 bits, and the fourth tail bit generator 632 outputs 30 bits.

First to fourth encoders 603, 613, 623 and 633 encode the outputs of the first to fourth tail bit generators 602, 612, 622 and 632, respectively. The first to fourth encoders 603, 613, 623 and 633 may use the K=9, R=½ convolutional encoder. In such a case, the first encoder 603 encodes the 192-bit data output from the first tail bit generator 602 and outputs 768 symbols at the full rate. The second encoder 613 encodes the 96-bit data output from the second tail bit generator 612 and outputs 384 symbols at ½ rate. The third encoder 623 encodes the 54-bit data output from the third tail bit generator 622 and outputs 216 symbols at approximately ¼ rate. The fourth encoder 633 encodes the 30-bit data output from the fourth tail bit generator 632 and outputs 120 symbols at ⅛ rate.

First to fourth interleavers 604, 614, 624 and 634 interleave the encoded data output from the first to fourth encoders 603, 613, 623 and 633, respectively. The interleavers 604, 614, 624 and 634 satisfy the condition for uniformly distributing the encoded data. The block interleave or random interleave may be used for the interleavers.

A second repeater 615 repeats the symbols output from the block interleave 614 twice to output 768 symbols. A third repeater 625 repeats the symbols output from the block interleave 624 three times and adds thereto 120 symbols out of the repeated symbols to output 768 symbols. A fourth repeater 635 repeats the symbols output from the block interleave 634 six times and adds thereto 48 symbols out of the repeated symbols to output 768 symbols. The repeaters 615, 625 and 635 match the corresponding number of the encoded symbols with the number of the full-rate symbols.

Symbol repeater 606, 616, 626 and 636 repeat the outputs of the block interleave 604 and the repeaters 615, 625 and 635, N times, respectively. Therefore, the symbol repeaters output N*768 symbols per frame at the data rate of 19.2 Kbps. Signal converters 607, 617, 627 and 637 convert the level of the symbols output from the symbol repeaters 606, 616, 626 and 636, by changing O0O to O+1O and O1O to O−1O.

FIG. 6B shows the structure for receiving the data with 5 ms frame length in the reverse fundamental channel generator 159. Referring to FIG. 6B, a CRC generator 651 generates 16-bit CRC and adds the 16-bit CRC to the received 24-bit data with 5 ms frame length. The CRC generator 651 outputs 40 bits by adding the 16-bit CRC to the 24-bit input data. A tail bit generator 652 generates the 8 tail bits for indicating the end of the 5 ms frame message and adds it to the 5 ms frame data. The tail bit generator 652 outputs 48 bits by adding the 8 tail bits to the 40-bit data output from the CRC generator 651.

An encoder 653 encodes the 5 ms frame data output from the tail bit generator 652. The convolutional encoder or the turbo encoder may be used for the encoder 653. Here, assume that the encoder 653 is the K=9, R=½ convolutional encoder. Then, the encoder 653 outputs 192 symbols. An interleave 654 interleaves the output of the encoder 653. The block interleave may be used for the interleave 654. A symbol repeater 656 repeats 192 symbols output from the interleave 654 N times, where N=8 for 1.2288 Mcps, N=24 for 3.6864 Mcps, N=48 for 7.3728 Mcps, N=72 for 11.0592 Mcps and N=96 for 14.7456 Mcps. A signal converter 657 converts the level of the symbols output from the symbol repeater 656, by changing O0O to O+1O and O1O to O−1O.

Figure 7:
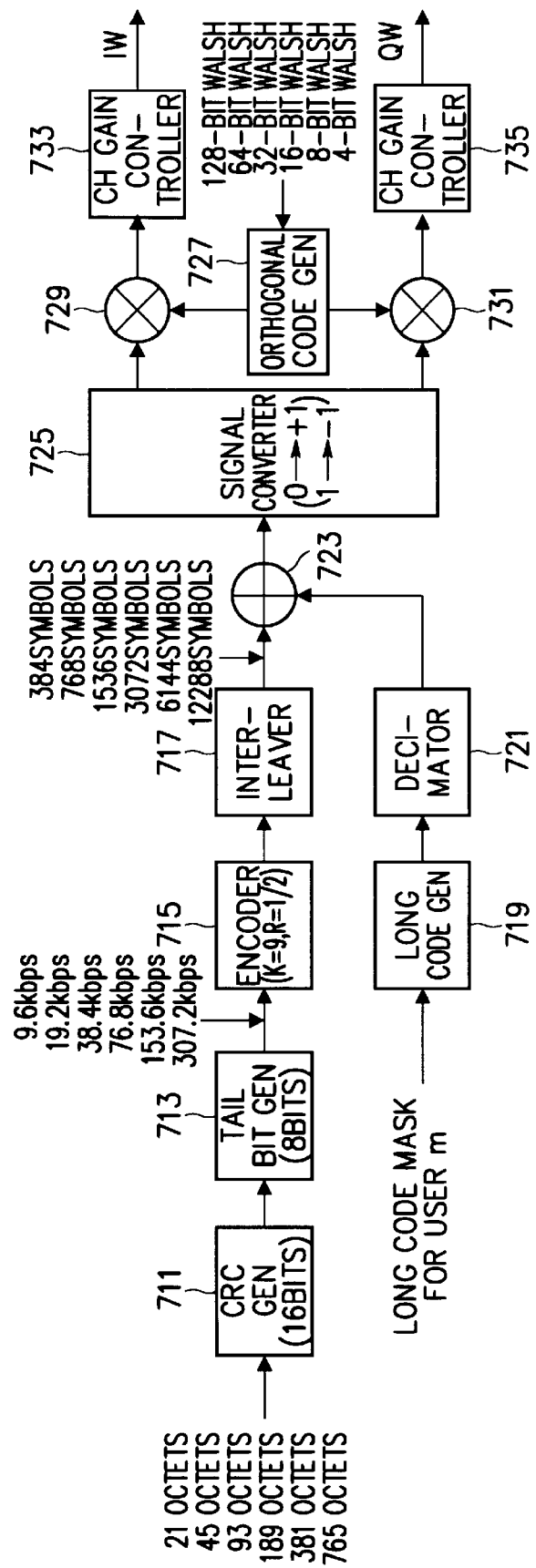
FIG. 7 is a detailed block diagram of a forward supplemental channel generator (113) of FIG. 1.

FIG. 7 shows the structure of the forward supplemental channel generator 113. Referring to FIG. 7, a CRC generator 711 generates 16-bit CRC for the received frame data and adds it to the received frame data which may be 21, 45, 93, 189, 381 and 765 octets. A tail bit generator 713 generates 8 tail bits for indicating the end of the received frame data and adds it to the output of the CRC generator 711. The output of the tail bit generator 713 has the data rates of 9.6 Kbps, 19.2 Kbps, 38.4 Kbps, 76.8 Kbps, 153.6 Kbps and 307.2 Kbps according to the input frame data. Accordingly, the frame data input to the forward supplemental channel generator 113 has different frame length according to the data rate.

An encoder 715 encodes the data output from the tail bit generator 713. The convolutional encoder or the turbo encoder may be used for the encoder 715. Preferably, the turbo encoder is recommended for the data with the data rate of over 14.4 Kbps. Assume that the encoder 715 is K=9, R=½ convolutional encoder. Then, the encoder 715 outputs 384, 768, 1536, 3073, 6144 and 12288 symbols according to the received input frame data, respectively. An interleave 717 interleaves the output of the encoder 715 by changing the position of the output of the encoder 715 in the frame unit. The block interleave may be used for the interleave 717.

A long code generator 719 generates the long codes which are the identification codes for the subscribers. A decimator 721 decimates the long codes to match the number of the long codes with the number of the symbols output from the interleave 717. An exclusive OR operator 723 exclusively ORs the encoded symbols output from the interleave 717 and the long codes output from the decimator 721, to scramble the symbols and the long codes.

A signal converter 725 demultiplexes the data output from the exclusive OR operator 723 to split the data into an I channel signal and a Q channel signal. Further, the signal converter 725 converts the level of the symbols output from the exclusive OR operator 723, by changing O0O to O+1O and O1O to O−1O. An orthogonal code generator 727 generates the orthogonal code according to the orthogonal code number Wno and the orthogonal code length Wlength. For the orthogonal code, the Walsh code or quasi-orthogonal code may be used.

When the orthogonal code is the Walsh code, the supplemental channel generator 113 can use 128, 64, 32, 16, 8 and 4-bit Walsh code according to the frame length of the input data. That is, when the frame length is relatively longer, the shorter Walsh code is used, and when the frame length is relatively shorter, the longer Walsh code is used. Although the embodiment of the invention adjusts the frame size by changing the orthogonal code lengths, it is also possible to adjust the data frame size by changing the number of the allocated supplemental channels. That is, when there is a great deal of data to be transmitted, the more supplemental channels are allocated to one user, and when there is less data to be transmitted, the fewer supplemental channels are allocated to the user.

A multiplier 729 multiplies the I channel signal output from the signal converter 725 by the orthogonal code output from the orthogonal code generator 727 to generate the orthogonally modulated I channel signal IW. A multiplier 731 multiplies the Q channel signal output from the signal converter 725 by the orthogonal code output from the orthogonal code generator 727 to generate the orthogonally modulated Q channel signal QW. A channel gain controller 733 controls a gain of the I channel signal IW output from the multiplier 729 according to the gain control signal, and a channel gain controller 735 controls a gain of the Q channel signal QW output from the multiplier 731 according to the gain control signal.

Describing the operation of the forward supplemental channel generator 113 constructed as shown in FIG. 7, the CRC generator 711 adds the CRC bits to the input frame data to allow the receiving part to check the frame quality, and the tail bit generator 713 adds the tail bits behind the CRC bits. The encoder 715 encodes the data output from the tail bit generator 715 in the frame unit, and the interleave 717 changes the bit arrangements in the frame to improve a tolerance for the burst error during transmission. The long code generator 719 generates the identification codes allocated to the respective users, and the decimator 721 matches the data rate of the frame data output from the interleave 717 with the data rate of the long code. The exclusive OR operator 723 exclusively ORs the output of the interleave 717 and the output of the decimator 721 to scramble the supplemental channel signal.

Subsequently, the signal converter 725 splits the signal output from the exclusive OR operator 723 into the I and Q channel signals and converts the signal O0O to O+1O and O1O to O−1O. The multipliers 729 and 731 multiply the converted I and Q channel signals by the orthogonal code, respectively, to orthogonally modulate them, and the channel gain controllers 733 and 735 compensate the channel gains.

Figure 8:
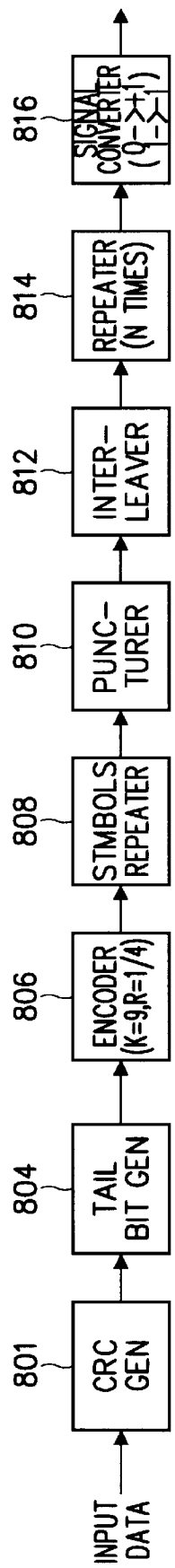
FIG. 8 is a detailed block diagram of a reverse supplemental channel generator (161) of FIG. 1.

FIG. 8 shows an exemplary construction of the reverse supplemental channel generator 161. Referring to FIG. 8, a CRC generator 802 generates the CRC bits according to the input frame data and adds them to the input frame data. A tail bit generator 804, receiving the output of the CRC generator 802, generates 8 tail bits for indicating the end of the input data frame and adds them to the data frame. An encoder 806 encodes the data output from the tail bit generator 804. The convolutional encoder or the turbo encoder may be used for the encoder 806. Assume that the encoder 806 is the K=9, R=¼ convolutional encoder. A symbol repeater 808 repeats the symbols output from the encoder 806 to generate the encoded data of a specified rate. A puncturer 810 punctures the some symbols repeated, and an interleave 812, being the block interleave, interleaves the output of the puncturer 810. A repeater 814 repeats N times the symbols interleaved in the interleave 812, and a signal converter 816 converts the level of the repeated symbols output the repeater 814 by changing the level O1O to O−1O and the level O0O to O+1O.

The reverse supplemental channel generator 161 constructed as shown in FIG. 8 has the similar construction as the forward supplemental channel generator 113, except that the reverse supplemental channel generator 161 includes the puncturer 810 for puncturing the encoded data. The puncturer 810 punctures the excess bits to adjust the output data bits.

Figure 9A:
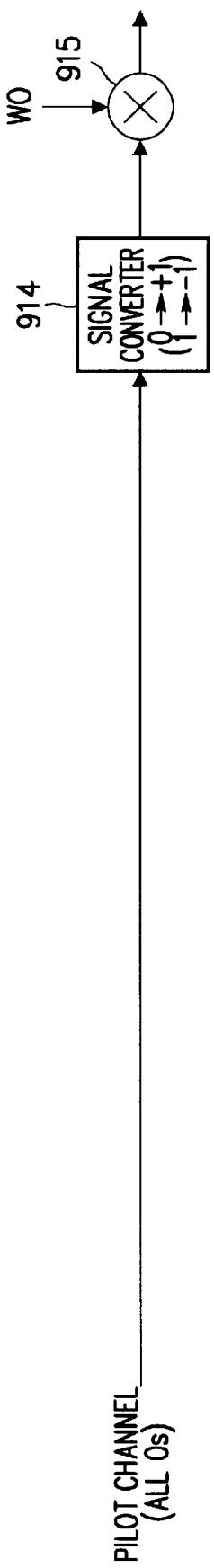
FIGS. 9A to 9C are detailed block diagrams of a forward pilot channel generator (105), a forward sync channel generator (107), and a forward paging channel generator (109) of FIG. 1, respectively.
Figure 9B:
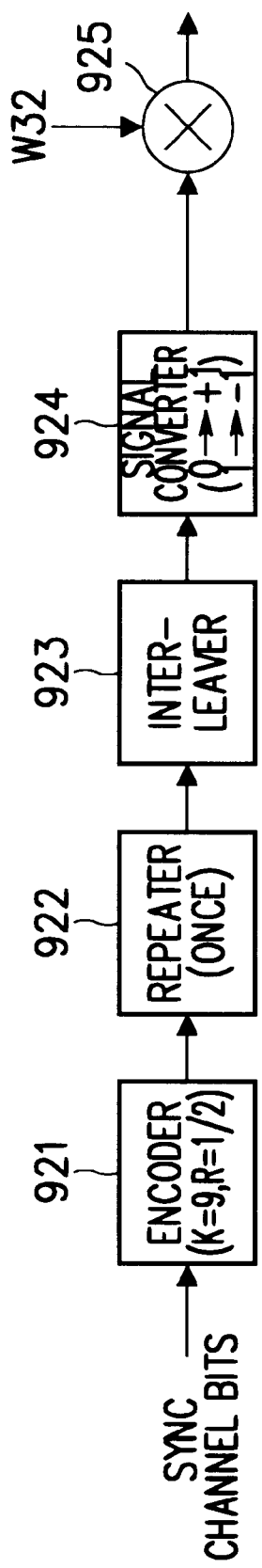
Figure 9C:
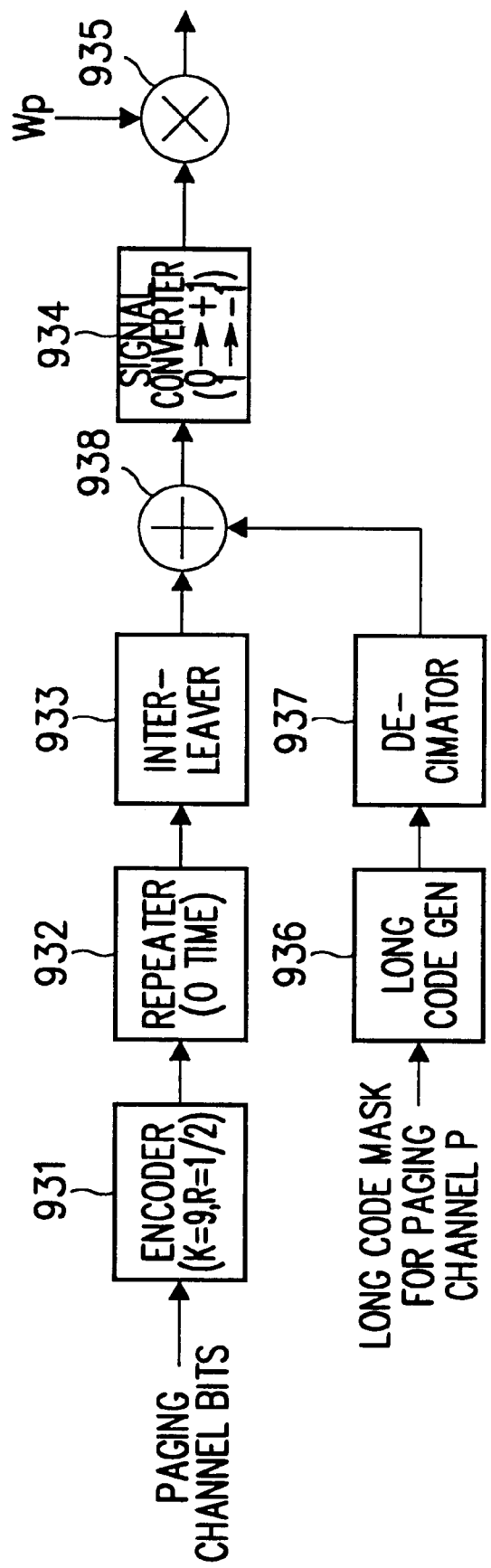

FIGS. 9A to 9C show the constructions of the forward pilot channel generator 105, the forward sync channel generator 107 and the forward paging channel generator 109, respectively.

First, referring to FIG. 9A, the pilot channel generator 105 generates data bits of all O0Os or all O1Os to the pilot channel, and a signal converter 914 converts the level of the pilot channel signal. A multiplier 915 multiplies the pilot signal output from the signal converter 914 by the orthogonal code W0 to orthogonally modulate the pilot signal. Assume that the pilot data bits are all O0Os and the orthogonal code is the Walsh code. Then, the pilot channel generator 105 receives the pilot data, being always O0Os, and spreads the pilot data by selecting the specified Walsh code W0 among the Walsh codes.

Second, referring to FIG. 9B, reference will be made to the construction of the sync channel generator 107. In the drawing, an encoder 921, which may be the convolutional encoder or the turbo encoder, encodes the input sync channel data. Assume the encoder 921 is the K=9, R=½ convolutional encoder. A repeater 922 repeats the symbols output from the encoder 921 N times (where N=1), and an interleave 923, being the block interleave, interleaves the symbols output from the repeater 922 to prevent the burst error. A signal converter 924 converts the level of the sync channel signal output from the interleave 923. A multiplier 925 multiplies the sync channel signal output from the signal converter 924 by the orthogonal code W32 to orthogonally modulate the sync channel signal.

In sum, the forward sync channel generator 107 for maintaining synchronization between the base station and the terminal encodes the sync data through the K=9, R=½ convolutional encoder, repeats the encoded data one time through the repeater 922, and then interleaves the encoded data through the interleave 923. Subsequently, the forward sync channel generator 107 orthogonally modulates the sync data by multiplying the interleaved sync data by the allocated the orthogonal code W32 among the orthogonal codes using the multiplier 925.

Third, referring to FIG. 9C, reference will be made to the construction of the forward paging channel generator 109. An encoder 931, which may be the convolutional encoder or the turbo encoder, encodes the input paging data. Assume that the encoder 931 is the K=9, R=½ convolutional encoder. A repeater 932 repeats the symbols output from the encoder 931 N times (where N=0), and an interleave 933, bing the block interleave, interleaves the symbols output from the repeater 932 to prevent the burst error. A long code generator 936 generates the long codes which are the identification codes for the subscribers. A decimator 937 decimates the long code to match the data rate of the long code with the data rate of the symbols output from the interleave 933. An exclusive OR operator 938 exclusively ORs the encoded paging signal output from the interleave 933 and the long codes output from the decimator 937. A signal converter 934 converts the level of the paging data output from the exclusive OR operator 938, and a multiplier 935 orthogonally modulates the paging data by multiplying the paging signal scrambled in the exclusive OR operator 938 by the orthogonal code Wp allocated to the paging channel.

In sum, the forward link paging channel generator 109 has the similar operation as the sync channel generator 107 except that the paging channel generator 109 exclusively ORs the output of the interleave 933 and the long code and spreads the paging data by multiplying the paging data by the Walsh code Wp allocated to the paging channel.

Figure 10A:
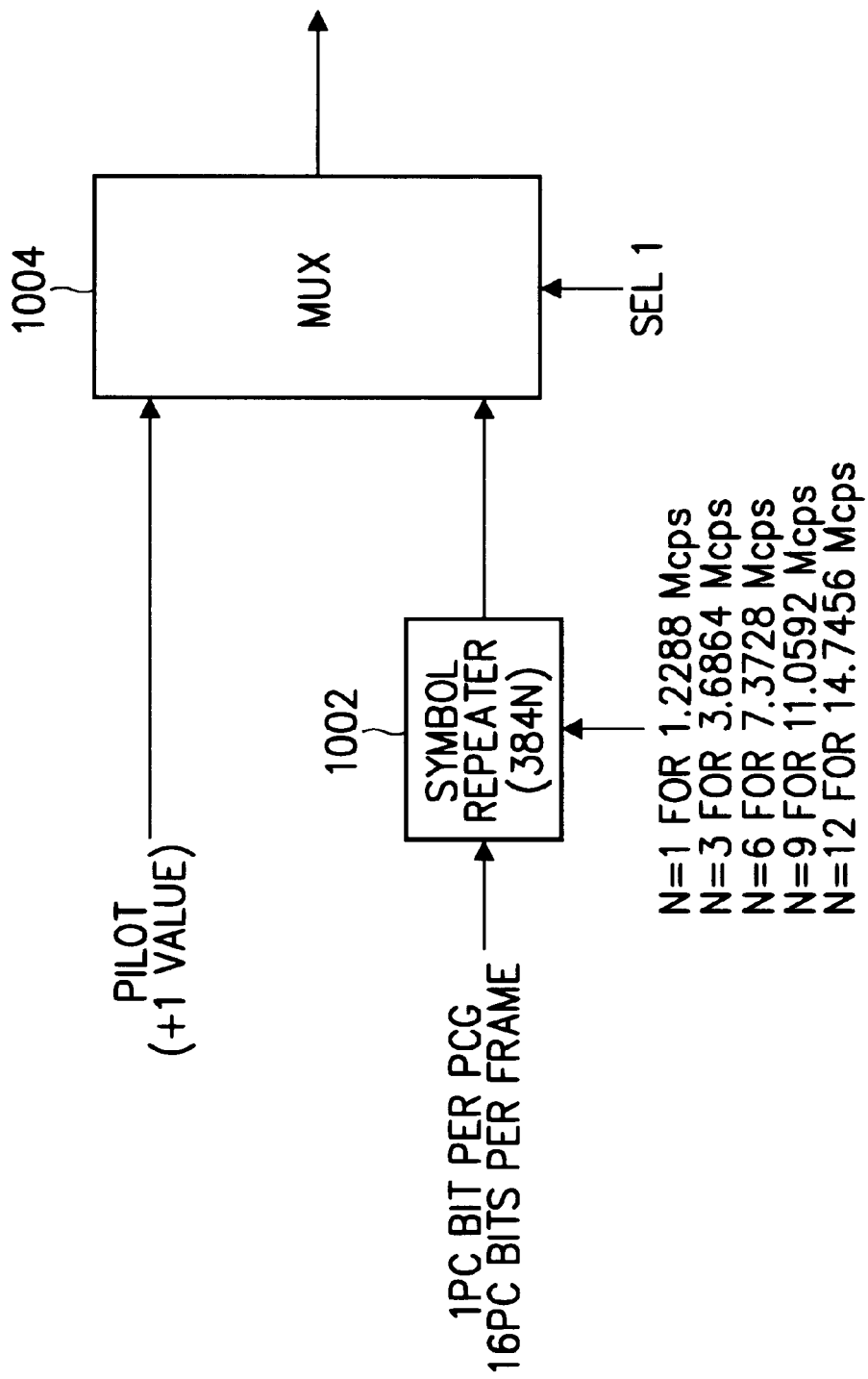
FIG. 10A is a detailed block diagram of a reverse pilot channel generator (155) of FIG. 1.
Figure 10B:
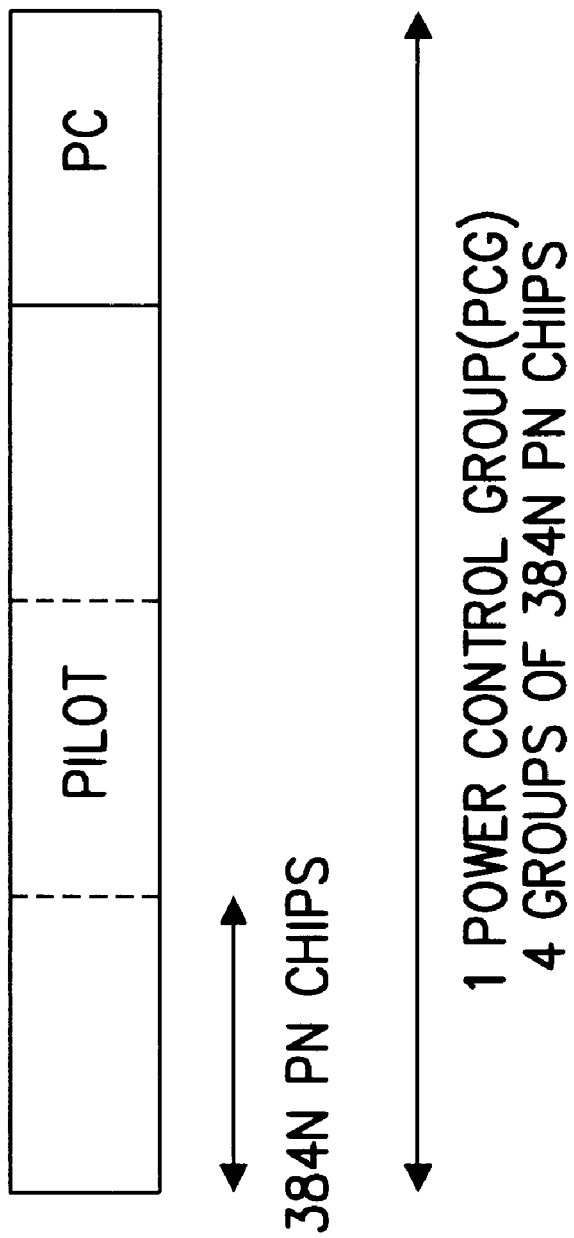
FIG. 10B is a diagram illustrating the structure of a message frame for explaining how to insert the control bits into the pilot channel.

FIG. 10A shows the construction of the reverse pilot channel generator 155. The embodiment adds the power control bit to the reverse pilot channel to transmit the power control bit. Therefore, as illustrated, the pilot channel generator 155 is constructed such that the power control bit is added to the pilot channel. FIG. 10B shows the format of the pilot signals and the power control signal output from the pilot channel. Referring to FIG. 10A, a symbol repeater 1002 repeats the input power control bit N times according to the data rate. To be concrete, the pilot channel generator 155 transmits one power control (PC) bit per power control group (PCG) and 16 power control bits per frame. Therefore, the symbol repeater 1002 has N=1 for 1.2288 Mcps, N=3 for 3.6864 Mcps, N=6 for 7.3728 Mcps, N=9 for 11.0592 Mcps and N=12 for 14.7456 Mcps. A multiplexer 1004, receiving the reverse pilot signal and the power control bit output from the symbol repeater 1002, cuts off the pilot signal and outputs the power control bit according to the selection signal Sel_1.

FIG. 10B shows the characteristics of the pilot signal output from the multiplexer 1004 and the power control bit. When transmitting the power control bit through the reverse pilot channel, the multiplexer 1004 inserts the power control bit in a specified position of a power control group consisting of four 384N PN chips, as illustrated in FIG. 10B.

Figure 11A:
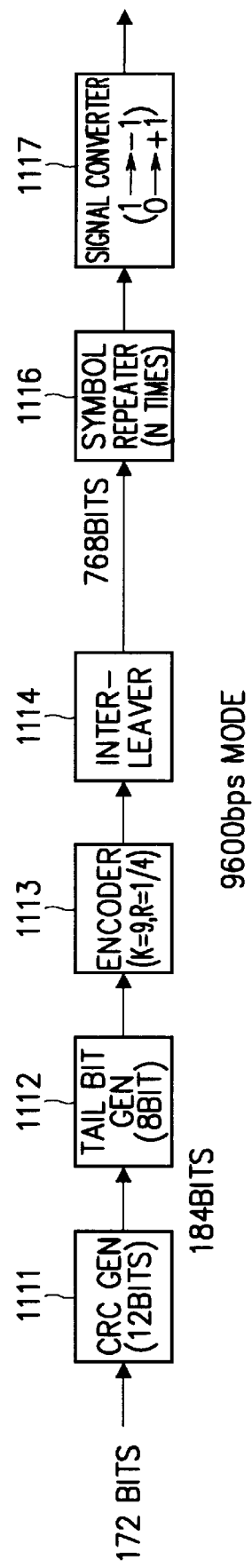
FIGS. 11A and 11B are detailed block diagrams of a reverse access channel generator (157) of FIG. 1.
Figure 11B:
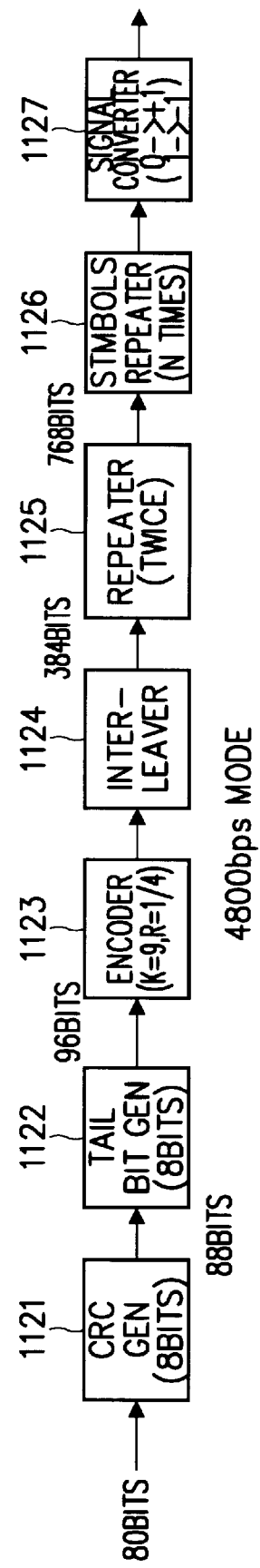
Figure 11C:
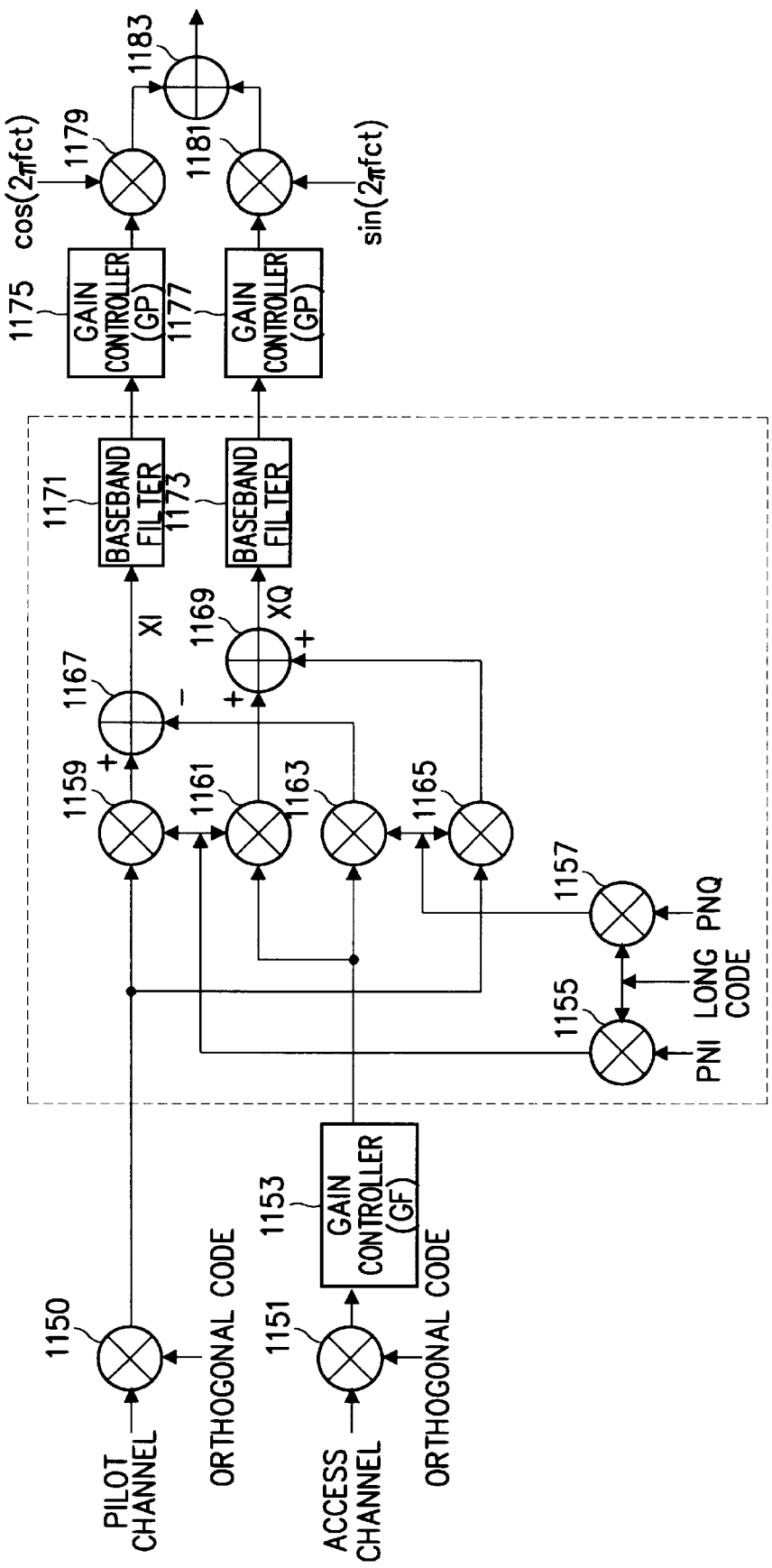
FIG. 11C is a diagram illustrating a spreader for spreading the access channel signal.

FIGS. 11A to 11c show the construction of the reverse access channel generator 157, wherein FIG. 11A shows the access channel generator 157 having the data rate of 9600 bps and FIG. 11B shows the access channel generator 157 having the data rate of 4800 bps.

Referring to FIGS. 11A and 11B, CRC generators 1111 and 1121 add corresponding CRC bits to the respective input data. Specifically, the CRC generator 1111 adds 12-bit CRC data to the 172-bit input data to output the 184-bit data, and the CRC generator 1121 adds 8-bit CRC data to the 80-bit input data to output the 88-bit data.

Tail bit generators 1112 and 1122 add 8 tail bits to the outputs of the CRC generators 1111 and 1121, respectively. As a result, the tail bit generator 1112 outputs 192-bit data and the tail bit generator 1122 outputs 96-bit data.

Encoders 1113 and 1123 encode the outputs of the tail bit generators 1112 and 1122, respectively. The encoders 1113 and 1123 may be the K=9, R=¼ convolutional encoders. In such a case, the encoder 1113 encodes the 192-bit data output from the tail bit generator 1112 to output 768-bit data, and the encoder 1123 encodes the 96-bit data output from the tail bit generator 1122 to output 384-bit data.

Interleavers 1114 and 1124, which may be the block interleavers or the random interleavers, interleave the encoded data output from the encoders 1113 and 1123, respectively. Assume that the block interleavers are used for the interleavers 1114 and 1124.

A repeater 1125 repeats (transmits) the symbols output from the interleave 1124 two times, thus outputting 768 symbols. The repeater 1125 serves to adjust the 4800 bps mode symbol rate to the 9600 bps symbol rate.

Symbol repeaters 1116 and 1126 repeat the symbols output from the interleave 1114 and the repeater 1125 N times, respectively. Thus, the symbol repeaters 1116 and 1126 both output N*768 symbols per frame at the data rate of 19.2 Kbps. Signal converters 1117 and 1127 convert the signal level of the symbols output from the symbol repeaters 1116 and 1126, respectively.

As described above, if the data rate is 4800 bps, the access channel generator 157 transmits the interleaved data twice consecutively prior to applying the interleaved data to the symbol repeater 1126. In this way, the access channel generator 157 adjusts the access channel data of the 4800 bps data rate to the access channel data of the 9600 bps data rate.

FIG. 11C shows the construction of a spreader for spreading the access channel signal output from the access channel generator 157 with the pilot channel signal output from the pilot channel generator 155. FIG. 11C shows an example of the complex QPSK spreader.

Referring to FIG. 11C, a multiplier 1150 generates an orthogonally modulated pilot channel signal by multiplying the pilot channel signal by the orthogonal code, and a multiplier 1151 generates an orthogonally modulated access channel signal by multiplying the access channel signal by the orthogonal code. For the orthogonal code, the Walsh code or the quasi-orthogonal code may be used. A gain controller 1153 controls a gain of the orthogonally modulated access channel signal output from the multiplier 1151.

A multiplier 1155 multiplies the I channel spread sequence PNI by the long code which is the user identification code. A multiplier 1157 multiplies the Q channel spread sequence PNQ by the long code. A multiplier 1159 multiplies the orthogonally modulated pilot channel signal by the I channel spread sequence PNI output from the multiplier 1155, and a multiplier 1161 multiplies the orthogonally modulated access channel signal by the I channel spread sequence PNI output from the multiplier 1155. A multiplier 1163 multiplies the orthogonally modulated access channel signal by the Q channel spread sequence PNQ output from the multiplier 1157, and a multiplier 1165 multiplies the orthogonally modulated pilot channel signal by the Q channel spread sequence output from the multiplier 1157. A subtractor 1167 generates an I channel spread signal XI by subtracting the output of the multiplier 1163 from the output of the multiplier 1159, and an adder 1169 generates a Q channel spread signal XQ by adding the output of the multiplier 1161 to the output of the multiplier 1165. Therefore, the spreader having the above described structure generates the difference value between the output signals of the multipliers 1159 and 1163 as the I channel spread signal XI, and generates the addition signal of the output signals of the multipliers 1161 and 1165 as the Q channel spread signal XQ.

A baseband filter 1171 filters the I channel spread signal XI output from the subtractor 1167, and a baseband filter 1173 filters the Q channel spread signal XQ output from the adder 1169. A gain controller 1175 controls a gain of the I channel spread signal output from the baseband filter 1171, and a gain controller 1177 controls a gain of the Q channel spread signal output from the baseband filter 1173. A mixer 1179 generates an I channel RF signal by mixing the output of the gain controller 1175 with an I channel carrier cos(2 pfct), and a mixer 1181 generates a Q channel RF signal by mixing the output of the gain controller 1177 with a Q carrier sin(2 pfct). An adder 1183 generates a transmission RF signal by adding the I and Q channel RF signals output from the mixers 1179 and 1181.

The spreader having the construction of FIG. 11C, serving for the reverse link access channel and pilot channel, receives the pilot channel signal as an I channel component and the access channel signal as a Q channel component, and spreads the I and Q channel signals using the I and Q channel spread sequences PNI and PNQ. The signal output from the access channel is modulated with the orthogonal code in the multiplier 1151, and a relative gain of the access channel signal with respect to the pilot channel signal is compensated in the gain controller 1153. The outputs of the multiplier 1150 and the gain controller 1153 are multiplied by the spread sequences PNI and PNQ through the multipliers 1155–1165, thus being spread. Then, the gains of the spread signals are compensated through the gain controllers 1175 and 1177.

Figure 12:
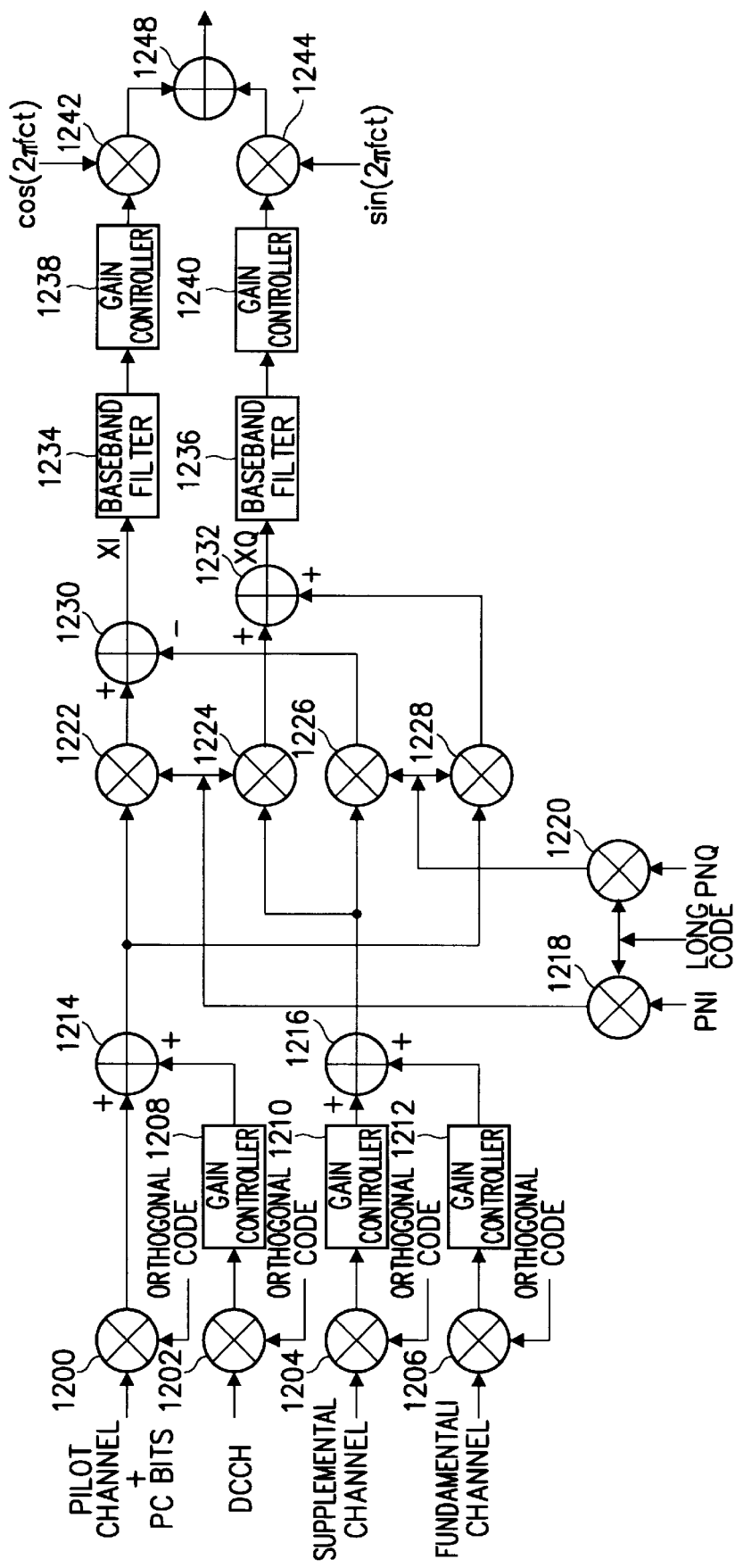
FIG. 12 is a diagram illustrating a spreader for spreading the transmission signals output from the respective reverse channel generators.

FIG. 12 is a schematic diagram for explaining the orthogonal modulation and the spreading operation of the respective channel generators constituting the reverse link.

In the conventional CDMA communication system, the reverse transmitter includes the pilot channel, the fundamental channel, the supplemental channel and the control channel. A control channel generator receives a 10-bit control message and adds the power control signal to the transmission control message at specified intervals. In such a case, the input control message is too small in size to transmit a great number of the power control signals, which causes a lowering of the system performance. Further, to provide the common voice communication which transmits only the voice signal through the fundamental channel, the conventional CDMA communication system uses pilot channel, the supplemental channel and control channel. The control channel should be maintained for the power control signal. Such a power control information transmitting method uses as many as three channels for the common voice-communication, thus deteriorating the peak-to-average ratio of a transmission, amplifier. To provide the packet data communication using the above method, it is necessary to allocate the pilot channel and the supplemental channel, then allocate the fundamental channel to control the supplemental channel, and then allocate the control channel to transit the power control signal. Accordingly, for the packet data communication, the conventional CDMA communication system should use the four channels all.

It should be noted that the embodiment of the present invention uses the dedicated control channel which is distinguishable from the control channel used in the conventional CDMA communication system. The dedicated control channel has 172 input bits in maximum to cover the great deal of the control signals, thereby solving the overload problem of the conventional CDMA mobile communication system. Moreover, since the embodiment transmits the power control bits by inserting them into the pilot channel, it can transmit the voice signal using only the pilot channel and the fundamental channel for the common voice communication, without allocating the control channel separately for the power control. For the packet data communication, the embodiment can transmit the packet data by using the pilot channel and the supplemental channel and by allocating the dedicated control channel for controlling the supplemental channel. Since the power control signal is transmitted by being inserted into the pilot channel, it is not necessary to allocate the channel additionally for the power control signal. In this way, the invention can save one channel in the reverse link, as compared to the conventional method. As a result, the invention has the lower peak-to-average ratio, so that the terminal may have the wider coverage even using the same power.

Referring to FIG. 12, a multiplier 1200 generates an orthogonally modulated pilot channel signal by multiplying the pilot signal and the pilot channel signal of the power control information by the orthogonal code. A multiplier 1202 generates an orthogonally modulated dedicated control channel signal by multiplying the dedicated control channel signal output from the dedicated control channel generator 153 by an allocated orthogonal code. A multiplier 1204 generates an orthogonally modulated supplemental channel signal by multiplying the supplemental channel signal output from the supplemental channel generator 161 by an allocated orthogonal code. A multiplier 1206 generates an orthogonally modulated fundamental channel signal by multiplying the fundamental channel signal output from the fundamental channel generator 159 by an allocated orthogonal code.

A gain controller 1208 controls a gain of the orthogonally modulated dedicated control channel signal output from the multiplier 1202. A gain controller 1210 controls a gain of the orthogonally modulated supplemental channel signal output from the multiplier 1204. A gain controller 1212 controls a gain of the orthogonally modulated fundamental channel signal output from the multiplier 1206. The gain controllers 1208–1212 serve to compensate the pilot channel signal and the relative gains with respect to the input channel signals, respectively.

An adder 1214 adds the orthogonally modulated pilot channel signal output from the multiplier 1200 to the output of the gain controller 1208. The pilot channel generator 155 may generate the pilot signal with the power control bit. An adder 1216 adds the output of the gain controller 1210 to the output of the gain controller 1212. That is, the adder 1214 adds the pilot channel signal to the dedicated control channel signal, and the adder 1216 adds the supplemental channel signal to the fundamental channel signal.

A multiplier 1218 multiplies the I channel spread sequence PNI by the long code and a multiplier 1220 multiplies the Q channel spread sequence PNQ by the long code. A multiplier 1222 multiplies the output of the adder 1214 by the I channel spread sequence PNI output from the multiplier 1218, and a multiplier 1224 multiplies the output of the adder 1216 by the I channel spread sequence PNI output from the multiplier 1218. A multiplier 1226 multiplies the output of the adder 1216 by the Q channel spread sequence PNQ output from the multiplier 1220, and a multiplier 1228 multiplies the output of the adder 1214 by the Q channel spread sequence PNQ output from the multiplier 1220. A subtractor 1230 generates an I channel spread signal XI by subtracting the output of the multiplier 1226 from the output of the multiplier 1222, and an adder 1232 generates a Q channel spread signal XQ by adding the output of the multiplier 1224 to the output of the multiplier 1228. That is, the spreader generates the difference value between the two signals output from the multipliers 1222 and 1226 as the I channel spread signal XI, and the addition value of the two signals output from the multipliers 1224 and 1228 as the Q channel spread signal XQ.

A baseband filter 1234 baseband filters the I channel spread signal XI output from the subtractor 1230, and a baseband filter 1236 baseband filters the Q channel spread signal XQ output from the adder 1232. A gain controller 1238 controls a gain of the I channel spread signal output from the baseband filter 1234, and a gain controller 1240 controls a gain of the Q channel spread signal output from the baseband filter 1236. A mixer 1242 generates an I channel RF signal by mixing the output of the gain controller 1238 with the I channel carrier cos(2 pfct), and a mixer 1244 generates a Q channel RF signal by mixing the output of the gain controller 1240 with the Q channel carrier sin(2 pfct). An adder 1248 generates a transmission RF signal by adding the I and Q channel RF signals output from the mixers 1242 and 1244.

Reference will be made to operation of the orthogonal modulation and the spread modulation of the reverse channel generators with reference to FIG. 12. The dedicated control channel generator 153, the supplemental channel generator 161 and the fundamental channel generator 159 spread their channel signals with the corresponding orthogonal codes, respectively, and compensate the relative gains among the respective channels based on the pilot channel signal. The reverse channels are divided by modulating the respective channels with the different orthogonal codes. Here, the orthogonal codes for dividing the respective channels are allocated in common to the users within the coverage of the same base station. Thereafter, the orthogonally modulated dedicated control channel signal is added to the orthogonally modulated pilot signal, and the orthogonally modulated supplemental channel signal is added to the orthogonally modulated fundamental channel signal. The spreader 167 then receives the two addition signals as I and Q channel signals, respectively, and spreads the I and Q channel signals. The gain controllers 1238 and 1240 compensate the gains of the spread signals.

Unlike the forward pilot channel, the reverse pilot channel spreads the signals with the PN codes allocated differently for every user. Thus, from the viewpoint of the base station, since the respective terminals generate the different pilot signals, the reverse pilot channel is the dedicated pilot channel. A transmitter of the reverse link has two different methods for spreading the transmission signal. A first method is to identify the users by the PN code. The method spreads the respective channel signals with the predetermined Walsh codes for dividing the respective channels. Here, the different Walsh codes are allocated to the respective channels and the same Walsh codes are allocated to the same channels for all the users. A second method is to identify the users by the Walsh code. This method spreads the respective channel signals by using four Walsh codes allocated differently to every user, and uses the PN code in identifying the base station.

Figure 13:
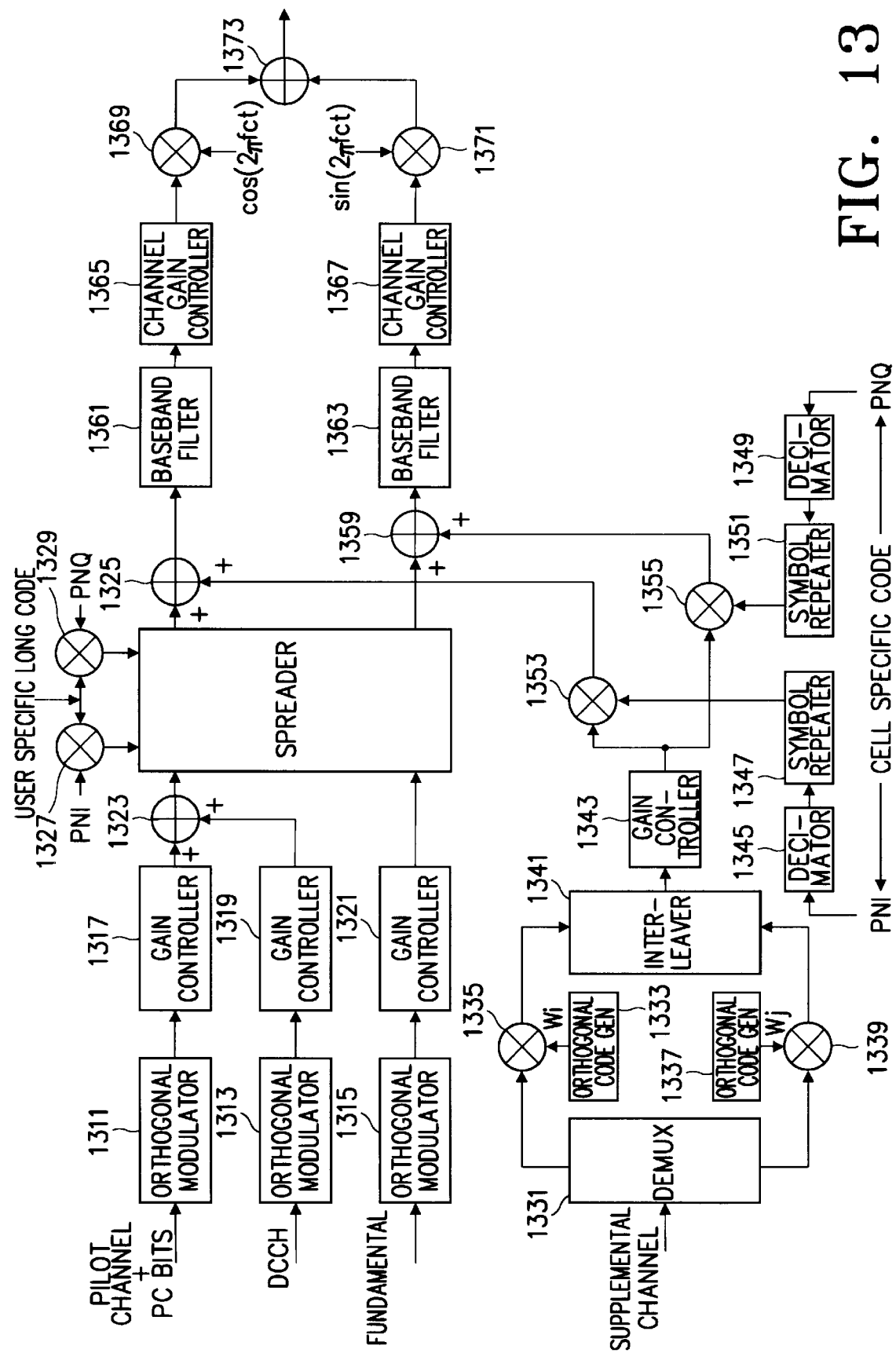
FIG. 13 is a diagram illustrating a spreader for orthogonally modulating and spreading the signals output from the respective reverse channel generators.

FIG. 13 shows an orthogonal modulation and spread modulation scheme for the channel signals of the reverse channel generators. Referring to FIG. 13, an orthogonal modulator 1311 receives the reverse link pilot channel signal with the power control bit and generates an orthogonally modulated pilot channel signal. An orthogonal modulator 1313 generates an orthogonally modulated dedicated control channel signal by multiplying the dedicated control channel signal output from the dedicated control channel generator 153 by an allocated orthogonal code. An orthogonal modulator 1315 generates an orthogonally modulated fundamental channel signal by multiplying the fundamental channel signal output from the fundamental channel generator 159 by an allocated orthogonal code.

A gain controller 1317 controls a gain of the orthogonally modulated pilot channel signal containing the power control bit output from the orthogonal modulator 1311. A gain controller 1319 controls a gain of the orthogonally modulated dedicated control channel signal output from the orthogonal modulator 1313. A gain controller 1321 controls a gain of the orthogonally modulated fundamental channel signal output from the orthogonal modulator 1315.

An adder 1323 adds the output of the gain controller 1317 to the output of the gain controller 1319. The output of the pilot channel generator 155 may be the pilot signal with the power control bit. A multiplier 1327 multiplies the I channel spread sequence PNI by the user specific long code, and a multiplier 1329 multiplies the Q channel spread sequence PNQ by the user specific long code. A spreader 1325 receives the output of the adder 1323 as the I channel signal and the output of the gain controller 1321 as the Q channel signal, and spreads the received I and Q channel signals by using the I and Q channel spread sequences PNI and PNQ output from the multipliers 1327 and 1329. The spreader 1325 may be a complex PN spreader composed of the multipliers 1222–1228 and the adders 1230 and 1232 as shown in FIG. 12.

A demultiplexer 1331 demultiplexes the supplemental channel signal output from the signal converter 816 of the supplemental channel generator 161 by dividing the supplemental channel signal into the odd-numbered symbols and the even-numbered symbols. An orthogonal code generator 1333 generates an orthogonal code Wi for orthogonally modulating the odd-numbered supplemental channel symbols. A multiplier 1335 multiplies the odd-numbered symbols output from the demultiplexer 1331 by the orthogonal code Wi and outputs an orthogonally modulated odd-numbered symbols. Similarly, an orthogonal code generator 1337 generates an orthogonal code Wj for orthogonally modulating the even-numbered supplemental channel symbols. A multiplier 1339 multiplies the even-numbered symbols output from the demultiplexer 1331 by the orthogonal code Wj and outputs an orthogonally modulated even-numbered symbols. An interleave 1341 generates a supplemental channel signal orthogonally modulated with a one-chip resistance code by interleaving the orthogonally modulated supplemental channel symbols output from the multipliers 1335 and 1339.

Although reference has been made to a method for employing the one-chip resistance code by using the two orthogonal code generators 1333 and 1337, the demultiplexer 1331 can modulate the channel signal with an M-chip resistance code by demultiplexing the input supplemental channel symbols into M symbols, orthogonally modulating the M symbols with the corresponding orthogonal codes output from M orthogonal code generators, and then interleaving the orthogonally modulated symbols through the interleave 1341.

A gain controller 1343 controls a gain of the signal output from the interleave 1341. A decimator 1345 decimates a cell specific PNI code for distinguishing the base station, and a symbol repeater 1347 repeats the decimated PNI code two times. A decimator 1349 decimates a cell specific PNQ code for distinguishing the base station, and a symbol repeater 1351 repeats the decimated PNQ code two times. The symbol repeaters 1347 and 1351 repeat the input PN codes two times, for the one-chip resistance code and repeat the input PN codes M times, for the M-chip resistance code. A multiplier 1353 generates a supplemental channel spread signal for the I channel by multiplying the output of the gain controller 1343 by the PNI code output from the symbol repeater 1347. A multiplier 1355 generates a supplemental channel spread signal for the Q channel by multiplying the output of the gain controller 1343 by the PNQ code output from the symbol repeater 1351.

An adder 1357 generates an I channel spread signal by adding the I channel spread signal of the spreader 1325 to the spread signal of the multiplier 1353, and an adder 1359 generates a Q channel spread signal by adding the Q channel spread signal of the spreader 1325 to the spread signal of the multiplier 1355. A baseband filter 1361 filters the I channel spread signal output from the adder 1357, and a baseband filter 1363 filters the Q channel spread signal output from the adder 1359. A channel gain controller 1365, receiving the output of the baseband filter 1361, controls a gain of the I channel spread signal, and a channel gain controller 1367, receiving the output of the baseband filter 1363, controls a gain of the Q channel spread signal. A mixer 1369 generates an I channel RF signal by mixing the output of the channel gain controller 1365 with the I channel carrier cos(2 pfct), and a mixer 1371 generates a Q channel RF signal by mixing the output of the channel gain controller 1367 with the Q channel carrier sin(2 pfct). An adder 1373 generates a transmission RF signal by adding the I and Q channel RF signals output from the mixers 1369 and 1371.

Reference will be made to operation of the reverse adders 163 and 165 and the spreader 167 with reference to FIG. 13. In FIG. 12, the respective channels generators modulates the channel signals by using the orthogonal code so as to distinguish the channels. However, in FIG. 13, the dedicated control channel generator 153, the pilot channel generator 155 and the fundamental channel generator 159 discriminate the channels by using the orthogonal code link in FIG. 12 and the supplemental channel generator 161 distinguishes the supplemental channel from the other channels by using the one-chip resistance code instead of the Walsh code. Of course, it is also possible to distinguish the channels using the Walsh code.

In case the one-chip resistance code is used, the supplemental channel signal output from the reverse supplemental channel generator 161 is divided into the odd-numbered symbols and the even-numbered symbols through the demultiplexer 1331 and then modulated with the orthogonal codes output from the orthogonal code generators 1333 and 1337. The modulated odd- and even-numbered symbols are output alternately through the interleave 1341. The supplemental channel signals output from the interleave 1341 are gain-controlled and then spread with the PN codes which are equally allocated to the users in the coverage of the same base station. Further, the PN codes for spreading the one-chip resistance code are decimated at one chip intervals. Generation of the one-chip resistance code is well disclosed in Korean Patent Application No. 39119/1997 filed by the applicant of this invention.

The reverse channel transmitter having the construction of FIG. 13 modulates and spreads the supplemental channel signal differently from that of FIG. 12. To be concrete, in FIG. 12, the signal obtained by adding the output signal of the pilot channel generator 155 to the output signal of the dedicated control channel generator 153 and the signal obtained by adding the output signal of the fundamental channel generator 159 to the output signal of the supplemental channel generator 161 are input to the spreader to be spread. However, in FIG. 13, the signal obtained by adding the output signal of the pilot channel generator 155 to the output of the dedicated control channel generator 153 are input to the spreader 1325. Then, the output signals of the spreader 1325 are added to the output signals, being spread with the one-chip resistance code, of the supplemental channel generator 161.

Figure 14A:
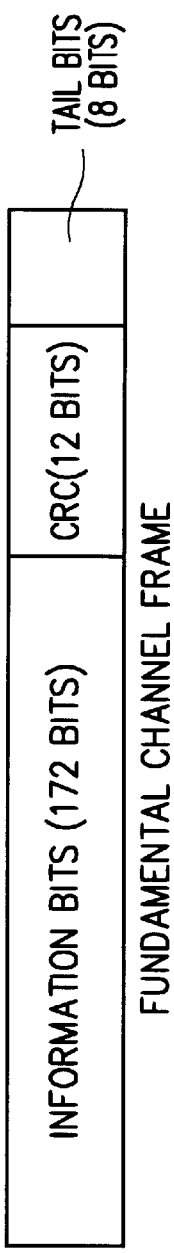
FIGS. 14A to 14C are diagrams illustrating the structures of the messages transmitted through the fundamental channel, the supplemental channel and the access channel, respectively.
Figure 14B:
Figure 14C:
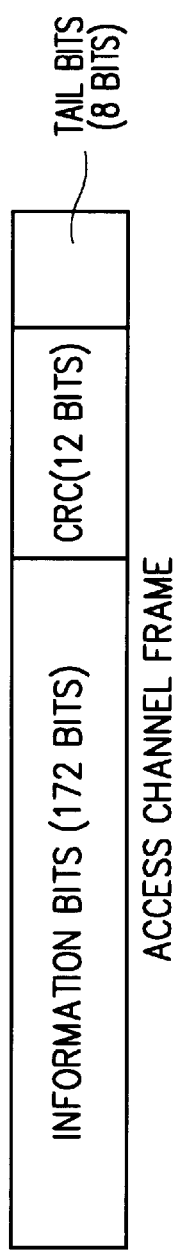

FIGS. 14A to 14C show the structure of frames transmitted through the fundamental channel, the supplemental channel and the access channel, respectively. As illustrated, the fundamental channel frame, the supplemental channel frame and the access channel frame include specified information bits, CRC bits for allowing the receiver to measure the quality of the received frames, and tail bits for initializing the encoders.

Figure 15A:
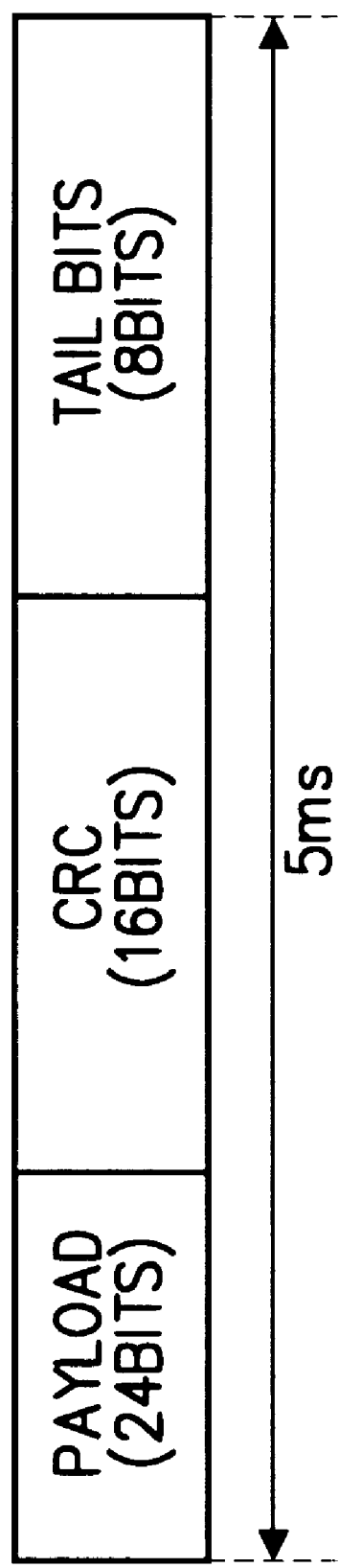
FIGS. 15A and 15B are diagrams illustrating the structures of first and second control messages transmitted through the dedicated control channel, respectively.
Figure 15B:
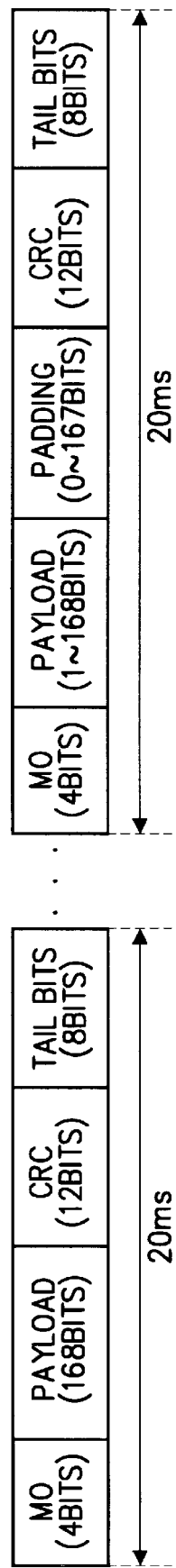

FIGS. 15A and 15B show the structure of frames transmitted through the dedicated control channel, in which FIG. 15A shows the structure of the control message with a first frame length and FIG. 15B the structure of the control message with a second frame length. In the embodiment of the present invention, the first frame length is 5 ms and the second frame length is 20 ms.

As illustrated in FIGS. 15A and 15B, the control message frame has different structure according to its length. That is, as shown in FIG. 15A, the 5 ms control message frame consists of a portion (payload) containing the contents of the data, the CRC bits for measuring the frame quality, and the tail bits for initializing the encoder. Further, as shown in FIG. 15B, the 20 ms control message frame consists of a portion (MO) describing the frame type, a portion (payload) containing the contents of the data, the CRC bits for measuring the frame quality, and the tail bits. In particular, the last frame includes a padding for adjusting the last frame to 20 ms, since the length of the data transmitted by the upper layer entity is variable.

The Walsh codes used in the transmitters and receivers of the reverse link and the forward link can be replaced with the quasi-orthogonal codes.

Now, reference will be made to the function of the respective channels according to the channel structure and the service types available in each case, with reference to the forward channel generators and the reverse channel generators having the structures shown in FIGS. 1 to 15B. Upon the call setup, the data transmission/reception channels (i.e., the pilot channel, the dedicated control channel, the fundamental channel and the supplemental channel) may make various combinations. Hereinbelow, with reference to FIGS. 16A to 22B, the forward link and the reverse link having the various combinations will be described separately and then the service types usable to the respective combinations will be specified. In addition, several services will be mentioned by way of example, to explain the function of the respective channels. In the specification, the structure of the respective channels and their roles will be described in detail. The invention may also be applied to the services other than the services that will be mentioned hereinbelow. In FIGS. 16A to 22B, the arrow from the base station to the terminal denotes the forward link, and the arrow from the terminal to the base station denotes the reverse link.

The forward link communication may be performed in seven methods as described hereinbelow.

Figure 16A:
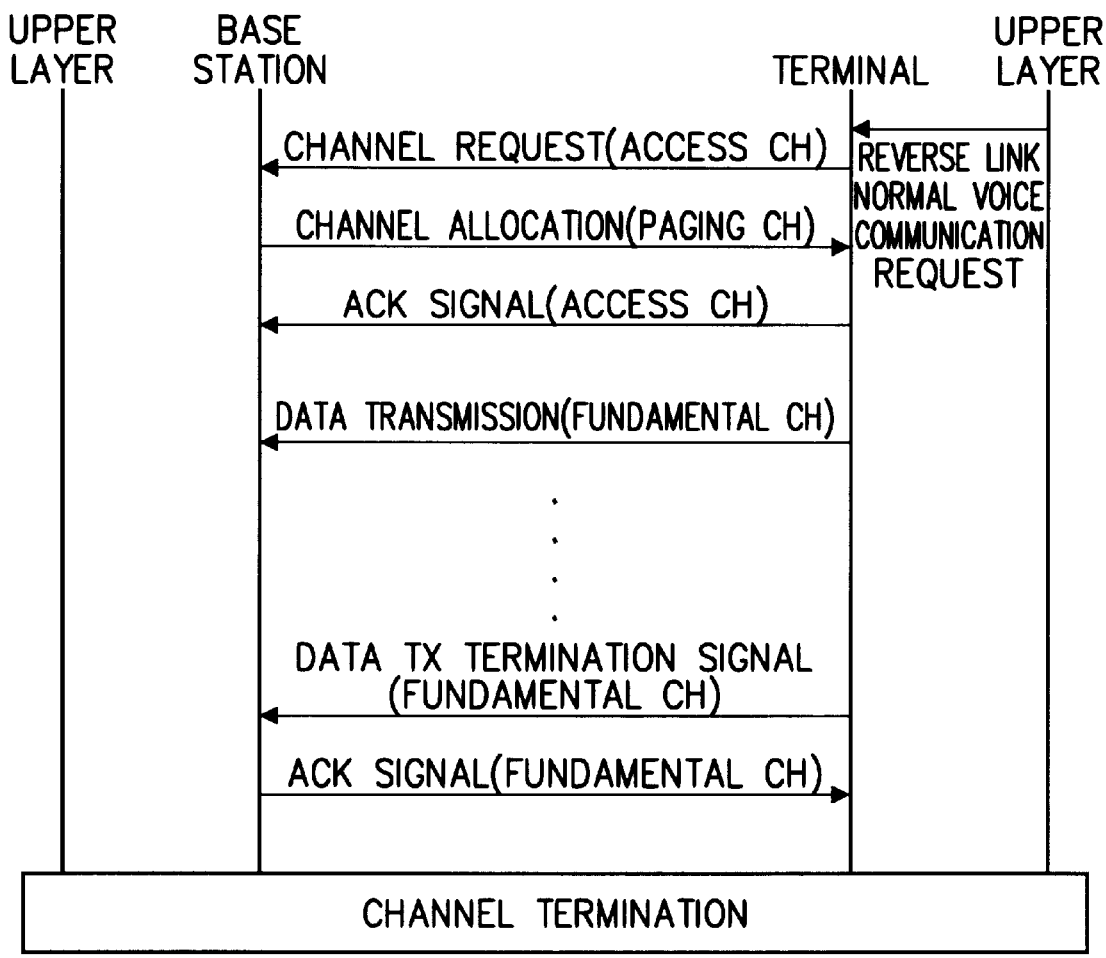
FIGS. 16A and 16B are flow charts illustrating the procedure for performing the normal voice communication in the CDMA communication system.
Figure 16B:
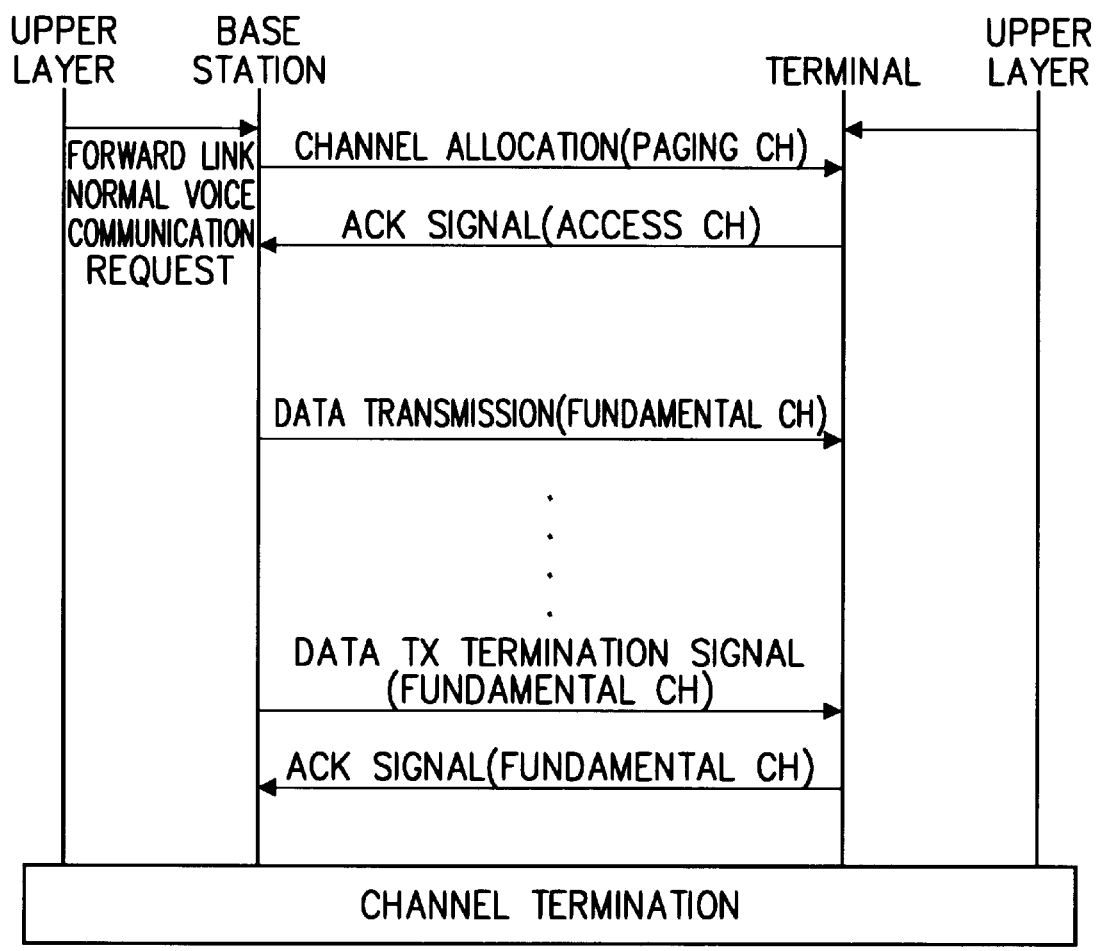

First, the communication may be performed using the forward link composed of the pilot channel and the fundamental channel. In such a case, all the control messages are transmitted by being added to the fundamental channel using a dim-and-burst or blank-and-burst method. Also, the power control signal is transmitted through the fundamental channel. FIG. 16B shows a flow chart for providing a forward link normal voice communication service, where the forward link is composed of the pilot channel and the fundamental channel.

Upon receiving a normal voice communication request message from the upper layer entity of the base station, the base station controller 101 allocates the fundamental channel for communication and then transmits a channel allocation signal to the terminal by enabling the paging channel generator 109. Then, the terminal verifies the data output from the paging channel generator 109 of the base station through the paging channel receiver, and transmits an acknowledge signal to the base station by enabling the access channel generator 157. Upon receipt of the acknowledge signal from the terminal through the access channel receiver, the base station transmits the voice data to the terminal via the allocated fundamental channel by enabling the fundamental channel generator 111. In the forward link, all the control messages including the power control signal are transmitted by being added to the voice data of the fundamental channel using the dim-and-burst or blank-and-burst method. To terminate the voice communication, the base station transmits a channel termination signal to the terminal through the fundamental channel generator 111. Upon receipt of the channel termination signal, the terminal transmits an acknowledge signal to the base station through the fundamental channel generator 159 and then releases the connected fundamental channel to terminate the voice communication.

Figure 17A:
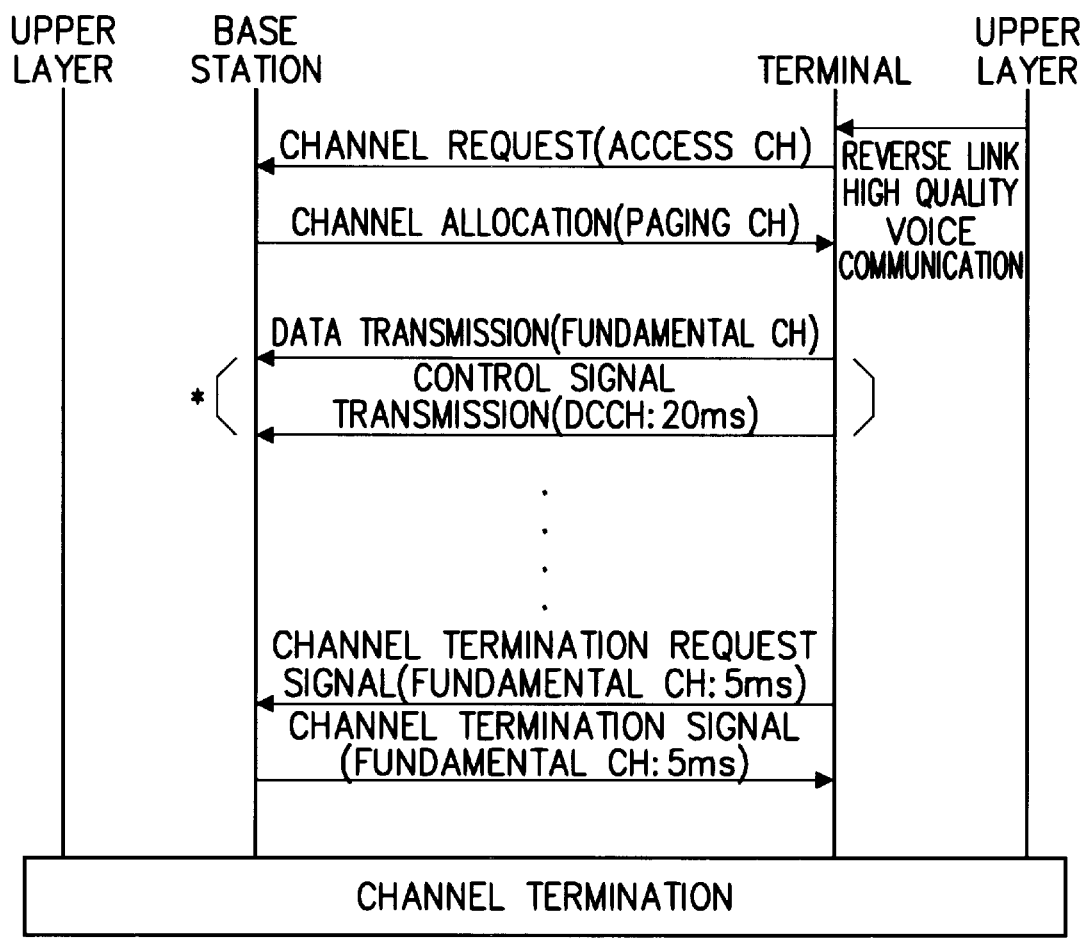
FIGS. 17A and 17B are flow charts illustrating the procedure for performing the high quality voice communication in the CDMA communication system.
Figure 17B:
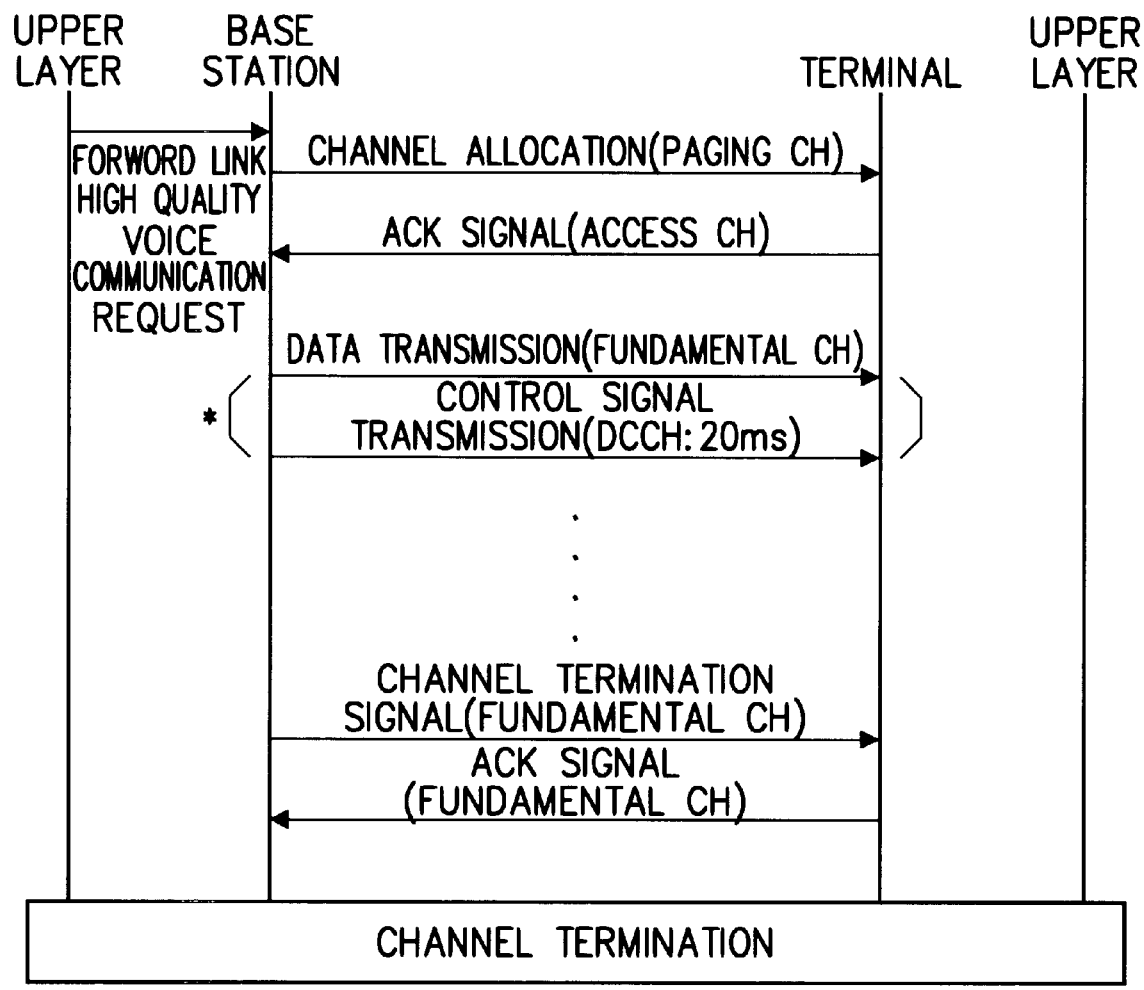

Second, the communication may be performed using the forward link composed of the pilot channel, the dedicated control channel and the fundamental channel. In such a case, the power control signal is transmitted by being added to the fundamental channel and the other control messages are transmitted through the dedicated control channel. FIG. 17B shows a flow chart for providing a forward link high quality voice communication service, where the forward link is composed of the pilot channel, the dedicated control channel and the fundamental channel.

When receiving a forward link high quality voice communication request signal from the upper layer entity of the base station, the base station controller 101 transmits a channel allocation signal for the fundamental channel and the dedicated control channel for performing the high quality voice communication, to the terminal through the forward paging channel by enabling the paging channel generator 109. Upon receipt of the channel allocation signal, the terminal transmits an acknowledge signal to the base station via the reverse access channel by enabling the access channel generator 157. Upon receipt of the acknowledge signal transmitted from the terminal, the base station controller 101 transmits the voice data to the terminal via the forward fundamental channel by enabling the fundamental channel generator 111. Here, to transmit the control message while the high quality voice communication service is provided through the fundamental channel, the base station controller 101 enables the dedicated control channel generator 103 and transmits the control message via the forward dedicated control channel. At this moment, the terminal controller 151 also enables the reverse dedicated control channel generator 153 to transmit the control message to the base station via the reverse dedicated control channel. The control message transmitted through the dedicated control channel during the voice communication has the frame size of 20 ms. The base station may transmit the power control bit through the forward fundamental channel to control the transmission power of the terminal. In such a case, the base station controller 101 inserts the power control bits in specified positions and transmits them through the forward fundamental channel by enabling the fundamental channel generator 111.

To terminate the communication during the high quality voice communication service, the base station controller 101 transmits the channel termination request signal via the forward fundamental channel by enabling the fundamental channel generator 111. Upon receipt of the channel termination request signal, the terminal controller 151 transmits an acknowledge signal to the base station through the reverse fundamental channel by enabling the fundamental channel generator 159. Then, the base station controller 101 releases the fundamental channel, thus terminating the voice communication. The fundamental channel can transmit the power control signal and the voice signal only, so that this communication method has the higher communication quality as compared to the common voice communication method of transmitting all the control messages by using the conventional dim-and-burst or blank-and-burst method.

As described above, for the high quality voice communication, the base station and the terminal allocate the fundamental channel to be used through the dedicated control channel. After allocation of the fundamental channel, the base station and the terminal service the voice communication function via the allocated fundamental channel and transmit the control message through the dedicated control channel in case it has the control message to transmit while performing the voice communication via the fundamental channel. In the meantime, when the voice communication is completed, the fundamental channel is released thereby terminating the voice communication service. Further, a short and urgent control message such as a channel allocation/release message is transmitted in the 5 ms frame, whereas the normal control message such as a handoff message is transmitted in the 20 ms frame.

Figure 18A:
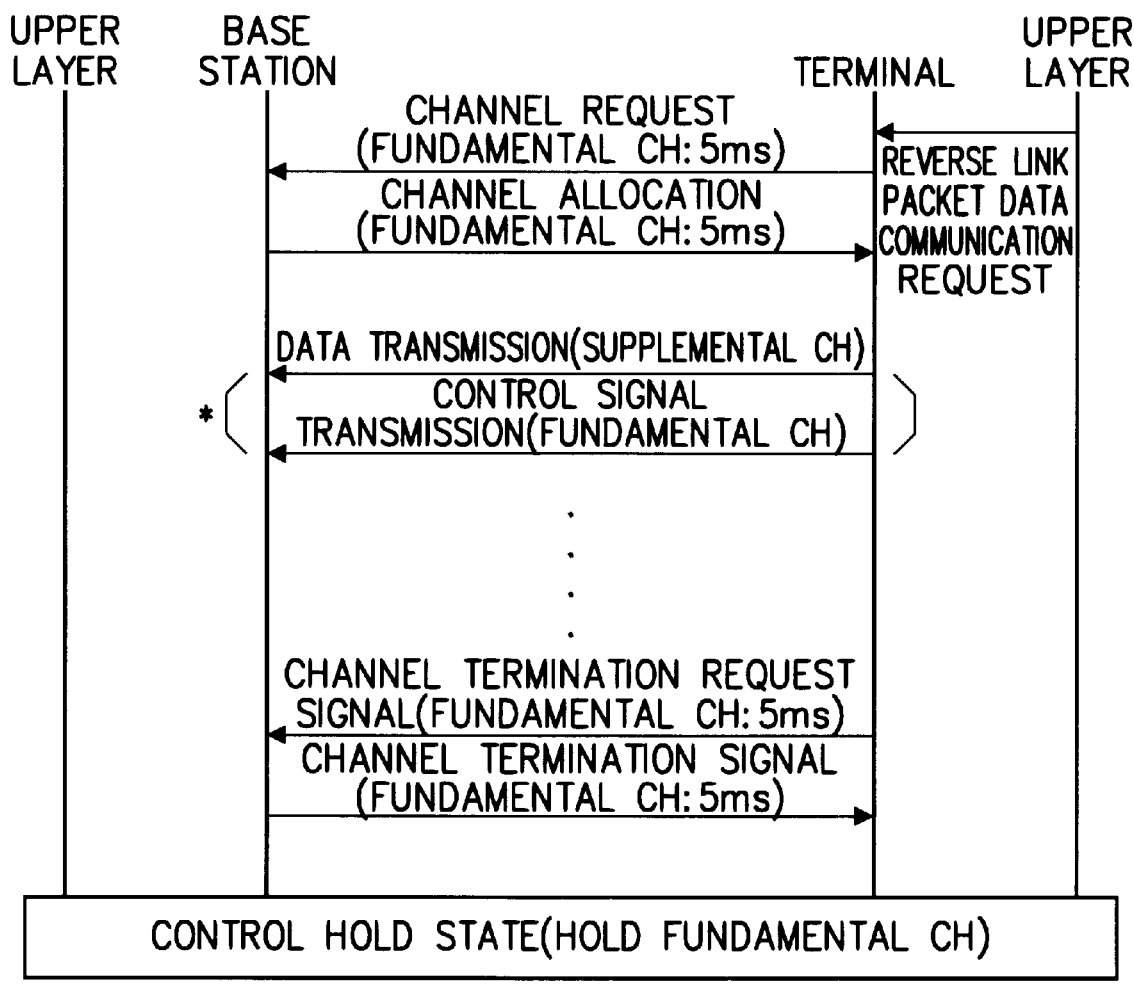
FIGS. 18A and 18B are flow charts illustrating the procedure for performing the data communication in the CDMA communication system according to a first embodiment of the present invention.
Figure 18B:
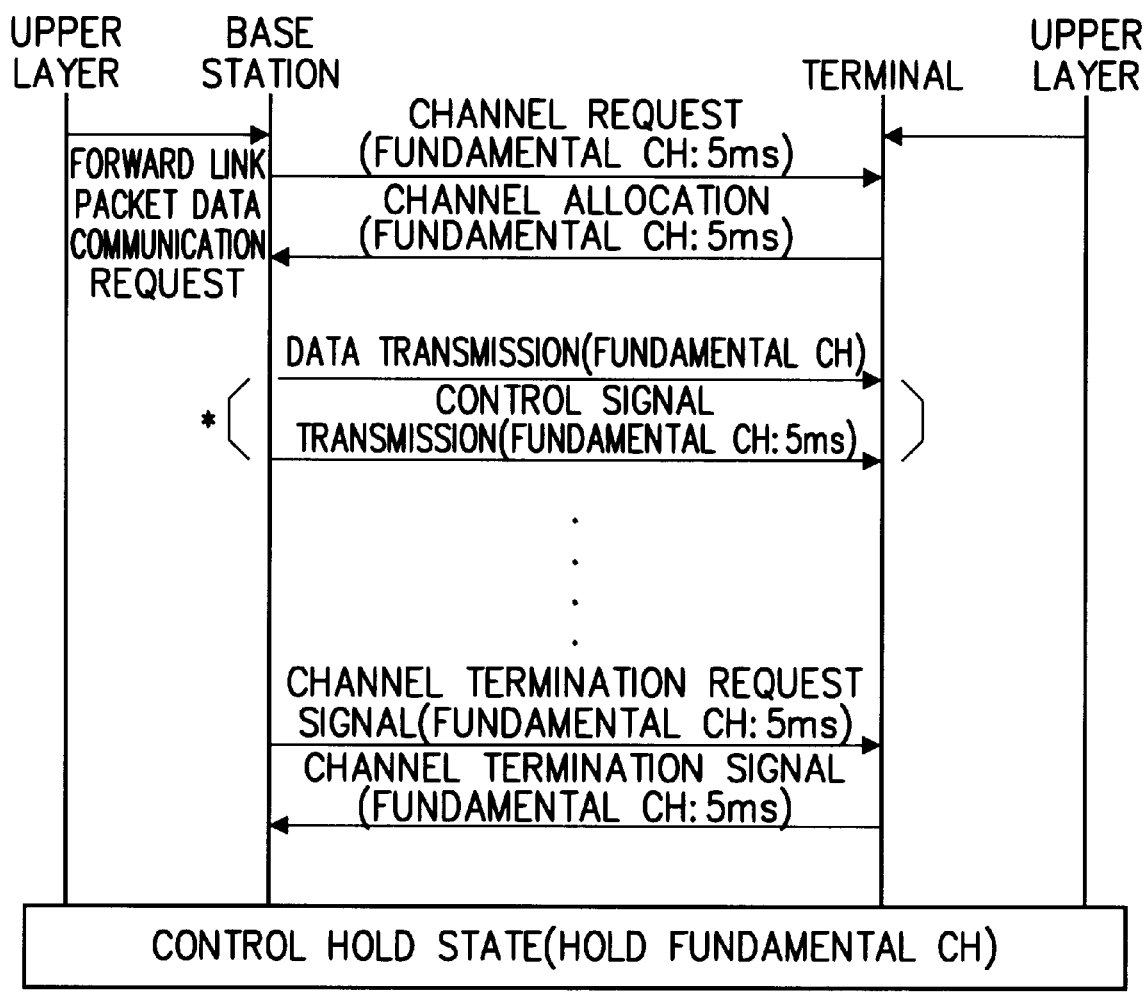

Third, the communication may be performed using the forward link composed of the pilot channel, the fundamental channel and the supplemental channel. In such a case, the power control signal and the other control message are transmitted via the fundamental channel. FIG. 18B shows a flow chart for providing a forward link packet data communication service, where the forward link is composed of the pilot channel, the fundamental channel and the supplemental channel.

Upon receiving a forward link packet data communication request signal from the upper layer entity of the base station, the base station controller 101 transmits a allocation request signal for the supplemental channel through the forward fundamental channel by enabling the fundamental channel generator 111. Upon receipt of the channel allocation request signal, the terminal controller 151 transmits an acknowledge signal to the base station via the reverse fundamental channel by enabling the fundamental channel generator 159. Here, the control message transmitted through the fundamental channel has the frame size of 5 ms. Upon receipt of the acknowledge signal, the base station controller 101 transmits the packet data through the forward supplemental channel by enabling the supplemental channel generator 113. When it is necessary to transmit the control message during the packet data communication through the allocated supplemental channel, the base station controller 101 transmits the control message of the 20 ms frame through the forward fundamental channel by enabling the fundamental channel generator 111. Likewise, when it is necessary to transmit the control message during the packet data communication through the allocated supplemental channel, the terminal also transmits the control message of the 20 ms frame through the reverse fundamental channel by enabling the fundamental channel generator 159.

During the packet data communication, the base station may transmit the power control bit through the forward fundamental channel to control the transmission power of the terminal. In this case, the base station controller 101 inserts the power control bits in specified positions and transmit them through the forward fundamental channel by enabling the fundamental channel generator 111.

To terminate the packet data communication, the base station controller 101 transmits a channel termination request signal for the supplemental channel through the forward fundamental channel by enabling the fundamental channel generator 111, and upon receipt of the channel termination request signal, the terminal controller 151 transmits a channel termination signal to the base station via the reverse fundamental channel by enabling the fundamental channel generator 159. Here, the control message transmitted through the fundamental channel has the frame size of 5 ms. Through an interchange of the call termination request signal, the supplemental channel currently in use for the packet data communication is released, but the fundamental channel goes to a control hold state. In the control hold state, the base station can transmit the control message to the terminal through the forward fundamental channel and control the transmission power of the terminal by transmitting the power control signal at a specified time through the forward fundamental channel.

As described above, when the control message is transmitted via the fundamental channel and the packet data is transmitted via the supplemental channel, the base station and the terminal allocate the supplemental channel for the packet data service through the fundamental channel. After allocation of the supplemental channel, the base station and the terminal perform the data communication via the allocated supplemental channel, and transmit the control message via the fundamental channel if the control message to be transmitted is generated while performing the packet data service through the supplemental channel. Further, while transmitting the packet data via the supplemental channel, the forward power control is performed by using the fundamental channel. Upon completion of the packet data communication service, the base station requests the channel release via the fundamental channel. In this case, the supplemental channel is released thereby terminating the packet data communication service, but the fundamental channel holds the connection state. Preferably, the control message such as the channel allocation/release message which are relatively short and should be managed promptly has the frame size of 5 ms, whereas the normal control message such as the handoff message has the frame size of 20 ms.

Figure 20A:
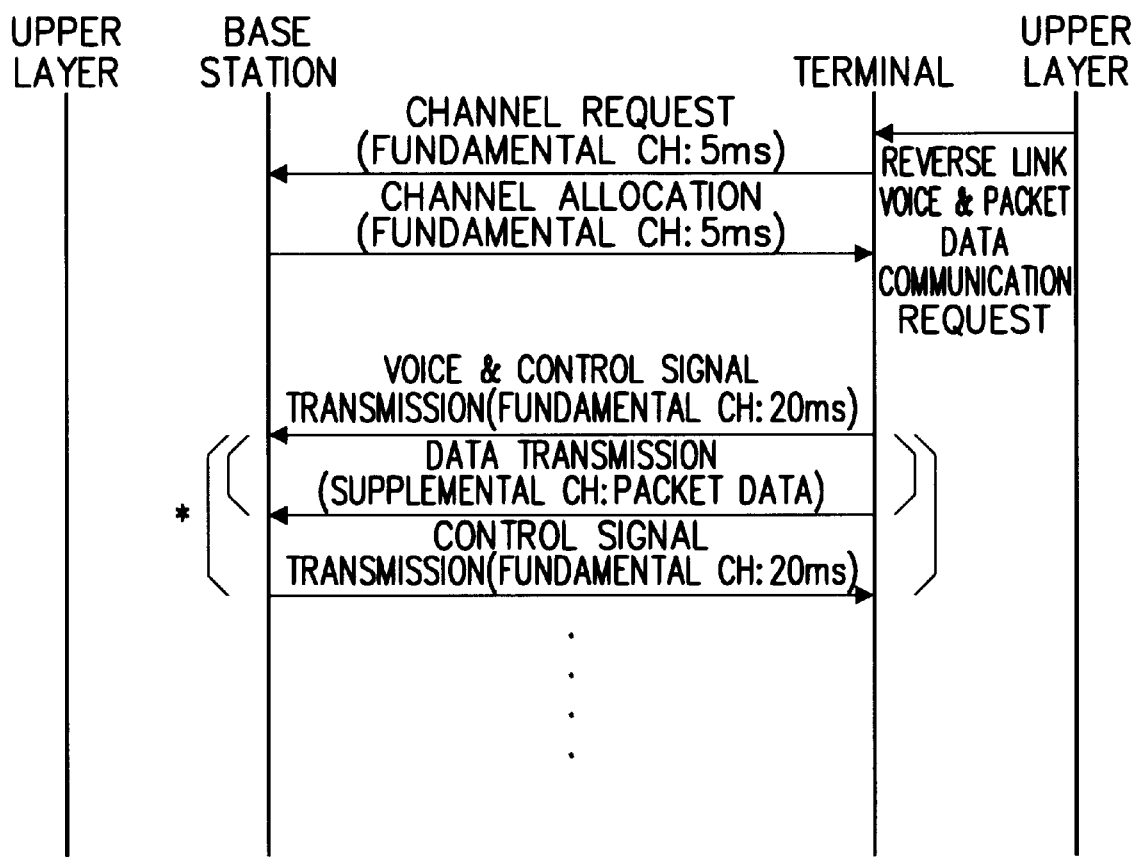
FIGS. 20A and 20B are flow charts illustrating the procedure for performing the voice and packet data communication in the CDMA communication system according to a first embodiment of the present invention.
Figure 20B:
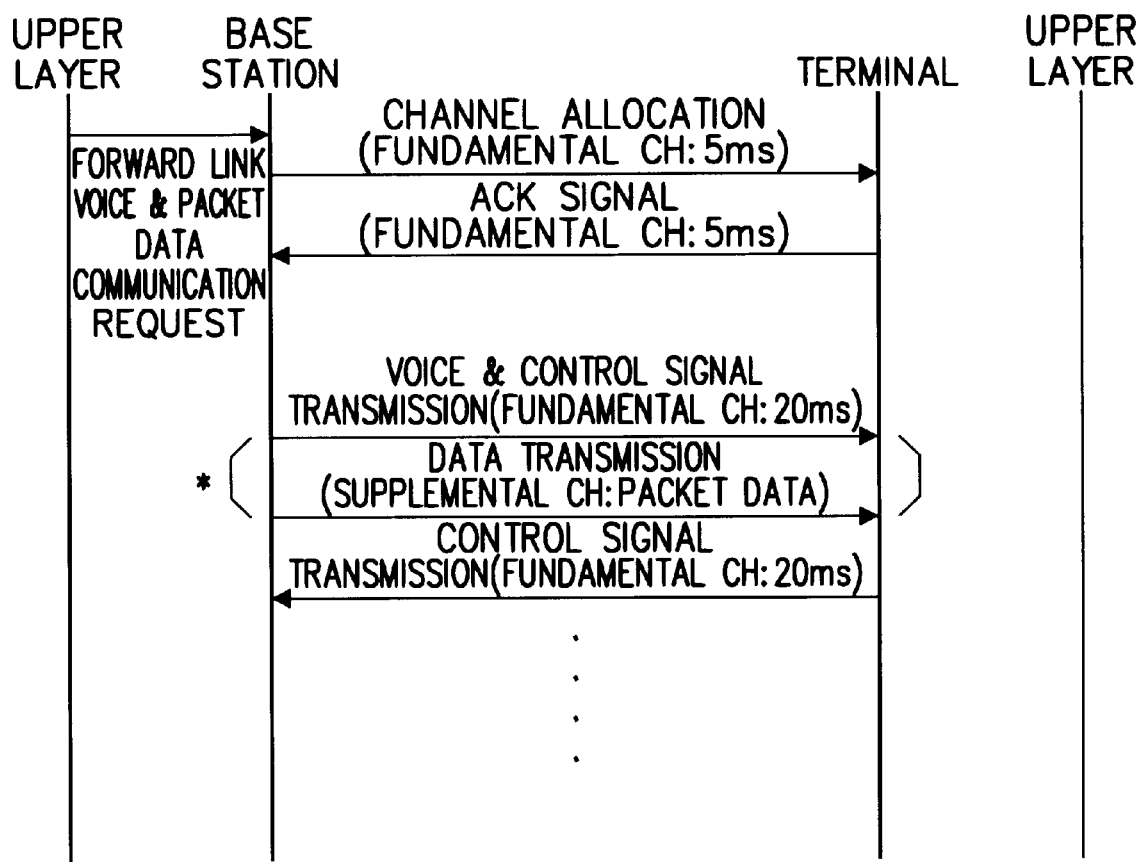

Fourth, the communication may be performed by using the forward link consisting of the pilot channel, the fundamental channel and the supplemental channel. In such a case, the voice communication service is provided through the fundamental channel and the packet data service is provided through the supplemental channel. Further, the power control signal and the other control messages are transmitted via the fundamental channel. FIG. 20B shows a flow chart for providing a forward link voice and packet data communication service, where the forward link is composed of the pilot channel, the fundamental channel and the supplemental channel.

When receiving a forward link voice and packet data communication request signal from the upper layer entity of the base station, the base station controller 101 transmits a channel allocation request signal for the supplemental channel, for servicing the packet data, to the terminal through the forward fundamental channel by enabling the fundamental channel generator 111. Then, upon receipt of the channel allocation request signal, the terminal transmits an acknowledge signal to the base station via the reverse fundamental channel by enabling the fundamental channel generator 159. Here, the control message transmitted through the fundamental channel has the frame size of 5 ms. The base station then transmits the packet data through the allocated forward supplemental channel by enabling the supplemental channel generator 113, and the voice signal through the forward fundamental channel by enabling the fundamental channel generator 111. In the forward link, all the control messages including the power control signal are transmitted via the fundamental channel.

Figure 19A:
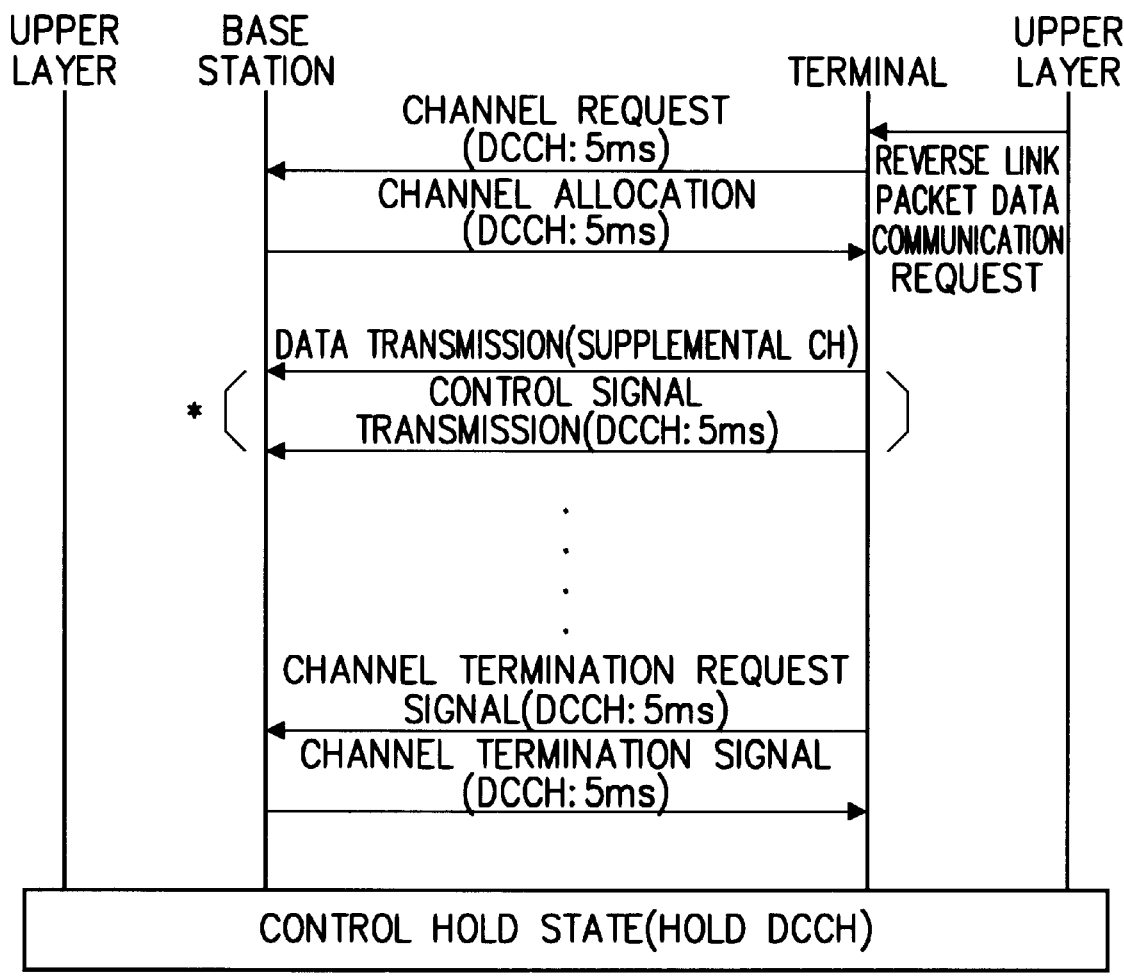
FIGS. 19A and 19B are flow charts illustrating the procedure for performing the data communication in the CDMA communication system according to a second embodiment of the present invention.
Figure 19B:
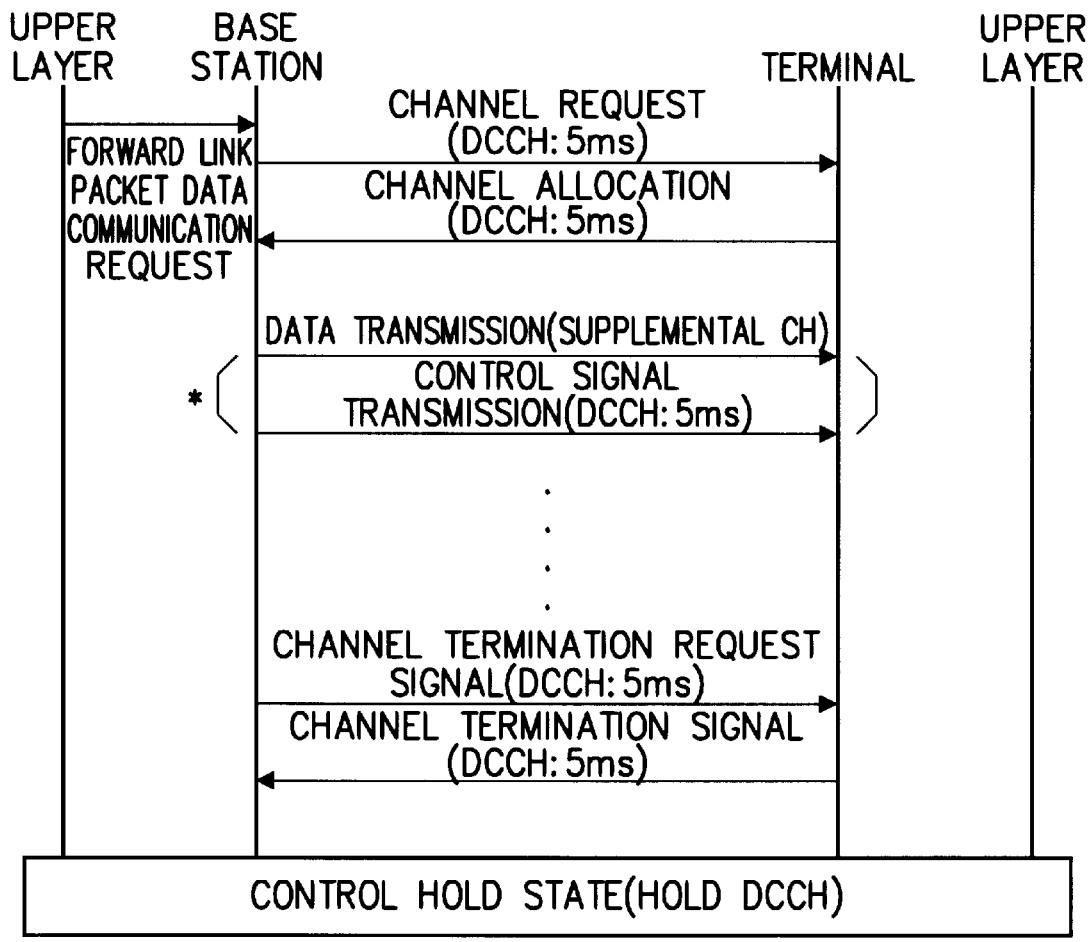

Fifth, the communication may be performed by using the forward link consisting of the pilot channel, the dedicated control channel and the supplemental channel. In such a case, the power control signal and the other control messages are transmitted via the dedicated control channel. FIG. 19B shows a flow chart for providing a forward link packet data communication service, where the forward link is composed of the pilot channel, the dedicated control channel and the supplemental channel.

When receiving a forward link packet data communication request signal from the upper layer entity of the base station, the base station controller 101 transmits a channel allocation request signal for the supplemental channel via the forward dedicated control channel by enabling the dedicated control channel generator 103. Upon receipt of the channel allocation request signal, the terminal transmits an acknowledge signal through the reverse dedicated control channel by enabling the dedicated control channel generator 153. Here, the control message transmitted through the dedicated control channel has the frame size of 5 ms. Upon receipt of the acknowledge signal, the base station controller 101 transmits the packet data through the forward supplemental channel by enabling the supplemental channel generator 113. If it is necessary to transmit the control message while servicing the packet data through the supplemental channel, the base station controller 101 transmits the control message of the 20 ms frame through the forward dedicated control channel by enabling the dedicated control channel generator 103. Similarly, if it is necessary to transmit the control message while servicing the packet data through the allocated supplemental channel, the terminal also transmits the control message of the 20 ms frame to the base station through the reverse dedicated control channel by enabling the dedicated control channel generator 153. To control the transmission power of the terminal during the packet data communication service, the base station can transmit the power control bit through the forward dedicated control channel. In this case, the base station controller 101 inserts the power control bits in the specified positions and transmits them via the forward dedicated control channel by enabling the dedicated control generator 103.

To terminate the packet data communication service, the base station controller 101 transmits a channel termination request signal for the supplemental channel through the forward dedicated control channel by enabling the dedicated control channel generator 103. Upon receipt of the channel termination request signal, the terminal controller 151 transmits a channel termination signal to the base station via the reverse dedicated control channel by enabling the dedicated control channel generator 153. Here, the control message transmitted through the dedicated control channel has the frame size of 5 ms. By way of the interchange of the channel termination request signal, the supplemental channel currently in use for the packet data communication is released, but the dedicated control channel goes to the control hold state. In the control hold state, the base station can transmit the control message to the terminal through the forward dedicated control channel and control the transmission power of the terminal by transmitting the power control signal at a specified time through the forward dedicated control channel.

As described above, when transmitting the packet data communication through the supplemental channel and transmitting the control message through the dedicated control channel, the base station and the terminal allocate the supplemental channel for the packet data service through the dedicated control channel. After allocation of the supplemental channel, the base station and the terminal perform the packet data communication via the allocated supplemental channel, and transmit the control message through the dedicated control channel when the control message to be transmitted is generated. Meanwhile, when the packet data communication service is completed, the base station requests the channel release. Then, the supplemental channel is release thereby terminating the packet data communication service, but the dedicated control channel holds its connection state. During transmission of the control message through the dedicated control channel, the control messages such as the channel allocation and release messages which have the short frame size and should be managed promptly are transmitted in the 5 ms frame, whereas the normal control message such as the handoff message is transmitted in the 20 ms frame.

Figure 22A:
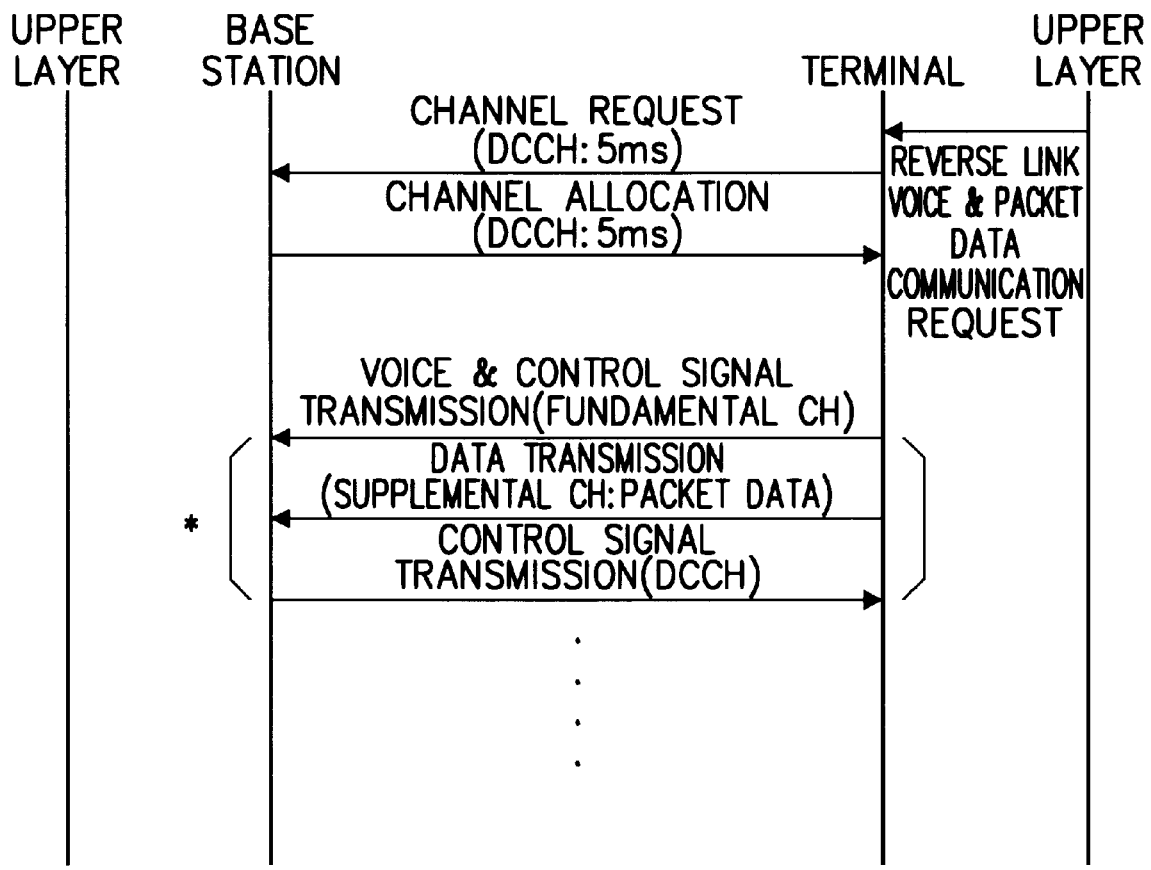
FIGS. 22A and 22B are flow charts illustrating the voice and packet data communication in the CDMA communication system according to a third embodiment of the present invention.
Figure 22B:
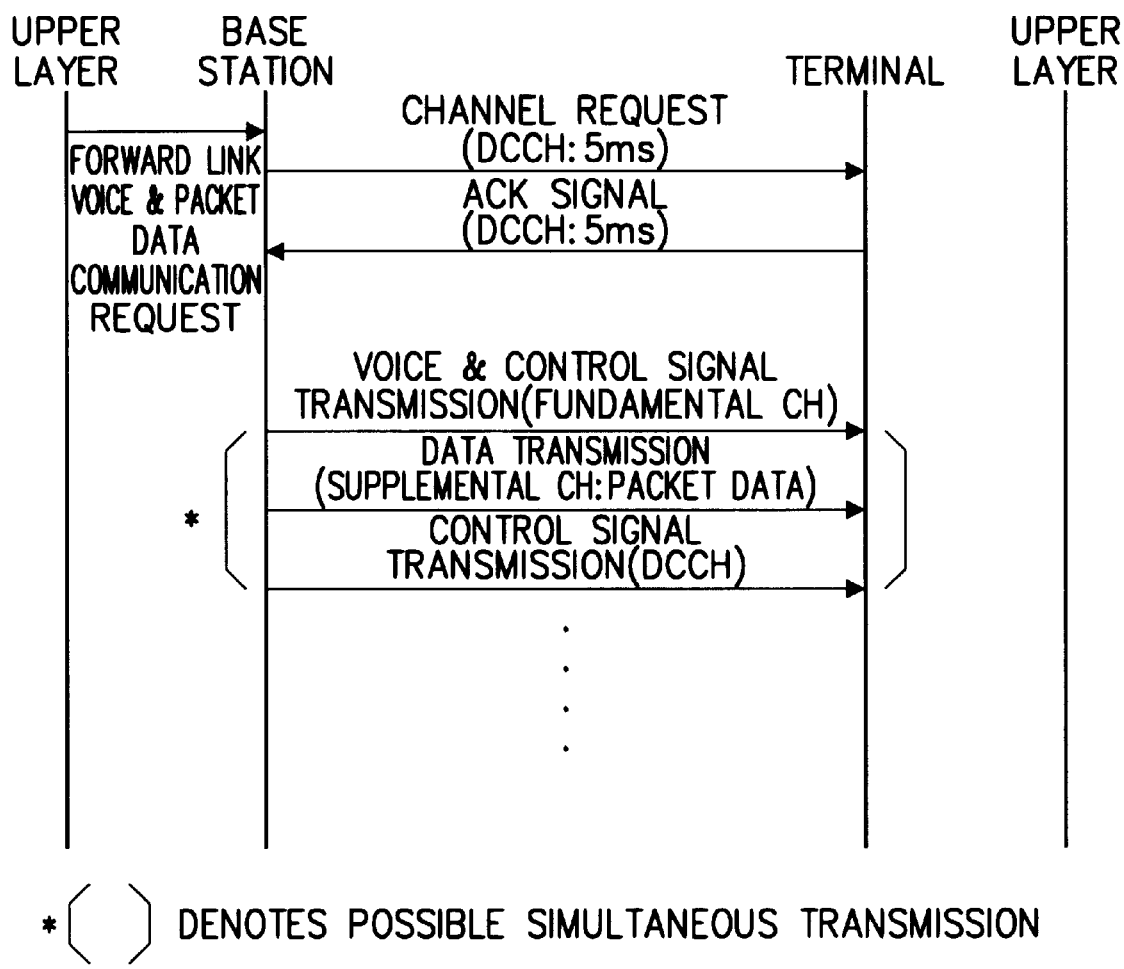

Sixth, the communication may be performed by using the forward link consisting of the pilot channel, the dedicated control channel, the fundamental channel and the supplemental channel. In such a case, the power control signal and the control messages related to the fundamental channel are transmitted through the fundamental channel. Further, the control messages pertinent to supplemental channel are transmitted through the dedicated control channel. FIG. 22B shows a flow chart for providing a forward link voice and packet data communication service, where the forward link is composed of the pilot channel, the dedicated control channel, the fundamental channel and the supplemental channel.

When receiving the voice and packet data communication service request signal from the upper layer entity of the base station, the base station controller 101 transmits a control message for the channel allocation to the terminal via the forward dedicated control channel by enabling the dedicated control channel generator 103. Upon receipt of the control message for the channel allocation, the terminal controller 151 transmits an acknowledge signal to the base station via the reverse dedicated control channel by enabling the dedicated control channel generator 153. Here, the control message transmitted through the dedicated control channel has the frame size of 5 ms. The base station then transmits the packet data through the allocated forward supplemental channel, and transmits the voice and the control message for controlling the voice through the forward fundamental channel by the dim-and-burst or blank-and-burst method. In the forward link, the power control signal is transmitted through the fundamental channel. Since the supplemental channel is connected only when it has the data to transmit, there might exist a situation that the voice communication only is provided without connecting the supplemental channel.

Figure 21A:
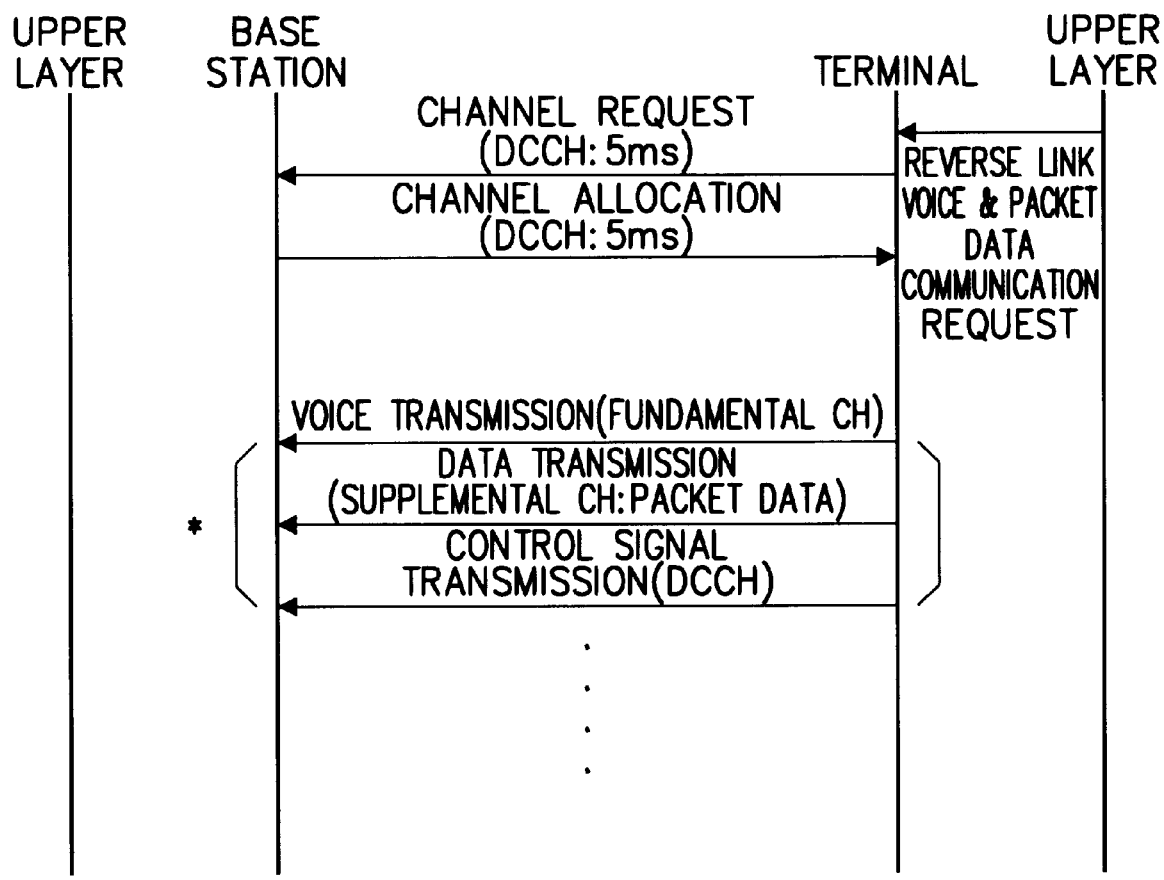
FIGS. 21A and 21B are flow charts illustrating the procedure for performing the voice and packet data communication in the CDMA communication system according to a second embodiment of the present invention.
Figure 21B:
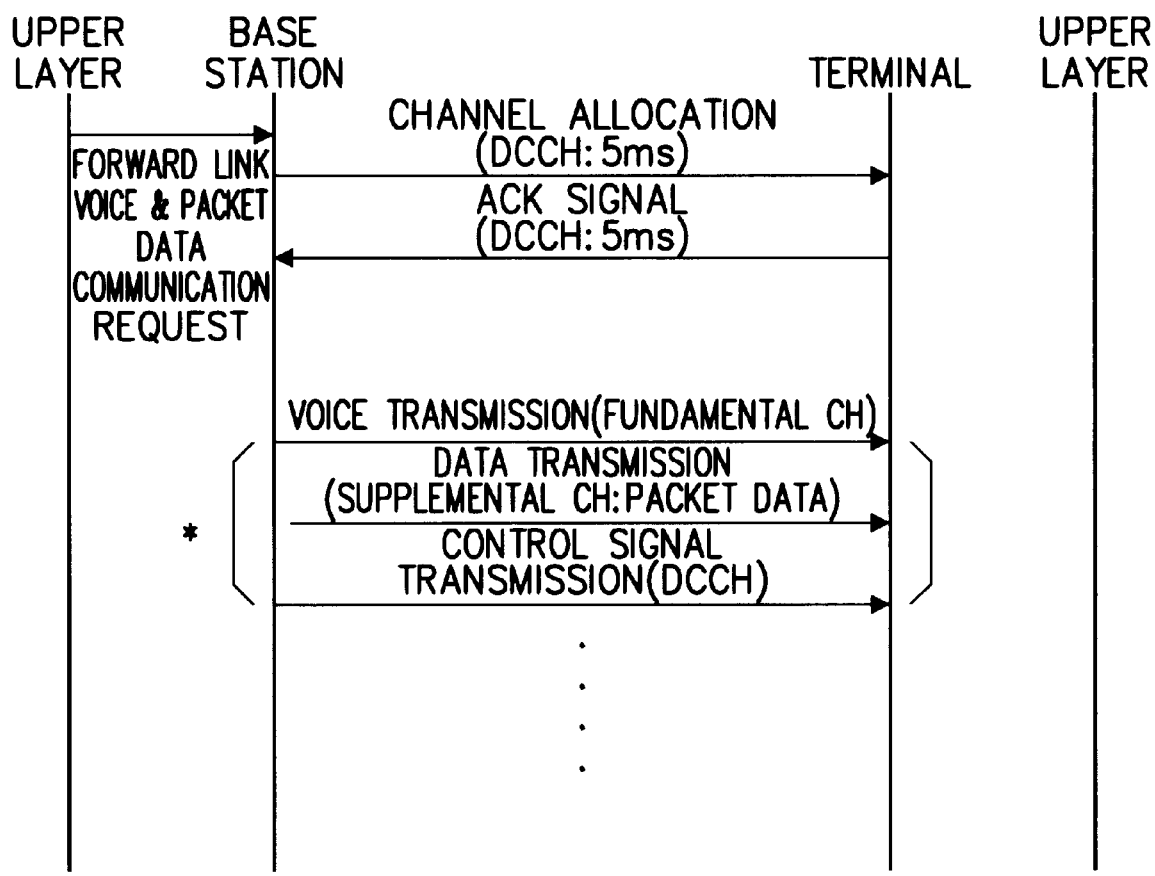

Seventh, the communication may be performed by using the forward link consisting of the pilot channel, the dedicated control channel, the fundamental channel and the supplemental channel. In such a case, the voice communication service is provided through the fundamental channel and the packet data service is provided through the supplemental channel. Further, the power control signal is transmitted through the fundamental channel and the control messages pertinent to the fundamental channel and the supplemental channel are transmitted to through the dedicated control channel. FIG. 21B shows a flow chart for providing a forward link voice and packet data communication service, where the forward link is composed of the pilot channel, the dedicated control channel, the fundamental channel and the supplemental channel.

On receiving a voice and packet data communication request signal from the upper layer entity of the base station, the base station controller 101 outputs a control message for allocating the fundamental channel and the supplemental channel to the terminal through the forward dedicated control channel by enabling the dedicated control channel generator 103. Upon receipt of the control message, the terminal transmits an acknowledge signal to the base station through the reverse dedicated control channel by enabling the dedicated control channel generator 153. Here, the control message transmitted through the dedicated control channel has the frame size of 5 ms. The base station then transmits the voice via the forward fundamental channel and the packet data via the forward supplemental channel by enabling the fundamental channel generator 111 and the supplemental channel generator 113. The control message in the forward link is transmitted through the dedicated control channel, and the power control signal is transmitted through the fundamental channel.

Furthermore, the reverse link communication may also be performed in the seven methods described hereinbelow.

First, the communication may be performed using the reverse link composed of the pilot channel and the fundamental channel. In such a case, all the control messages are transmitted through the fundamental channel by using the dim-and-burst or blank-and-burst method. However, when the communication is performed through the reverse link, the power control signal is ordinarily transmitted through the pilot channel. FIG. 16A shows a flow chart for providing a reverse link normal voice communication service, where the reverse link is composed of the pilot channel and the fundamental channel.

Conventionally, to transmit the voice signal after the call setup so as to provide the reverse link normal voice communication service, the pilot channel and the fundamental channel should be used together with the control channel for transmitting the power control signal. However, in the embodiment of the present invention, the power control signal is transmitted through the pilot channel, so that the voice signal may be transmitted using both the pilot channel and the fundamental channel without allocating the other channels. Compared to the conventional system, the system according to the present invention uses the fewer channels, thereby reducing the peak-to-average ratio. As a result, as compared to the prior art, the terminal may have the wider coverage even with the same power and have the reduced complexity of the receiver.

When receiving a reverse link normal voice communication request signal from the upper layer entity of the terminal, the terminal controller 151 transmits a channel request signal to the base station via the access channel by enabling the access channel generator 157. Upon receipt of the channel request signal, the base station controller 101 transmits the information pertinent to the channel allocation and the parameters pertinent to adjacent cells to the terminal via the paging channel by enabling the paging channel generator 109. The terminal then transmits an acknowledge signal to the base station by means of the access channel generator 157 upon receipt of the channel allocation information. Upon receiving the acknowledge signal, the base station prepares to receive the signals from the terminal via the fundamental channel allocated by enabling the fundamental channel generator 111, and the terminal transmits the voice signal to the base station via the fundamental channel allocated by enabling the fundamental channel generator 159. The base station and the terminal interchange the voice signal through the forward and reverse fundamental channels allocated by enabling the forward fundamental channel generator 111 and the reverse fundamental channel generator 159, and transmit the control messages excluding the power control signal by adding them to the transmission voice data using the dim-and-burst or blank-and-burst method. Further, to control the transmission power, the terminal controller 151 adds the power control signal to the pilot signal and transmits it to the base station through the pilot channel by enabling the pilot channel generator 155. To terminate the data transmission while providing the voice communication through the allocated fundamental channel, the terminal transmits a data transmission end signal to the base station by means of the fundamental channel generator 159, and upon receipt of the data transmission end signal, the base station transmits an acknowledge signal to the terminal by means of the fundamental channel generator 111 and terminates the voice communication by releasing the connected fundamental channel.

Second, the communication may be performed using the reverse link composed of the pilot channel, the dedicated control channel and the fundamental channel. In such a case, all the messages excluding the power control signal is transmitted through the dedicated control channel. In the reverse link communication, the power control signal is normally transmitted through the pilot channel. FIG. 17A shows a flow chart for providing a reverse link high quality voice communication service, where the reverse link is composed of the pilot channel, the dedicated control channel and the fundamental channel.

When receiving a reverse link high quality voice communication request signal from the upper layer entity of the terminal, the terminal controller 151 transmits a channel allocation request signal to the base station through the access channel by enabling the access channel generator 157. Upon receiving the channel allocation request signal from the access channel generator 157, the base station controller 101 transmits a channel allocation signal through the forward paging channel by enabling the paging channel generator 109. On receiving the channel allocation signal, the terminal transmits data through the fundamental channel allocated by enabling the fundamental channel generator 159, and if necessary, transmits the control signal through the dedicated control channel by enabling the dedicated control channel generator 155. Here, the control message has the frame size of 20 ms.

To terminate the communication during the high quality voice communication service, the terminal controller 151 transmits a channel termination request signal via the reverse fundamental channel by enabling the fundamental channel generator 159. Upon receipt of the channel termination request signal, the base station controller 101 transmits a channel termination signal to the terminal through the forward fundamental channel by enabling the fundamental channel generator 111. The terminal then releases the channel at a specified time. The control message transmitted through the fundamental channel has the frame size of 5 ms. The reverse pilot channel generator 155 transmits the pilot signal together with the power control signal, and the other control signals are transmitted through the dedicated control channel. Accordingly, the fundamental channel can transmit the control message for releasing the fundamental channel and the voice signal only, thereby improving the communication quality as compared to the existing voice communication method of transmitting the control message by using the dim-and-burst or blank-and-burst method.

Third, the communication may be performed using the reverse link composed of the pilot channel, the fundamental channel and the supplemental channel. In such a case, all the control messages excluding the power control signal are transmitted via the fundamental channel. In the reverse link communication, the power control signal is normally transmitted through the pilot channel. FIG. 18A shows a flow chart for providing a reverse link packet data communication service, where the reverse link is composed of the pilot channel, the fundamental channel and the supplemental channel.

The conventional communication system should use the pilot channel, the supplemental channel, the fundamental channel and the control channel to transmit the packet data after the call setup in order to provide the reverse link packet data communication. Though most control messages for the supplemental channel are transmitted through the fundamental channel, the conventional system should use even the control channel to transmit the power control signal. However, in the reverse link communication, the invention system transmits the power control signal through the pilot channel, so that it can transmit only the packet data through the supplemental channel and only the control message through the fundamental channel. In the prior art system, the four channels of the pilot channel, the supplemental channel, the fundamental channel and the control channel are used to transmit the packet data. However, in the present invention, the three channels of the pilot channel, the supplemental channel and the fundamental channel are used to transmit the packet data. Therefore, the communication system of the invention can reduce the peak-to-average ratio by using the fewer channels, as compared to the conventional system, and can also reduce the complexity of the receiver.

When receiving a reverse link packet data communication request signal from the upper layer entity of the terminal, the terminal controller 151 transmits a channel allocation request signal through the reverse fundamental channel by enabling the fundamental channel generator 159. The base station controller 101 then transmits a channel allocation signal for the supplemental channel, through which the packet data communication is to be provided, via the forward fundamental channel by enabling the fundamental channel generator 111. Here, the used control message has the frame size of 5 ms. Being provided with the supplemental channel allocated through the forward fundamental channel, the terminal controller 151 transmits the packet data through the reverse supplemental channel by enabling the supplemental channel generator 161. During transmission of the packet data, the terminal controller 151 transmits, if necessary, the control message via the reverse fundamental channel by enabling the fundamental channel generator 159. Here, the control message transmitted at this moment has the frame size of 20 ms. Further, the base station controller 101 also transmits the packet data through the forward supplemental channel by enabling the supplemental channel generator 113, and transmits, when necessary, the control data through the forward fundamental channel by enabling the fundamental channel generator 111. The control message transmitted at this moment also has the frame size of 20 ms.

To terminate the packet data communication, the terminal controller 151 transmits a channel termination request signal through the reverse fundamental channel by enabling the fundamental channel generator 159, and upon receipt of the channel termination request signal, the base station controller 101 transmits a channel termination signal to the terminal via the forward fundamental channel by enabling the fundamental channel generator 111. Here, the control message transmitted through the fundamental channel has the frame size of 5 ms. Through an interchange of the channel termination request signal, the supplemental channel currently in use for the packet data communication is released, but the fundamental channel goes to the control hold state. In the control hold state, the reverse pilot channel generator 155 transmits the power control signal together with the pilot signal at a specified time and the other control signals are transmitted through the fundamental channel which holds the connection state.

Fourth, the communication may be performed by using the reverse link consisting of the pilot channel, the fundamental channel and the supplemental channel. In such a case, the voice communication service is provided through the fundamental channel and the packet data service is provided through the supplemental channel. Further, the control messages are transmitted via the fundamental channel. FIG. 20A shows a flow chart for providing a reverse link voice and packet data communication service, where the reverse link is composed of the pilot channel, the fundamental channel and the supplemental channel.

Conventionally, the pilot channel, the fundamental channel, the supplemental channel and the control channel should be used to transmit the voice signal and the packet data for the reverse link voice and packet data communication service. However, in the present invention, the power control signal of the reverse link is transmitted through the pilot channel, so that the supplemental channel transmits only the packet data and the fundamental channel transmits only the voice signal and the control message. Conventionally, the four channels of the pilot channel, the supplemental channel, the fundamental channel and the control channel are used to transmit the voice and packet data. However, in the invention, the three channels of the pilot channel, the fundamental channel and the supplemental channel are used to transmit the voice and packet data. Therefore, the communication system of the invention can reduce the peak-to-average ratio by using the fewer channels as compared to the conventional communication system.

When receiving a reverse link voice and packet data communication request signal from the upper layer entity of the terminal, the terminal controller 151 transmits a channel allocation request signal for the supplemental channel to the base station through the reverse fundamental channel by enabling the fundamental channel generator 159. Upon receipt of the channel allocation request signal, the base station controller 101 allocates the supplemental channel to the terminal through the forward fundamental channel by enabling the fundamental channel generator 111. Here, the used control message has the frame size of 5 ms. The terminal controller 151 then transmits the packet data through the reverse supplemental channel allocated by enabling the supplemental channel generator 161 and the voice signal through the reverse fundamental channel by enabling the fundamental channel generator 159. Here, the power control signal in the reverse link is transmitted via the pilot channel and the other control messages are transmitted through the fundamental channel.

Fifth, the communication may be performed by using the reverse link consisting of the pilot channel, the dedicated control channel and the supplemental channel. In such a case, all the control messages excluding the power control signal are transmitted through the dedicated control channel, and the power control signal is normally transmitted through the pilot channel when the communication is performed via the reverse link. FIG. 19A shows a flow chart for providing a reverse link packet data communication service, where the reverse link is composed of the pilot channel, the dedicated control channel and the supplemental channel.

Conventionally, for the reverse link packet data communication, the pilot channel, the supplemental channel, the fundamental channel and the control channel should be used to transmit the packet data after the call setup. Though most of the control messages for the supplemental channel are transmitted through the fundamental channel, the conventional communication system should use even the control channel to transmit the power control signal. In the invention, however, the power control signal of the reverse link is transmitted through the pilot channel, so that the supplemental channel transmits the packet data only and the dedicated control channel transmits the control messages only. Although the conventional communication system uses four channels of the pilot channel, the supplemental channel, the fundamental channel and the control channel, the novel communication system uses three channels of the pilot channel, the supplemental channel and the dedicated control channel, thereby reducing the peak-to-average ratio using the fewer channels as compared to the conventional system and reducing the complexity of the receiver.

When receiving a reverse link packet data communication request signal from the upper layer entity of the terminal, the terminal controller 151 transmits a channel allocation request signal via the reverse dedicated control channel by enabling the dedicated control channel generator 153. Upon receipt of the channel allocation request signal, the base station controller 101 transmits a channel allocation signal for the supplemental channel, for providing the packet data communication, via the forward dedicated control channel by enabling the dedicated control channel generator 103. The control message used at this moment has the frame size of 5 ms. Then, the terminal controller 151 transmits the packet data through the reverse supplemental channel by enabling the supplemental channel generator 161. If it is necessary to transmit the control message while transmitting the packet data, the terminal controller 151 transmits the control message having the frame size of 20 ms through the reverse dedicated control channel by enabling the dedicated control channel generator 153. The base station controller 101 also transmits the packet data via the forward supplemental channel by enabling the supplemental channel generator 113, and the control message through the forward dedicated control channel by enabling the dedicated control channel generator 103, when necessary. In this case, the control message has the frame size of 20 ms. To control transmission power of the base station during the packet data communication, the terminal controller 151 transmits the power control signal through the reverse pilot channel.

To terminate the packet data communication service while transmitting the packet data through the supplemental channel and the control message through the dedicated control channel, the terminal controller 151 transmits a channel termination request signal through the reverse dedicated control channel by enabling the dedicated control channel generator 153. Upon receipt of the channel termination request signal, the base station controller 101 transmits a channel termination signal to the terminal via the forward dedicated control channel by enabling the dedicated control channel generator 103. Here, the control message transmitted through the dedicated control channel has the frame size of 5 ms. By way of the interchange of the channel termination request signal, the supplemental channel currently in use for the packet data communication is released, but the dedicated control channel goes to the control hold state. In the control hold state, the reverse pilot channel generator 155 transmits the power control signal together with the pilot signal at a specified time and the other control signals are transmitted through the dedicated control channel which holds the connection state.

Sixth, the communication may be performed by using the reverse link consisting of the pilot channel, the dedicated control channel, the fundamental channel and the supplemental channel. In such a case, the control message pertinent to the fundamental channel is transmitted through the fundamental channel and the control message pertinent to the supplemental channel is transmitted through the dedicated control channel. When the communication is performed through the reverse link, the power control signal is normally transmitted through the pilot channel. FIG. 22A shows a flow chart for providing a reverse link voice and packet data communication service, where the reverse link is composed of the pilot channel, the dedicated control channel, the fundamental channel and the supplemental channel.

Conventionally, for the reverse link voice and packet data communication, the pilot channel, the supplemental channel, the fundamental channel and the control channel should be used to transmit the packet data after the call setup. Referring to FIG. 22A, the supplemental channel transmits only the packet data, the fundamental channel transmits only the voice signal to be transmitted through the fundamental channel and the control message for controlling the voice signal, and the dedicated control channel transmits the control message for controlling the supplemental channel. The conventional system uses four channels of the pilot channel, the supplemental channel, the fundamental channel and the control channel in order to transmit the voice and packet data. The invention system also uses four channels of the pilot channel, the supplemental channel, the fundamental channel and the dedicated control channel. However, in the conventional system, since the control channel has a small capacity, most of the control messages for the supplemental channel are transmitted through the fundamental channel, thereby deteriorating the quality of the voice signal and the packet data However, the invention system transmits the power control bit through the pilot channel, transmits the control message for the voice signal through the fundamental channel by using the dim-and-burst or blank-and-burst method, and transmits the control message for the supplemental channel through the dedicated control channel. Therefore, as compared to the conventional system, the new system can improve the quality of the voice and packet data.

When receiving a voice and packet data communication service request signal from the upper layer entity of the terminal, the terminal controller 151 transmits a channel allocation request signal to the base station via the reverse dedicated control channel by enabling the dedicated control channel generator 153. Upon receipt of the channel allocation request signal, the base station controller 101 transmits a control message for allocating the supplemental channel through the forward dedicated control channel by enabling the dedicated control channel generator 103. Here, the control message transmitted through the dedicated control channel has the frame size of 5 ms. The terminal then transmits the packet data through the reverse supplemental channel allocated by enabling the supplemental channel generator 161, and transmits the voice and the control message for controlling the voice through the reverse fundamental channel by enabling the fundamental channel generator 159. Here, the control message for controlling the voice is added to the fundamental channel by the dim-and-burst or blank-and-burst method and then transmitted. The pilot signal in the reverse link is transmitted through the pilot channel and the other control messages are transmitted through the dedicated control channel. The supplemental channel is connected only when it has the data to transmit and, otherwise, disconnected. Therefore, there might exist a circumstance that the voice communication is performed without connecting the supplemental channel. That is, the system may be under the circumstance that the reverse dedicated control channel is connected, and the voice and the control message for the voice are transmitted through the fundamental channel.

Seventh, the communication may be performed by using the reverse link consisting of the pilot channel, the dedicated control channel, the fundamental channel and the supplemental channel. In such a case, the fundamental channel provides the voice service only and the supplemental channel provides the packet data service only. Here, all the control messages pertinent to the fundamental channel and the supplemental channel are transmitted through the dedicated control channel, and the power control signal is normally transmitted through the pilot channel when the communication is performed through the reverse link. FIG. 21A shows a flow chart for providing a reverse link voice and packet data communication service, where the reverse link is composed of the pilot channel, the dedicated control channel, the fundamental channel and the supplemental channel.

To transmit the voice signal and the packet data after the call setup for the reverse link voice and packet data communication, the conventional system uses the pilot channel, the fundamental channel, the supplemental channel and the control channel. In the invention, however, the power control signal of the reverse link is transmitted through the pilot channel. Referring to FIGS. 21A and 21B, the supplemental channel transmits the packet data only, the fundamental channel transmits the voice signal only, and dedicated control channel transmits the control message. The conventional system should use four channels of the pilot channel, the supplemental channel, the fundamental channel and the control channel. The invention system also uses four channels of the pilot channel, the fundamental channel, the supplemental channel and the dedicated control channel. However, since the control channel has the low capacity, the conventional system transmits most of the control messages for the supplemental channel through the fundamental channel, which deteriorates the quality of the voice signal and the packet data. However, in the invention, the power control bit is transmitted through the pilot channel and all the control messages are transmitted through the dedicated control channel, thus improving the quality of the voice and packet data as compared to the conventional system.

When receiving a reverse link voice and packet data communication request signal from the upper layer entity of the terminal, the terminal controller 151 transmits a channel allocation request signal for the fundamental channel and the supplemental channel, through the reverse dedicated control channel by enabling the dedicated control channel generator 153. Upon receipt of the control message, the base station controller 101 allocates the supplemental channel through the forward dedicated control channel by enabling the dedicated control channel generator 103. Here, the control message transmitted through the dedicated control channel has the frame size of 5 ms. Then, the terminal controller 151 transmits the packet data through the reverse supplemental channel allocated by enabling the supplemental channel generator 161 and the voice signal through the reverse fundamental channel allocated by enabling the fundamental channel generator 159. The power control signal of the reverse link is transmitted through the pilot channel and the other control messages are transmitted through the dedicated control channel.

As illustrated in FIGS. 17A to 22B, the communication system of the invention independently uses the channel for transmitting the control message while performing the voice and/or packet data communication. That is, as shown in FIGS. 17A and 17B, for the high quality voice communication service, the voice is transmitted through the fundamental channel and the control message is transmitted through the dedicated control channel. As shown in FIGS. 18A and 18B, for the packet data communication #1, the packet data is transmitted through the supplemental channel and the control message is transmitted through the fundamental channel. As shown in FIGS. 19A and 19B, for the packet data communication #2, the packet data is transmitted through the supplemental channel and the control message is transmitted through the dedicated control channel. As shown in FIGS. 20A and 20B, for the voice and packet data communication #1, the voice and the control message are transmitted through the fundamental channel and the packet data is transmitted through the supplemental channel. As shown in FIGS. 21A and 21B, for the voice and packet data communication #2, the voice is transmitted through the fundamental channel, the packet data is transmitted through the supplemental channel and the control message is transmitted through the dedicated control channel. As shown in FIGS. 22A and 22B, for the voice and packet data communication #3, the voice and the control message pertinent to the voice are transmitted through the fundamental channel, the packet data is transmitted through the supplemental channel and the control message pertinent to the packet data communication is transmitted through dedicated control channel. As described above, in the reverse link, the power control signal is transmitted through the pilot channel. However, in the forward link, the power control signal is transmitted through the fundamental channel when the fundamental channel is in use, and through the dedicated control channel only when the fundamental channel is not in use. In FIGS. 17A to 22B, brackets [ ] express the state where the control message and the data are transmitted simultaneously.

TABLE 1

|  | PCH | DCCH | FCH | SCH |
|---|---|---|---|---|
| Normal Voice Comm. | o | x | o | x |
| High Quality Voice Comm. | o | o | o | x |
| Packet Data Comm. #1 | o | x | o | o |
| Packet Data Comm. #2 | o | o | x | o |
| Voice & Packet Data Comm. #1 | o | x | o | o |
| Voice & Packet Data Comm. #2 | o | o | o | o |
| Voice & Packet Data Comm. #3 | o | o | o | o |

In Table 1, PCH denotes the pilot channel, DCCH the dedicated control channel, FCH the fundamental channel and SCH the supplemental channel.

Although the descriptions are made laying stress on the respective channel generators, it is to be noted that the respective channel receivers have the reverse construction of the corresponding channel generators. Therefore, the detailed description of the respective channel receivers is omitted herein.

The communication system according to the present invention includes the dedicated control channel (or another channel capable of functioning as the dedicated control channel), and transmits the control message independently by using the dedicated control channel when servicing the voice and packet data communication. Further, the system transmits the control messages pertinent to the channel allocation for the fundamental channel and/or the supplemental channel to be used for the communication channel through the dedicated control channel, and transmits the control message pertinent to the communication during the active status through the dedicated control channel. When the call is released, although the channel in use is disconnected, the dedicated control channel maintains the control hold status to transmit/receive the control message. Therefore, in the idle state where the channel has no data to transmit, the channel in use is released and only the dedicated control channel is held. Meanwhile, if the data to be transmitted is generated in the control hold status, the system promptly goes to the communication state by allocating the channel. At this moment, if the control hold status lasts over a predetermined time, the system proceeds to the idle state and releases even the dedicated control channel. Accordingly, the system does not transmit the control message through the channel in use, thereby improving efficiency of the orthogonal code.

Moreover, since the power control signal is transmitted to the terminal through the forward dedicated control channel, the system can solve the problem caused by insertion of the power control bit. That is to say, when the control message is transmitted through the fundamental channel, the power control signal for the forward link is transmitted by being added to the fundamental channel, and when the control message is transmitted through the dedicated control channel, the power control signal for the forward link is transmitted by being added to the dedicated control channel. Therefore, the system controls the reverse power by using the channel for transmitting the control message, not the channel in use, thereby improving the communication quality.

In addition, the control message is transmitted in different frame length according to the types of the control messages. That is, when allocating and releasing the channels for communication, the system uses the short frame, since the control messages are relatively short and should be transmitted promptly. However, when transmitting a long control message such as the handoff message, the system uses the long frame. Therefore, the control message can be efficiently transmitted through the dedicated control channel.

What is claimed is:

1. A base station communication device for a CDMA (Code Division Multiple Access) communication system, comprising:
    a controller for allocating an orthogonal code for channelizing one or more channels of said communication system;
    a pilot channel generator for orthogonal-spreading a pilot signal with an orthogonal code allocated to a pilot channel;
    a dedicated control channel generator for orthogonal-spreading a control message of a dedicated control channel with an orthogonal code allocated to the dedicated control channel and generating the control message discontinuously according to the existence/nonexistence of the control message, the dedicated control channel having a first and a second dedicated control channel signal;
    a dedicated fundamental channel generator for orthogonal-spreading a voice signal of a dedicated fundamental channel with an orthogonal code allocated to the dedicated fundamental channel, the dedicated fundamental channel having a first and a second dedicated fundamental channel signal;
    a dedicated supplemental channel generator for orthogonal-spreading packet data of a dedicated supplemental channel with an orthogonal code allocated to the dedicated supplemental channel, the dedicated supplemental channel having a first and a second dedicated supplemental channel signal;
    a first adder for adding the output of the pilot channel generator to the first channel signals output from the dedicated control channel generator, the dedicated fundamental channel generator, and the dedicated supplemental channel generator;
    a second adder for adding the second channel signals output from the dedicated control channel generator, the dedicated fundamental channel generator, and the dedicated supplemental channel generator; and
    a spreader for spreading signals output from the first adder and the second adder with a PN (pseudo noise) sequence of a base station.

2. The base station communication device as claimed in claim 1, wherein said controller allocates a quasi-orthogonal code to at least one of said channel generators.

3. The base station communication device as claimed in claim 2, wherein the channel generator to which said quasi-orthogonal code is allocated is said dedicated control channel generator.

4. The base station communication device as claimed in claim 1, wherein the control message generated from said dedicated control channel generator comprises a radio link protocol (RLP).

5. The base station communication device as claimed in claim 1, wherein the control message generated from said dedicated control channel generator comprises a MAC (Medium Access Control) message.

6. The base station communication device as claimed in claim 1, wherein the control message generated from said dedicated control channel generator comprises an L3 signaling message.

7. The base station communication device as claimed in claim 1, wherein said dedicated control channel generator adds power control information to said control message.

8. The base station communication device as claimed in claim 1, wherein said fundamental channel generator adds power control information to said voice signal.

9. The base station communication device as claimed in claim 1, wherein said fundamental channel generator adds power control information to said voice signal and said dedicated control channel generator adds said power control information to said control message when said fundamental channel generator is disabled.

10. The base station communication device as claimed in claim 1, wherein said dedicated control channel generator generates said control message in first and second frame sizes according to sizes of said control message.

11. The base station communication device as claimed in claim 10, wherein said first frame size is 5 ms and said second frame size is 20 ms.

12. The base station communication device as claimed in claim 11, wherein said dedicated control channel generator generates said control message discontinuously according to existence/nonexistence of said control message.

13. The base station communication device as claimed in claim 1, wherein said dedicated control channel generator generates said control message in a first frame size when said control message is an urgent control message and in a second frame size when said control message is a normal control message.

14. The base station communication device as claimed in claim 13, wherein said first frame size is 5 ms and said second frame size is 20 ms.

15. The base station communication device as claimed in claim 14, wherein said dedicated control channel generator generates said control message discontinuously according to existence/nonexistence of said control message.

16. The base station communication device as claimed in claim 1, wherein said supplemental channel generator allocates a plurality of supplemental channels.

17. The base station communication device as claimed in claim 1, further comprising:
    a sync channel generator to which an orthogonal code is allocated by said controller, for generating sync channel information for time synchronization and frame synchronization; and
    a paging channel generator to which an orthogonal code is allocated by said controller, for generating information required before formation of a communication channel.

18. A terminal communication device for a CDMA communication system, comprising:
    a dedicated control channel generator for discontinuously generating a control message according to the existence/nonexistence of the control message for a dedicated control channel;

a pilot channel generator for generating a pilot signal by adding a power control signal to said pilot signal thereby eliminating the need to assign a new channel to transmit the power control signal;

a fundamental channel generator for generating a voice signal;

a supplemental channel generator for generating data; and a spreader for spreading signals output from the channel generators with a PN.

19. The terminal communication device as claimed in claim 18, further comprising a controller for allocating an orthogonal code for dividing channels of said channel generators.

20. The terminal communication device as claimed in claim 19, wherein said controller allocates a quasi-orthogonal code to at least one of said channel generators.

21. The terminal communication device as claimed in claim 20, wherein the channel generator to which said quasi-orthogonal code is allocated is said dedicated control channel generator.

22. The terminal communication device as claimed in claim 19, wherein the control message generated from said dedicated control channel generator comprises an RLP message.

23. The terminal communication device as claimed in claim 19, wherein the control message generated from said dedicated control channel generator comprises a MAC message.

24. The terminal communication device as claimed in claim 19, wherein the control message generated from said dedicated control channel generator comprises an L3 signaling message.

25. The terminal communication device as claimed in claim 19, wherein said dedicated control channel generator generates said control message in first and second frame sizes according to sizes of said control message.

26. The terminal communication device as claimed in claim 25, wherein said first frame size is 5 ms and said second frame size is 20 ms.

27. The terminal communication device as claimed in claim 26, wherein said dedicated control channel generator generates said control message discontinuously according to existence/nonexistence of said control message.

28. The terminal communication device as claimed in claim 19, wherein said dedicated control channel generator generates said control message in a first frame size when said control message is an urgent control message and in a second frame size when said control message is a normal control message.

29. The terminal communication device as claimed in claim 28, wherein said first frame size is 5 ms and said second frame size is 20 ms.

30. The terminal communication device as claimed in claim 29, wherein said dedicated control channel generator generates said control message discontinuously according to existence/nonexistence of said control message.

31. The terminal communication device as claimed in claim 19, wherein said supplemental channel generator allocates a plurality of supplemental channels.

32. The terminal communication device as claimed in claim 19, wherein said dedicated control channel generator generates said control message at a data rate of 9.6 Kbps.

33. The terminal communication device as claimed in claim 32, wherein the control message generated from said dedicated control channel generator comprises an RLP message.

34. The terminal communication device as claimed in claim 32, wherein the control message generated from said dedicated control channel generator comprises a MAC message.

35. The terminal communication device as claimed in claim 32, wherein the control message generated from said dedicated control channel generator comprises an L3 signaling message.

36. A terminal communication device for a CDMA communication system, comprising:

a dedicated control channel generator for discontinuously generating a control message for a dedicated control channel, said control message having a frame length variable according to a control type and a data rate of 9.6 Kbps;

a pilot channel generator for generating a pilot signal by adding a power control signal to said pilot signal thereby eliminating the need to assign a new channel to transmit the power control signal;

a fundamental channel generator for generating a voice signal at a variable rate;

a supplemental channel generator for generating data at a scheduled rate; and a spreader for spreading signals output from the channel generators with a PN (pseudo noise) sequence.

37. The terminal communication device as claimed in claim 36, further comprising a controller for allocating an orthogonal code for dividing channels of said channel generators.

38. The terminal communication device as claimed in claim 37, wherein said dedicated control channel generator generates said control message in first and second frame lengths according to sizes of said control message.

39. The terminal communication device as claimed in claim 38, wherein said control message comprises RLP, MAC and L3 signaling messages.

40. The terminal communication device as claimed in claim 39, wherein the scheduled rate of said supplemental channel generator is over 9.6 Kbps.

41. The terminal communication device as claimed in claim 40, wherein the variable rate of said fundamental channel generator is a selected one of 9.6 Kbps, 4.8 Kbps, 2.4 Kbps and 1.2 Kbps.

42. A terminal communication device for a CDMA communication system, comprising:

a dedicated control channel generator for discontinuously generating a control message for a dedicated control channel and spreading said control message with an orthogonal code for an allocated dedicated control channel to generate a dedicated control channel signal, said control message having a frame length variable according to a control type and having a data rate of 9.6 Kbps;

a pilot channel generator for spreading a pilot signal and a power control signal added to said pilot signal by using an orthogonal code allocated for a pilot channel to generate a pilot channel signal thereby eliminating the need to assign a new channel to transmit the power control signal;

a fundamental channel generator for spreading a voice signal with an orthogonal code allocated for a fundamental channel to generate a fundamental channel signal;

a supplemental channel generator for spreading data with an orthogonal code allocated for a supplemental channel to generate a supplemental channel signal;

an adder for generating a first channel signal by adding said dedicated control channel signal to said pilot channel signal, and generating a second channel signal by adding said fundamental channel signal to said supplemental channel signal; and a spreader for spreading said first and second channel signals with corresponding common PN sequences for a base station.

43. The terminal communication device as claimed in claim 42, wherein said dedicated control channel generator generates said control message in first and second frame lengths according to a message type.

44. The terminal communication device as claimed in claim 43, wherein the control message of said dedicated control channel generator comprises RLP, MAC and L3 signal messages.

45. The terminal communication device as claimed in claim 44, wherein said supplemental channel generator generates said packet data at a scheduled rate of over 9.6 Kbps according to a decision by the base station.

46. The terminal communication device as claimed in claim 45, wherein said fundamental channel generator generates a voice signal having a data rate selected form variable rates of 9.6 Kbps, 4.8 Kbps, 2.4 Kbps and 1.2 Kbps.

47. A method for communicating dedicated channel information in a base station for a CDMA communication system, comprising the steps of:

allocating a dedicated fundamental channel for communicating the dedicated channel information and a dedicated control channel for communicating control information;

transmitting information via the dedicated fundamental channel and the control information via a dedicated control channel; and upon termination of communication, releasing the dedicated fundamental channel and the dedicated control channel;

wherein the channel communicating the control information maintains a control hold status for a predetermined time before being released.

48. The method as claimed in claim 47, wherein the information transmitted via the dedicated fundamental channel includes voice or data.

49. The method as claimed in claim 48, wherein the control information transmitted via the dedicated control channel includes one of a control message having a first frame length, and a control message and a user message having a second frame length.

50. The method as claimed in claim 49, wherein the first frame length is 5 ms and the second frame length is 20 ms.

51. The method as claimed in claim 48, wherein the dedicated control channel transmits power control bits for controlling a transmission power of a reverse link.

52. A method for communicating data in a base station for a CDMA communication system, comprising the steps of:

a) allocating a dedicated supplemental channel for communicating the data and a dedicated control channel for communicating control information;

b) transmitting the data via the dedicated supplemental channel and the control information via the dedicated control channel; and c) upon termination of communication, releasing the dedicated channels;

wherein the channel communicating the control information maintains a control hold status for a predetermined time before being released.

53. The method as claimed in claim 52, wherein the step of releasing comprises the steps of:

i) releasing the dedicated fundamental channel; and ii) transitioning to a control hold state to hold a connection state of the dedicated control channel.

54. The method as claimed in claim 53, wherein the step of transitioning comprises the steps of:

allocating the dedicated fundamental channel to restart communication when data communication is requested within a predefined time; and releasing the dedicated control channel when data communication is not requested within the predefined time.

55. The method as claimed in claim 52, wherein the control information transmitted via the dedicated control channel includes one of a control message having a first frame length, and a control message and a user message having a second frame length.

56. The method as claimed in claim 55, wherein the first frame length is 5 ms and the second frame length is 20 ms.

57. The method as claimed in claim 52, wherein the dedicated control channel transmits power control bits for controlling a transmission power of a reverse link.

58. A method for communicating dedicated channel information in a base station for a CDMA communication system, comprising the steps of:

a) allocating a dedicated fundamental channel for communicating voice, a dedicated supplemental channel for communicating data and a dedicated control channel for communicating control information;

b) transmitting the voice via the dedicated fundamental channel, the data via the dedicated supplemental channel and the control information via the dedicated control channel;

c) upon termination of voice communication, releasing the dedicated fundamental channel; and d) upon termination of data communication, releasing the dedicated supplemental channel;

wherein the channel communicating the control information maintains a control hold status for a predetermined time before being released.

59. The method as claimed in claim 58, wherein the step of releasing the dedicated supplemental channel comprises the steps of:

i) releasing the dedicated supplemental channel; and ii) transitioning to a control hold state to hold a connection state of the dedicated control channel.

60. The method as claimed in claim 58, wherein the step of releasing the dedicated supplemental channel comprises the steps of:

releasing the dedicated supplemental channel and the dedicated control channel;

holding a connection state of the dedicated fundamental channel; and communicating the voice and the control information via the dedicated fundamental channel.

61. The method as claimed in claim 60, wherein when the dedicated control channel is released, power control information for controlling a transmission power of a reverse link is transmitted via the dedicated fundamental channel.

62. The method as claimed in claim 58, wherein the step of releasing the dedicated supplemental channel comprises the steps of:

releasing the dedicated supplemental channel; and holding a connection state of the dedicated fundamental channel and the dedicated control channel.

63. The method as claimed in claim 59, wherein the step of releasing the dedicated fundamental channel comprises the steps of:

i) releasing the dedicated control channel; and ii) transitioning to a control hold state to hold a connection state of the dedicated control channel.

64. The method as claimed in claim 60, wherein the step of releasing the dedicated fundamental channel comprises the steps of:

i) releasing the dedicated control channel; and ii) transitioning to a control hold state to hold a connection state of the dedicated control channel.

65. The method as claimed in claim 62, wherein the step of releasing the dedicated fundamental channel comprises the steps of:

i) releasing the dedicated control channel; and ii) transitioning to a control hold state to hold a connection state of the dedicated control channel.

66. The method as claimed in claim 63, wherein the step of transitioning comprises the steps of:

allocating the dedicated supplemental channel to restart the communication when data communication is requested within a predefined time; and releasing the dedicated control channel when data communication is not requested within the predefined time.

67. The method as claimed in claim 64, wherein the step of transitioning comprises the steps of:

allocating the dedicated supplemental channel to restart the communication when data communication is requested within a predefined time; and releasing the dedicated control channel when data communication is not requested within the predefined time.

68. The method as claimed in claim 65, wherein the step of transitioning comprises the steps of:

allocating the dedicated supplemental channel to restart the communication when data communication is requested within a predefined time; and releasing the dedicated control channel when data communication is not requested within the predefined time.

69. The method as claimed in claim 58, wherein the control information transmitted via the dedicated control channel includes one of a control message having a first frame length, and a control message and a user message having a second frame length.

70. The method as claimed in claim 69, wherein the first frame length is 5 ms and the second frame length is 20 ms.

71. The method as claimed in claim 58, wherein the dedicated control channel transmits power control bits for controlling a transmission power of a reverse link.

* * * * *